United States Patent
Castagnoli et al.

(10) Patent No.: US 12,010,645 B2
(45) Date of Patent: *Jun. 11, 2024

(54) GUIDED ALIGNMENT OF WIRELESS DEVICE ORIENTATION

(71) Applicant: Juniper Networks, Inc., Sunnyvale, CA (US)

(72) Inventors: Neal Dante Castagnoli, Morgan Hill, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,500

(22) Filed: Sep. 22, 2022

(65) Prior Publication Data

US 2023/0013301 A1 Jan. 19, 2023

Related U.S. Application Data

(63) Continuation of application No. 16/915,336, filed on Jun. 29, 2020, now Pat. No. 11,582,710.

(Continued)

(51) Int. Cl.
  *H04W 64/00* (2009.01)
  *H01Q 3/02* (2006.01)
  *H04B 7/06* (2006.01)

(52) U.S. Cl.
  CPC ............ *H04W 64/003* (2013.01); *H01Q 3/02* (2013.01); *H04B 7/0641* (2013.01)

(58) Field of Classification Search
  CPC ... H04W 64/003; H04W 16/18; H04W 88/08; H01Q 3/02; H04B 7/0641; G01S 3/48; G01S 5/06
  See application file for complete search history.

(56) References Cited

U.S. PATENT DOCUMENTS

| 5,852,630 A | 12/1998 | Langberg et al. |
| 6,243,587 B1 | 6/2001 | Dent et al. |

(Continued)

FOREIGN PATENT DOCUMENTS

| CA | 2296812 A1 | 8/2000 |
| EP | 2985624 A1 | 2/2016 |

(Continued)

OTHER PUBLICATIONS

Corrected Notice of Allowance from U.S. Appl. No. 16/915,381 dated Feb. 23, 2023, 14 pp.

(Continued)

*Primary Examiner* — Kenneth T Lam
(74) *Attorney, Agent, or Firm* — Shumaker & Sieffert, P.A.

(57) ABSTRACT

Embodiments provide for guided alignment of the orientation of two wireless devices. A first wireless device is at a known position and a known orientation. A signal from a second wireless device is received via a plurality of receive elements of the first wireless device. The first wireless device measures phase differences of the signal at the plurality of receive elements, and determines locations of each of the second wireless device's transmit elements based on the differences. Based on the transmit element locations, and a known antenna layout of the second wireless device, an orientation of the second wireless device is determined. Based on differences between the determined orientation and the known orientation of the first wireless device, instructions for aligning the devices are generated. Once the devices are aligned, location estimates of a third wireless device are made by both the first wireless device and the second wireless device.

20 Claims, 41 Drawing Sheets

Related U.S. Application Data

(60) Provisional application No. 63/011,851, filed on Apr. 17, 2020, provisional application No. 62/968,754, filed on Jan. 31, 2020.

(56) References Cited

U.S. PATENT DOCUMENTS

| | | | |
|---|---|---|---|
| 6,249,252 | B1 | 6/2001 | Dupray |
| 6,255,991 | B1 | 7/2001 | Hedin |
| 6,408,246 | B1 | 6/2002 | Fox |
| 6,489,923 | B1 | 12/2002 | Bevan et al. |
| 10,247,808 | B2 * | 4/2019 | Sanderovich .......... H04B 7/086 |
| 10,547,974 | B1 | 1/2020 | Pollefeys |
| 11,422,224 | B2 | 8/2022 | Castagnoli |
| 11,582,710 | B2 * | 2/2023 | Castagnoli ............... G01S 5/06 |
| 2003/0130793 | A1 | 7/2003 | Patwari et al. |
| 2004/0029558 | A1 | 2/2004 | Liu |
| 2004/0057730 | A1 | 3/2004 | Littlejohn et al. |
| 2004/0198386 | A1 | 10/2004 | Dupray |
| 2004/0235497 | A1 | 11/2004 | Zekavat |
| 2005/0088337 | A1 | 4/2005 | Lorenz |
| 2008/0191941 | A1 | 8/2008 | Saban et al. |
| 2009/0079634 | A1 * | 3/2009 | Rose ........................ G01S 5/12 |
| | | | 342/442 |
| 2010/0194641 | A1 | 8/2010 | Miller |
| 2011/0035284 | A1 | 2/2011 | Moshfeghi et al. |
| 2011/0156957 | A1 | 6/2011 | Waite et al. |
| 2012/0209714 | A1 | 8/2012 | Douglas et al. |
| 2013/0102325 | A1 | 4/2013 | Flanagan |
| 2013/0238712 | A1 | 9/2013 | Dearman |
| 2014/0266908 | A1 | 9/2014 | Pandey |
| 2016/0084937 | A1 | 3/2016 | Lin |
| 2016/0205508 | A1 * | 7/2016 | Sanderovich ......... G01S 5/0247 |
| | | | 455/456.1 |
| 2019/0265367 | A1 | 8/2019 | Silverman et al. |
| 2019/0304103 | A1 | 10/2019 | Onomura et al. |
| 2021/0243558 | A1 | 8/2021 | Castagnoli et al. |
| 2021/0243559 | A1 | 8/2021 | Castagnoli et al. |
| 2021/0243717 | A1 | 8/2021 | Castagnoli et al. |
| 2022/0342031 | A1 | 10/2022 | Castagnoli |

FOREIGN PATENT DOCUMENTS

| | | |
|---|---|---|
| WO | 0052494 A1 | 9/2000 |
| WO | 0181941 A1 | 11/2001 |
| WO | 2008/099390 A2 | 8/2008 |
| WO | 2015/114355 A1 | 8/2015 |
| WO | 2019/221746 A1 | 11/2019 |

OTHER PUBLICATIONS

Notice of Allowance from U.S. Appl. No. 16/915,381 dated Feb. 13, 2023, 17 pp.
Corrected Notice of Allowance from U.S. Appl. No. 16/915,615 dated Apr. 12, 2023, 6 pp.
Notice of Allowance from U.S. Appl. No. 16/915,615 dated Mar. 29, 2023, 9 pp.
Response to Office Action dated Dec. 22, 2022 from U.S. Appl. No. 17/811,789, filed Apr. 24, 2023, 16 pp.
Final Office Action from U.S. Appl. No. 17/811,789 dated May 11, 2023, 13 pp.
Notice of Allowance from U.S. Appl. No. 16/915,381 dated Jun. 1, 2023, 12 pp.
"Wireless access point," High Definition: A-Z Guide to Personal Technology, Houghton Mifflin Company, Credo Reference, 2006, 2 pp. Retrieved from the Internet, Accessed date: Dec. 22, 2021, URL: https://search.credoreference.com/content/entry/hmhighdef/wireless_access_point/0?institutionId=743, (Applicant points out, in accordance with MPEP 609.04(a), that the year of publication, 2006, is sufficiently earlier than the effective U.S. filing date, so that the particular month of publication is not in issue).
Extended Search Report from counterpart European Application No. 20197303.9, dated Mar. 19, 2021, 8 pp.
Office Action from U.S. Appl. No. 17/811,789 dated Dec. 22, 2022, 13 pp.
Prosecution History from U.S. Appl. No. 16/915,336, dated Feb. 25, 2022 through Dec. 29, 2022, 59 pp.
Prosecution History from U.S. Appl. No. 16/915,381, dated Sep. 15, 2022 through Dec. 21, 2022, 39 pp.
Prosecution History from U.S. Appl. No. 16/915,615, dated Sep. 15, 2022 through Dec. 21, 2022, 35 pp.
Response to Extended Search Report dated Mar. 19, 2021, from counterpart European Application No. 20197303.9 Filed Feb. 1, 2022, 26 pp.
Prosecution History from U.S. Appl. No. 16/915,447, dated Sep. 23, 2021 through Jun. 23, 2022, 34 pp.
Notice of Allowance from U.S. Appl. No. 16/915,615 dated Jul. 6, 2023, 6 pp.
Response to Final Office Action dated May 11, 2023 from U.S. Appl. No. 17/811,789, filed Jul. 11, 2023, 11 pp.
Notice of Allowance from U.S. Appl. No. 17/811,789 dated Jul. 27, 2023, 9 pp.
Weisstein, "Euler Formula", Wolfram MathWorld, 2023, 3 pp., Retrieved from the Internet on Jul. 24, 2023 from URL: https://mathworld.wolfram.com/EulerFormula.html.
Communication pursuant to Article 94(3) EPC from counterpart European Application No. 20197303.9 dated Jul. 14, 2023, 5 pp.
Office Action from U.S. Appl. No. 18/324,074 dated Dec. 21, 2023, 9 pp.
Response to Communication pursuant to Article 94(3) EPC dated Jul. 14, 2023, from counterpart European Application No. 20197303.9 filed Oct. 6, 2023, 12 pp.
Notice of Allowance from U.S. Appl. No. 18/324,074 dated Mar. 25, 2024, 8 pp.

* cited by examiner

GUIDED ALIGNMENT OF WIRELESS DEVICE ORIENTATION

This application is a continuation of U.S. patent application Ser. No. 16/915,336, filed 29 Jun. 2020, which claims the benefit of U.S. Provisional Patent Application No. 63/011,851, filed 17 Apr. 2020 and claims the benefit of U.S. Provisional Patent Application No. 62/968,754, filed 31 Jan. 2020, each of which is incorporated by reference herein in its entirety.

FIELD

The present application relates to wireless communications and, more particularly, to methods and/or apparatus for deployment of wireless access points (APs) that are utilized for determining location of objects associated with wireless networks.

BACKGROUND

Estimation of location of a wireless transmitter is utilized to provide many functions. For example, location-based services include navigation, location specific content delivery, and many other applications. There are many known methods of determining a location of a wireless transmitter, including RSSI based methods, time of arrival methods, and angle of arrival methods.

DETAILED DESCRIPTION

Figure 1:
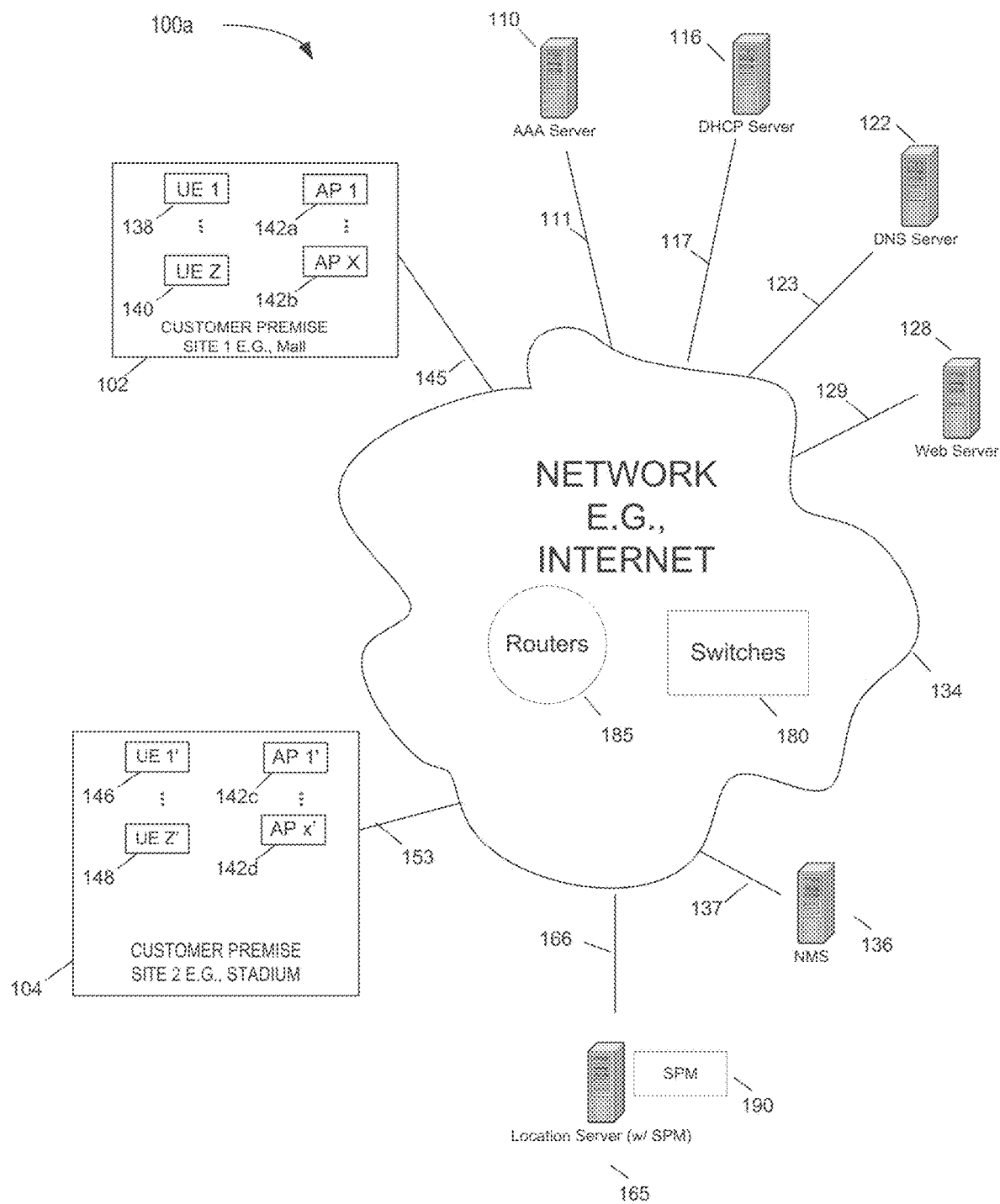
FIG. 1 shows an example system that is implemented in one or more of the disclosed embodiments.

This disclosure describes example embodiments that determine a location of a first wireless device based on phase differences of waveforms exchanged between the first wireless device and a second wireless device. In some embodiments, a location of a device transmitting the waveforms is determined based on the phase differences. In some other embodiments, a location of the device receiving the waveforms is determined based on the phase differences. In some embodiments, phase differences observed from signals transmitted by a device and signals received by the device are used in determining a location of the device.

At least one of the first wireless device and second wireless device include a plurality or receive elements. Unlike some prior methods, the disclosed embodiments do not require a stable reference signal which may be difficult to maintain in different environments. Instead, the disclosed embodiments utilize the plurality of receive elements (e.g. antennas) distributed in a two or three dimensional orientations.

Some of the disclosed embodiments define a plurality of geographic regions in proximity to a wireless device, and then identify expected phase differences (phase difference signatures (PDSs)) for each of the plurality of geographic regions. In some embodiments, a location of a device receiving signals and determining phase differences is at an unknown location. In some embodiments, a location of a device transmitting signals is unknown. For each of these scenarios, expected phase differences of a signal received from a transmitter located in the plurality of geographic regions are determined.

The expected phase differences are generated to assist in determining a location of a wireless transmitter in an unknown location. Each of the expected phase differences describe phase differences experienced by receiving elements of a receiving device at a given location. As the expected phase differences will vary depending on a location of the wireless transmitter, different expected phase differences are determined/generated for each of a plurality of geographic regions. An estimate of a location of the wireless transmitter is then determined by comparing measured phase differences of received signals from the transmitter at the receiving elements of the receiver with the expected phase differences for one or more of the plurality of regions. A difference between expected phase differences of each region and the measured phase differences provides indications of the location of the wireless transmitter.

The exchange of signals described above can be used to not only determine a device's location, but also its orientation. While, as discussed above, phase differences of received signals can be used to estimate a location of a wireless transmitter, these received signals can also be used to determine a location of a specific transmit element (e.g. antenna). Thus, two wireless devices exchange signals, with phase differences of the exchanged signals determining distances between transmit/receive element pairs of the two devices. Thus, for example, if each device includes four antennas, there are six pairs of transmit/receive elements between the two devices. Location of each transmit element of a first wireless device can be determined based on at least phase difference information collected from four receive elements of the second device. If a device receives a signal via four receive elements, labeled A1, A2, A3, and A4, expected phase differences are computed, in some example embodiments, based on differences of a received signal between A1 and A2, A1 and A3, A1 and A4, A2 and A3, A2 and A4, and A3 and A4. These combinations could hold true for signals transmitted by each transmit element of a transmitting device. Thus, for example, if a transmitting device includes four transmit elements, some embodiments generate 4*6=24 different expected phase differences. Note that expected phase differences are computed, in various embodiments for one or more frequencies, since signals of different frequencies will result in different phase differences experienced at a receiver. Thus, if the expected phase differences described above are generated for two frequencies, 24*2 or 48 expected phase differences are computed in some embodiments.

Once a location of each transmit element has been determined, the location of the transmit elements can be compared to a known layout of the device's transmit elements. For example, some embodiments maintain a library of device transmit element layout information. The transmit element layout information defines relative orientation and position of a particular type of device's transmit elements. This known layout can be moved and/or rotated in three dimensional space until a correspondence between the layout and the determined transmit element locations is found. The moved and/or rotated layout matching the determined transmit element locations corresponds to the device's location and orientation.

In some cases, it can be desirable to align an orientation of multiple wireless devices. Thus, some of the disclosed embodiments generate instructions describing how to align a first orientation of a first wireless device with a second orientation of a second wireless device. For example, once a relative orientation of the first wireless device with respect to the second wireless device is determined, instructions are generated, in these embodiments, to adjust the first wireless device with respect to rotation about one or more of a horizontal (e.g. X), vertical (e.g. Y), or rotational (e.g. Z) axis. By updating the orientation of the first wireless device so as to be aligned with the orientation of the second wireless device, and by determining the relative distance between the two devices, location estimates generated by that first wireless device for another wireless device are more easily aggregated with a location estimate generated by the second wireless device.

In some embodiments, location estimates are performed by multiple wireless devices using a single coordinate system and thus a unified plurality of geographic regions that are defined based on the single coordinate system. For example, in some embodiments, once a relative position and relative orientation between two wireless devices is known, first expected phase differences resulting from a transmitter in each of a plurality of regions are determined based on a first location and first orientation of a first wireless device. A second set of expected phase differences results from a transmitter in each of the plurality of regions is determined based on a second location and second orientation of a second wireless device. Using these two different sets of expected phase differences, signals experienced by the first wireless device and/or second wireless device can be used to determine a location of a wireless transmitter within any of the unified plurality of geographic regions. Since both the first wireless device and second wireless device estimate the locations using the unified coordinate system and unified plurality of regions, there is no need to translate location estimates made by one device into a different coordinate system/plurality of regions used by a second wireless device.

In other embodiments, each wireless device defines or is assigned a separate plurality of geographic regions, with each plurality of geographic regions based on independent coordinate systems. In these embodiments, location estimates generated by each of the wireless devices are with respect to the wireless device's respective coordinate system and/or plurality of regions. Thus, in these embodiments, expected phase differences are generated for a particular wireless device, and for each of the particular wireless device's plurality of regions. To the extent location estimates from multiple wireless devices are combined in embodiments utilizing separate independent coordinate systems/ regions for each device, they must first be translated to a common coordinate system.

FIG. 1 shows an example system 100a that is implemented in one or more of the disclosed embodiments. System 100a includes a plurality of access points (APs) 142a-d. In various embodiments, an AP is an access point, a router, a switch, or any other device capable of providing network access. System 100a also includes Authentication, Authorization and Accounting (AAA) server(s) 110, Dynamic Host Configuration Protocol (DHCP) server(s) 116, Domain Name System (DNS) server(s) 122, one or more Web server(s) 128, and a network management system (NMS) 136. These servers are coupled together via a network 134 (e.g., the Internet and/or an enterprise intranet). Location and orientation server(s) 165 includes a site provisioning manager (SPM) module. The network 134 includes a plurality of routers 185 and a plurality of switches 180. A network communications link 111 couples the AAA server(s) 110 to the network 134. A network communications link 117 couples the DHCP server(s) to the network 134. A network communications link 123 couples the DNS server(s) to the network 134. A network communications link 129 couples the Web server(s) to the network 134. A network communications link 137 couples the network management server(s) 136 to the network 134. A network communications link 166 couples the location and orientation server(s) 165 to the network 134.

The system 100a further includes a plurality of user equipment devices (UE 1 138, . . . UE Z 140, UE 1' 146, . . . , UEZ' 148). A user equipment device is any wired, wireless, or optical equipment providing network access to communication devices used by users such as people or automated devices such as IoT devices. Some of the UEs (138, 140, 146, and 148) are wireless transmitters and receivers, and move throughout system 100a.

In the example system 100a, sets of access points are located at different customer premise sites. Customer premise site 1 102, e.g., a mall, includes an access point 142a and an access point 142b. Customer premise site 1 102 is connected to the network 134 via network communications link 153.

A second customer premise site 104, e.g., a stadium, includes an access point 142c and an access point 142d. As shown in FIG. 1, UEs (UE 1 138, . . . , UE Z 140) are currently located at a first customer premise site 102; UEs (UE 1' 146, . . . , UE Z' 148) are currently located at a second customer premise site 104. The second customer premise site 104 is coupled to the network 134 via the network communication link 145. Each one of the servers, routers, switches, APs, UEs NMS, and other servers attached to the network in some embodiments, include a system log or an error log module wherein each one of these devices records the status of the device including normal operational status and error conditions.

As discussed above, at least some of the disclosed embodiments determine a first location of a first wireless device with respect to a second wireless device based on at least a phase difference of a signal, the signal exchanged between the two wireless devices. For example, a first location and/or orientation of a first AP 142c is determined, in some embodiments, based on a second location and second orientation of a second AP (e.g. AP 142d). Or in other words, a first location and/or first orientation of first AP 142c is determined, in some embodiments, in reference to the coordinates of a second location and second orientation of a second AP (e.g. AP 142d). In these embodiments, a second location and second orientation of one AP (in this case, the second AP) is generally known. Specifically, the location and orientation of the second wireless device are known, in some embodiments, via location (e.g. via a global position system receiver) and/or orientation sensor(s) included in the second wireless device or via external measurements tools (e.g., a compass, level, laser, etc.). Based on the known second location and second orientation of the second AP, a first location and first orientation of the first wireless device is derived. The first location and first orientation are derived, at least in some embodiments, based on phase differences of one or more signals transmitted by the first AP and received by the second AP.

The example wireless devices of FIG. 1 include multiple radio transmitters and receivers (not shown) capable of transmitting and receiving signals at numerous frequencies, e.g., over the 2.4, 5 GHz, and or other frequency bands. One or more of the APs use a plurality of transmit elements and/or receive elements (e.g. antennas) to transmit and receive the signals to and from other wireless receivers and transmitters.

Deployment of an AP can be an elaborate and time-consuming process. Some APs are deployed such that their location and orientation are precisely aligned with desired coordinates, or alternatively known with precision.

The SPM module 190 of location and orientation server 165 uses the network communications link 166 to communicate with one or more of the APs 142a-d. Via the network communications link 166, the SPM can control the transmitters of the APs 142a-d and command them to transmit at any one of their operational frequencies. The SPM is also able to obtain, via the network communications link 166, information relating to signals received from any one or more of the APs 142a-d. For example, the SPM commands, in some embodiments, a first AP of APs 142a-d to transmit a signal via a particular antenna and can then obtain, from at least one other of the APs 142a-d phase difference between signals received by any pair of antennas of the receiving device. Obtaining this phase difference information is accomplished, in at least some embodiments, via channel state information (CSI) and/or capabilities built into device driver firmware of a Wi-Fi receiver integrated with the receiving AP.

In accordance with one example, SPM 190 uses the network communications link 166 to command AP 142c to transmit a signal at a specific frequency f1. The location and orientation of the AP 142d is known in this example. As described below with respect to at least FIGS. 14-27 below, AP 142d measures phase differences between the signals as received by a plurality of receive element pairs of the AP 142d. AP 142d then forwards the measured phase differences to the SPM 190 over the network communications link 166.

In some embodiments, this process is iteratively performed using different transmit elements of the AP 142c, and/or using different frequencies. For example, each one of the transmit elements of some APs can transmit a signal in each one of the 2.4 GHz band and in each one of the 5 GHz bands. Other frequency bands are utilized by other embodiments. For each one of these transmissions (signals of a specific frequency transmitted over a specific transmit element), the SPM 190 collects the phase differences between the signals as received at any one (or more) receive element pairs of the receiving AP.

Once the phase difference information has been measured by the receiving AP (e.g. AP 142d), the information is provided to the SPM 190 in some embodiments. In some embodiments, for a pair of two wireless devices, the SPM commands a first set of signal transmissions, where a first of the two wireless devices transmits signals on one or more transmit elements e.g., antennas, and those signals are received by a plurality of receive elements of the receiving second wireless device. The phase difference information is then determined for this set of signal exchanges.

As discussed in greater detail with reference to FIG. 3 below, some embodiments maintain a library of information defining transmit element and/or receive element layout information for particular types of wireless devices. The layout defines positions of transmit elements and/or receive elements with respect to their wireless device (e.g. the enclosure) as well as relative distances between the antennas of each wireless device. Some embodiments utilize information included in the layout, along with estimated distances between transmit/receive elements of two wireless devices to determine the location and orientation of one of the two wireless devices based on the known location and orientation of the other of the two wireless devices.

Figure 2A:
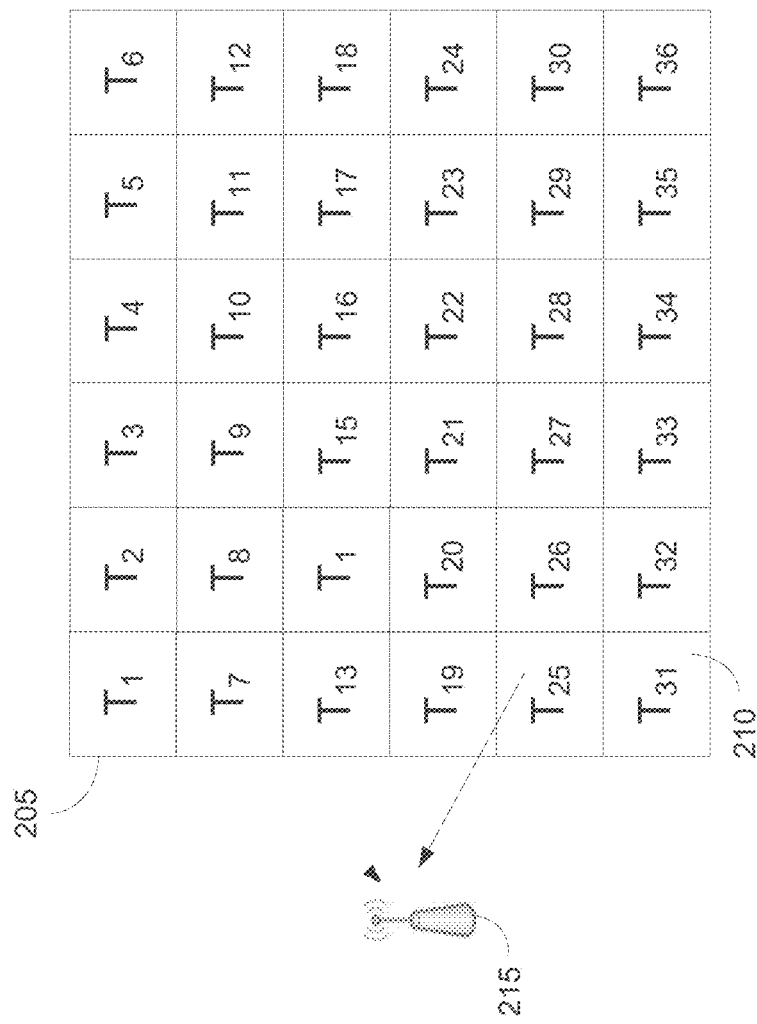
FIG. 2A shows a plurality of geographic regions, each possibly including a wireless transmitter.
Figure 2B:
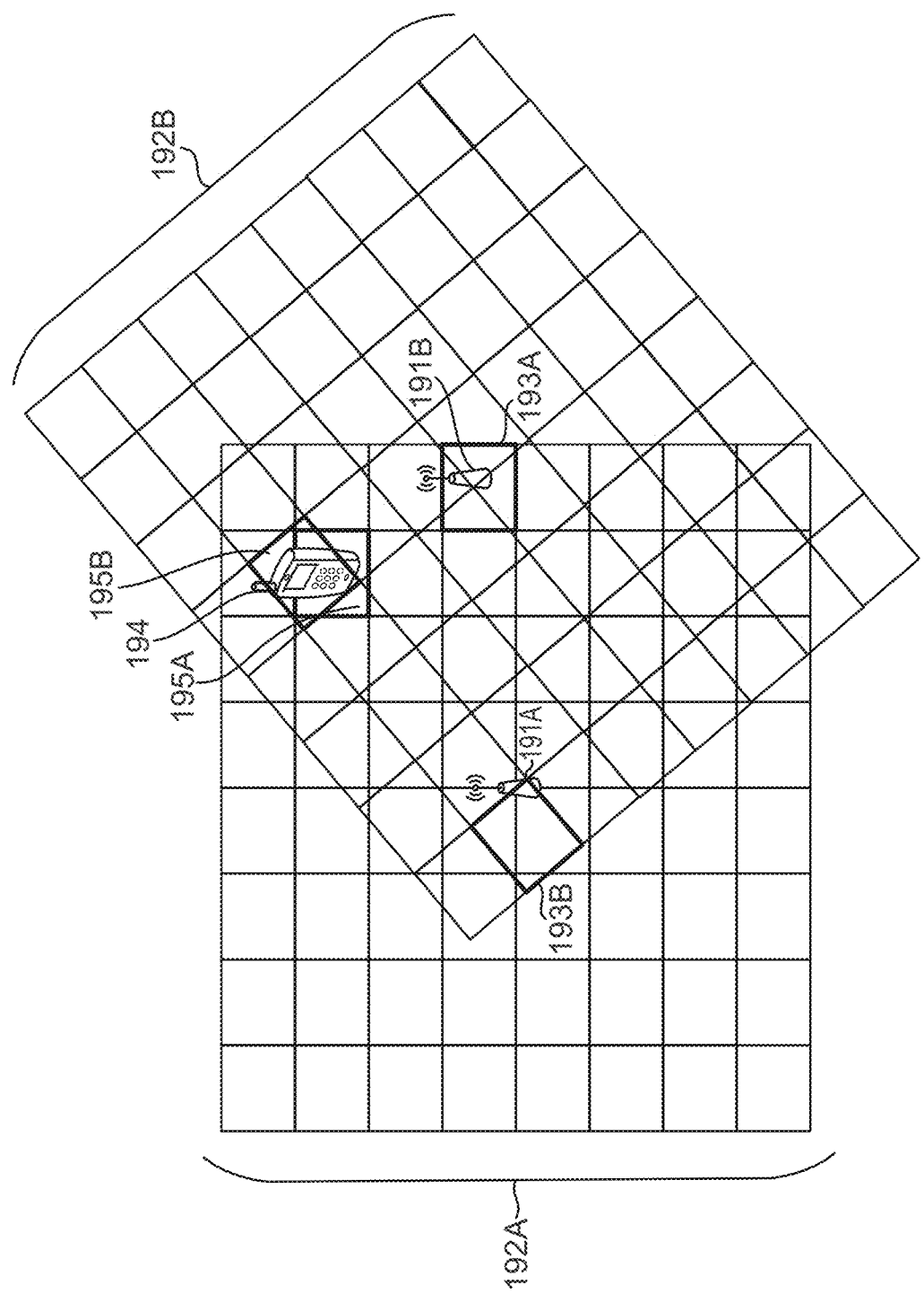
FIG. 2B is an overview diagram of an example system including two access points that implement at least one of the disclosed embodiments.

FIG. 2A shows a plurality of geographic regions, each possibly including a wireless transmitter. FIG. 2A shows a geographic area 205 divided into a plurality of geographic regions. An example geographic region 210 is shown. While FIG. 2B shows a two-dimensional view of a geographic area 205 and geographic regions such as geographic region 230, at least some of the disclosed embodiments operate on three dimensional geographic areas and regions. Each of the regions is labeled to include a hypothetical transmitter, labeled as $T_{1 \ldots 36}$, one hypothetical transmitter per region.

Also illustrated is a wireless receiver 215. The wireless receiver 215 receives a signal from one of the geographic regions within the geographic area 205 that is detectable by a plurality of receive elements of the wireless receiver 215. Note that while FIG. 2A illustrates the wireless receiver 215 positioned outside the geographic area 205, in some embodiments, the wireless receiver is positioned within the geographic area 205.

Some of the disclosed embodiments determine expected phase differences that would be experienced by the wireless receiver 215 when receiving a signal transmitted from each of the plurality of geographic regions $T_{1 \ldots 36}$. The illustration of FIG. 2A demonstrates that in some embodiments, a position of a transmitting device is determined by matching phase differences of a signal transmitted by the transmitting device (such as a transmitting device located in any one of the regions labeled $T_{1 \ldots 36}$) and received by a receiving device. (e.g. the wireless receiver 215). Note that expected phase differences for each region include, in some embodiments, multiple phase differences. The multiple phase differences represent phase differences of a signal as received by two receiving elements (e.g., a reference receive element and a second receive element). Phase differences for signals at multiple frequencies are also included in the expected phase differences, at least in some embodiments.

FIG. 2B is an overview diagram of an example system including two wireless devices that implement at least one of the disclosed embodiments. FIG. 2B shows two wireless devices, access point 191A and access point 191B. Each of the access points 191A and 191B have defined a corresponding plurality of regions. Access point 191A has defined a first plurality of regions 192A. Access point 191B has defined a second plurality of regions 192B. FIG. 2 illustrates that the first plurality of regions 192A and the second plurality of regions 192B are not aligned. For example, in some cases, a region within the first plurality of regions 192A spans a portion of more than one region in the second plurality of regions 192B. Similarly, a region within the second plurality of regions 192B spans a portion of more than one region in the first plurality of regions 192A. Furthermore, boundaries of the first plurality of regions 192A and the second plurality of regions 192B are not parallel or aligned. While FIG. 2B shows the first plurality of regions 192A and the second plurality of regions 192B as two dimensional regions, at least some of the disclosed embodiments contemplate that the access point 191A and/or 191B define a plurality of regions in a three dimensional space.

Each of the first plurality of regions 192A and the second plurality of regions 192B are used by their respective access points to estimate a location of another device, such as another access point or a wireless terminal. For example, in some embodiments, the access point 191A estimates a location and/or orientation of the access point 191B within the plurality of regions 192A. When this estimation is performed, the access point 191A estimates the location of the access point 191B to be in the region 193A, which is included in the first plurality of regions 192A. In some embodiments, the access point 191B estimates a location of access point 191A to be in a region 193B, which is included in the second plurality of regions 192B.

In some embodiments, each of the access points 191A and 191B also estimate a location of a wireless terminal 194. Thus, for example, access point 191A estimates a location of the wireless terminal 194 to be in region 195A, which is included in the first plurality of regions 192A. Access point 191B estimates a location of the wireless terminal 194 to be in region 195B, which is included in the second plurality of regions 192B.

Some of the disclosed embodiments map a location determination by the access point 191A within a region of the first plurality of regions to a second region within the second plurality of regions. Thus, for example, while the access point 191A estimates the wireless terminal 194's location as region 195A, these embodiments translate or map that region 195A to the regions used or defined by the access point 191B of the reference device, and specifically to region 195B of the second plurality of regions 192B. By mapping from the first plurality of regions 192A to the second plurality of regions 192B, some of the disclosed embodiments allow for multiple location determinations by a plurality of access points to be aggregated, and thus provide a more accurate location determination of the wireless terminal 194 than would be possible if only a single access point were used to estimate the wireless terminal 194 location.

Figure 2C:
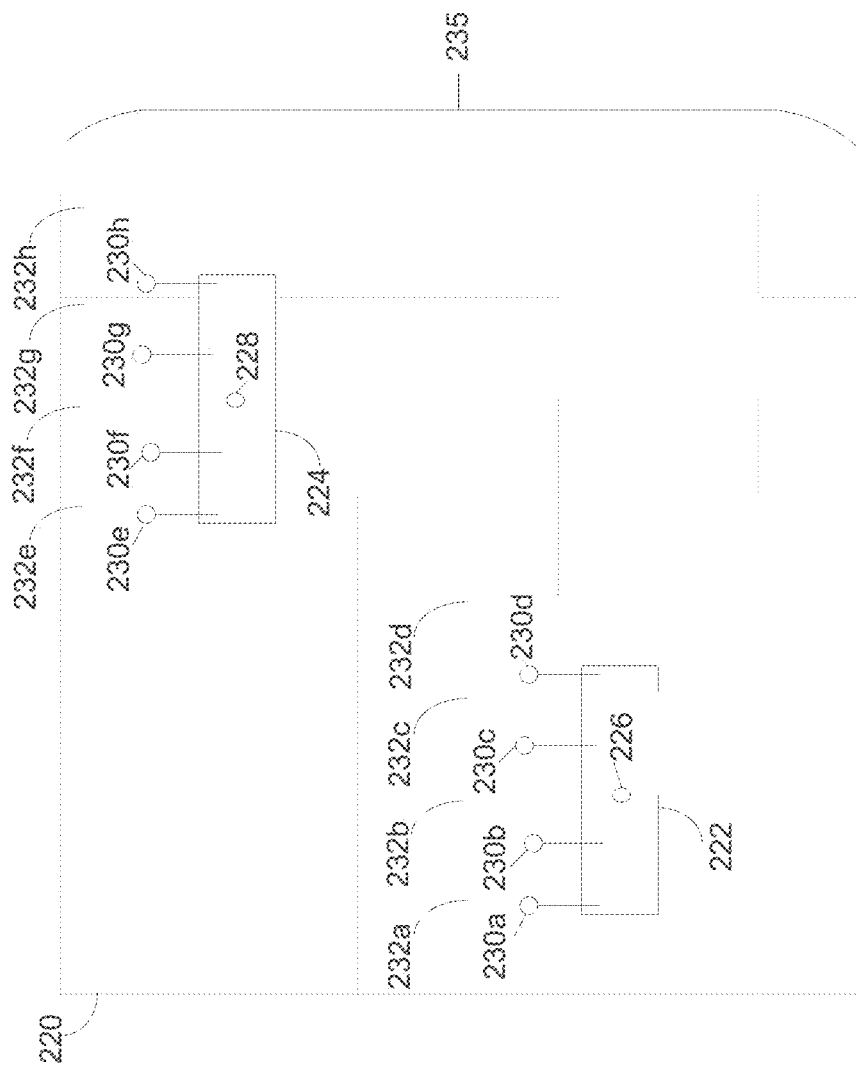
FIG. 2C shows a transmitting device and a receiving device within a plurality of regions.

FIG. 2C shows a transmitting device and a receiving device within a plurality of regions. FIG. 2C shows a geographic area 220 that is divided into a plurality of regions 235. FIG. 2C also shows two devices, a transmitting device 222 and a receiving device 224. The transmitting device includes a plurality of transmit elements. In the illustrated embodiment of FIG. 2C, the transmitting device 222 includes four transmit elements, transmit element 230a, transmit element 230b, transmit element 230c, and transmit element 230d. The receiving device 224 includes a plurality of receive elements. In the illustrated embodiment, the receiving device include four receive elements, including receive element 230e, receive element 230f, receive element 230g, and receive element 230h. Each of the plurality of transmit elements are located in a different one of the plurality of regions. For example, FIG. 2C shows that transmit element 230a is located in region 232a. Transmit element 230b is located in region 232b. Transmit element 230c is located in region 232c. Transmit element 230d is located in region 232*d*. Similarly, each of the plurality of receive elements are located in a separate region of the plurality of regions 235. Receive element 230*e* is located in region 232*e*. Receive element 230*f* is located in region 232*f*. Receive element 230*g* is located in region 232*g*. Receive element 230*h* is located in region 232*h*.

FIG. 2C also shows that each of the transmitting device 222 and receiving device 224 have corresponding reference points, shown as reference point 226 for transmitting device 222 and reference point 228 for receiving device 224. Some of the disclosed embodiments maintain layout information for each of the devices 222 and 224. Layout information for the transmitting device 222 defines relative positions of each of the transmitting elements 230*a-d* and the reference point 226. Layout information for the receiving device 224 defines relative positions of each of the receive elements 230*e-h* and the reference point 228.

As discussed above, in at least some embodiments, the transmitting device 222 transmits one or more signals to the receiving device 224. The signals are received at each of the receive elements 232*e-h*. Because the receive elements are located at different distances from any one of the transmit elements 230*a-d*, the signals are received at each of the receive element 232*e-h* with different phases. Thus, phase difference information is generated, in some embodiments, that describes the differences in phase of signals received from one or more of the transmit elements 230*a-d* by the receive elements 230*e-h*.

In at least some embodiments, locations of each of the receive elements 230*e-h* are known. In other words, some embodiments store data indicating that receive element 230*e* is located in region 232*e*, receive element 230*f* is located in region 232*f*, receive element 230*g* is located in region 232*g*, and receive element 230*h* is located in region 232*h*. In another example embodiment, data indictive of the x, y, and z coordinates and the orientation of the receiving wireless device is stored. Based on these known locations of each of the receive elements 232*e-h*, some embodiments generate, for each of the plurality of regions 235, expected phase differences that would be experienced by the receiving device 224 resulting from a signal transmitted from each of the plurality of regions 235. Thus, in some embodiments, the transmitting device transmits at least one signal from each of the transmit elements 232*a-d*, which are received by at least two of the receive elements 230*e-h*. By comparing phase differences of the received signals to expected phase differences generated for each of the plurality of regions 235, the disclosed embodiments are able to identify in which region each of the transmit elements 232*a-d* are located.

Once locations of each of the transmit elements 230*a-d* is known (e.g. the regions 232*a-d* respectively), some of the disclosed embodiments determine an orientation of the transmitting device 222 based on the known locations of the transmit elements 230*a-d*.

Figure 2D:
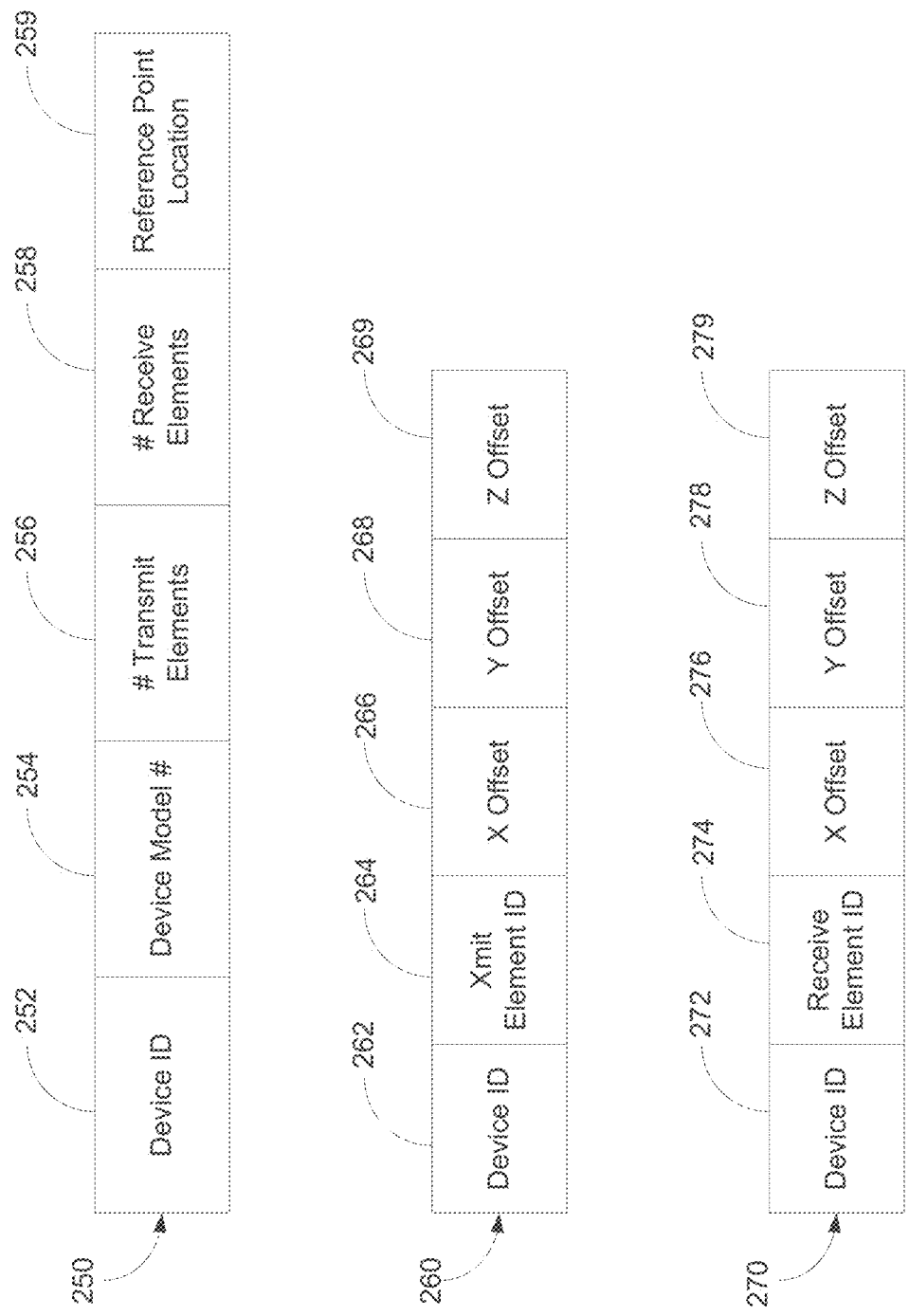
FIG. 2D shows example data structures implemented in one or more of the disclosed embodiments.

FIG. 2D shows example data structures implemented in one or more of the disclosed embodiments. While FIG. 2D describes these example data structures as relational database tables, other embodiments utilize other data architectures. For example, some embodiments use arrays, linked lists, trees, unstructured data stores, or other data structure architectures. FIG. 2D shows a device type table 250, transmit element table 260, and receive element table 270. The device type table 250 stores attributes of a particular device type. The device type table 250 includes a device type identifier field 252, device model number field 254, a number of transmit elements field 256, a number of receive elements field 258, and a reference point location field 259.

The device type identifier field 252 uniquely identifies a particular device type. In some embodiments, each device supported by the disclosed embodiments that differs in its number and/or relative position of transmit element or receive elements is assigned a unique device type identifier. The device model number field 254 stores a model number assigned to the device type (identified via field 252). The number of transmit elements field 256 defines a number of transmit elements supported by the indicated device type (e.g. field 252). The number of receive elements field 258 defines a number of receive elements supported by the indicated device type (e.g. field 252). The reference point location field 259 defines a location of a reference point of the device type. For example, the reference point location field 259 indicates whether the reference point is a centroid of the wireless device, a particular corner of the wireless device, or particularly where the reference point is located on the device.

The transmit element table 260 includes a device identifier field 262, transmit element identifier field 264, an x offset field 266, y offset field 268, and a z offset field 269. The device identifier field 262 uniquely identifies a particular device type, and is cross referenceable with the device type identifier field 252. The transmit element identifier field 264 identifies a particular transmit element. For example, some embodiments identify transmit elements via a numerical identifier (e.g. one (1), two (2), three (3), four (4), etc.). The x offset field 266 identifies an x coordinate of the identified transmit element. In some embodiments, the x offset field 266 identifies an x offset of a centroid of the identified transmit element, or a tip of the identified transmit element. The y offset field 268 identifies a y offset from the reference point of the identified transmit element (e.g. via field 264). In some embodiments, the y offset field 268 identifies a y offset of a centroid of the identified transmit element, or a tip of the identified transmit element. The z offset field 269 identifies a z offset from the reference point of the identified transmit element. In some embodiments, the z offset field 269 identifies a z offset of a centroid of the identified transmit element, or a tip of the identified transmit element.

The receive element table 270 includes a device identifier field 272, receive element identifier field 274, an x offset field 276, y offset field 278, and a z offset field 279. The device identifier field 272 uniquely identifies a particular device type, and is cross referenceable with the device type identifier field 252. The receive element identifier field 274 identifies a particular receive element. For example, some embodiments identify receive elements via a numerical identifier (e.g. one (1), two (2), three (3), four (4), etc.). The x offset field 276 identifies an x coordinate of the identified receive element. In some embodiments, the x offset field 276 identifies an x offset of a centroid of the identified receive element, or a tip of the identified receive element. The y offset field 278 identifies a y offset from the reference point of the identified receive element (e.g. via field 274). In some embodiments, the y offset field 278 identifies a y offset of a centroid of the identified receive element, or a tip of the identified receive element. The z offset field 279 identifies a z offset from the reference point of the identified receive element. In some embodiments, the z offset field 279 identifies a z offset of a centroid of the identified receive element, or a tip of the identified receive element.

Figure 3:
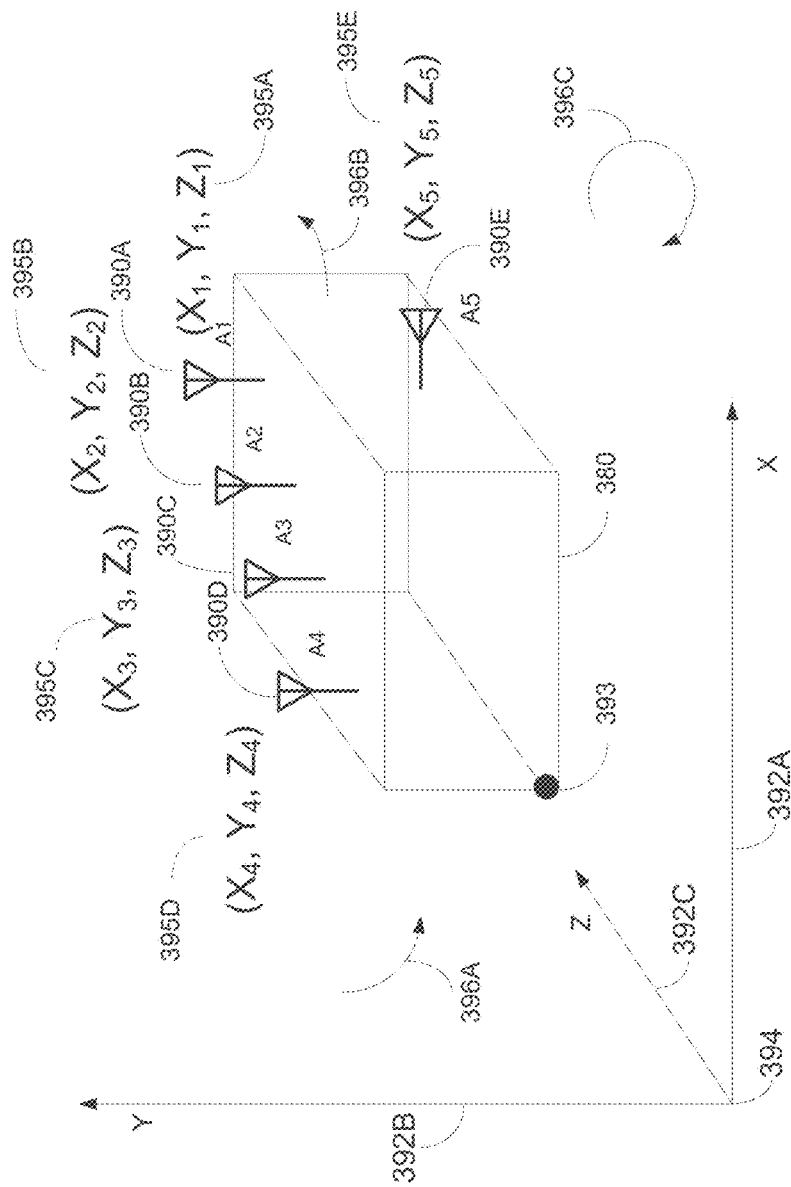
FIG. 3 shows an access point and relative positions of antennas of the access point.

FIG. 3 shows a wireless device and relative positions of antennas 390A-E of the wireless device. The wireless device 380 is shown within a three-dimensional space, delineated by three axes, X axis 392A, Y axis 392B and Z axis 392C.

Some of the disclosed embodiments utilize predefined spatial positions of antennas of a device such as the wireless device 380. Examples of these predefined spatial positions are illustrated with respect to FIG. 2D, the data structures of which are used, in some embodiments, to define positions or transmit elements and/or receive elements of a wireless device relative to a reference point of the device. In some embodiments, the predefined spatial positions of the antennas are relative positions. As discussed above, in some embodiments, the positions of the antennas are relative to, in some embodiments, a reference point on the device. In some embodiments, the reference point is one of the transmit elements or one of the receive elements of a device.

FIG. 3 shows an example reference point 393. Relative positions of antennas 390A-E are determined in some embodiments, relative to an origin of a three-dimensional axis, such as the three-dimensional axis represented by X axis 392A, Y axis 392B, and Z axis 392C. Thus, some embodiments place an origin location of the three-dimensional axis, shown in FIG. 3 as origin 394 over the reference point 393. Coordinates of each of the antennas 390A-E are then determined relative to the origin and/or reference point 394/393. These relative coordinates are shown in FIG. 3 as coordinates 395A-E. Some of the disclosed embodiments utilize the relative coordinates 395A-E of each of the antennas 390A-E to assist in determining a location and/or an orientation of the wireless device 380, as discussed below. For example, some embodiments determine a location of each antennas 390A-E of the wireless device 380. Based on the determined locations, and the relative coordinates 395A-E of the antennas, some of the disclosed embodiments determine the orientation of the wireless device 380.

FIG. 3 also shows direction of rotation in three dimensions. Rotation angle 396A shows a magnitude of rotation about the X axis 392A. Rotation angle 396B shows a magnitude of rotation about the Y axis 392B. Rotation angle 396C shows a magnitude of rotation about the Z axis 392C. Some of the embodiments move and rotate the relative positions of the antennas, represented by the coordinates 395A-E by a magnitude of rotation in each dimension, as shown by rotation angles 396A-C. This rotation is managed to determine an orientation of a device, as described further below.

Figure 4:
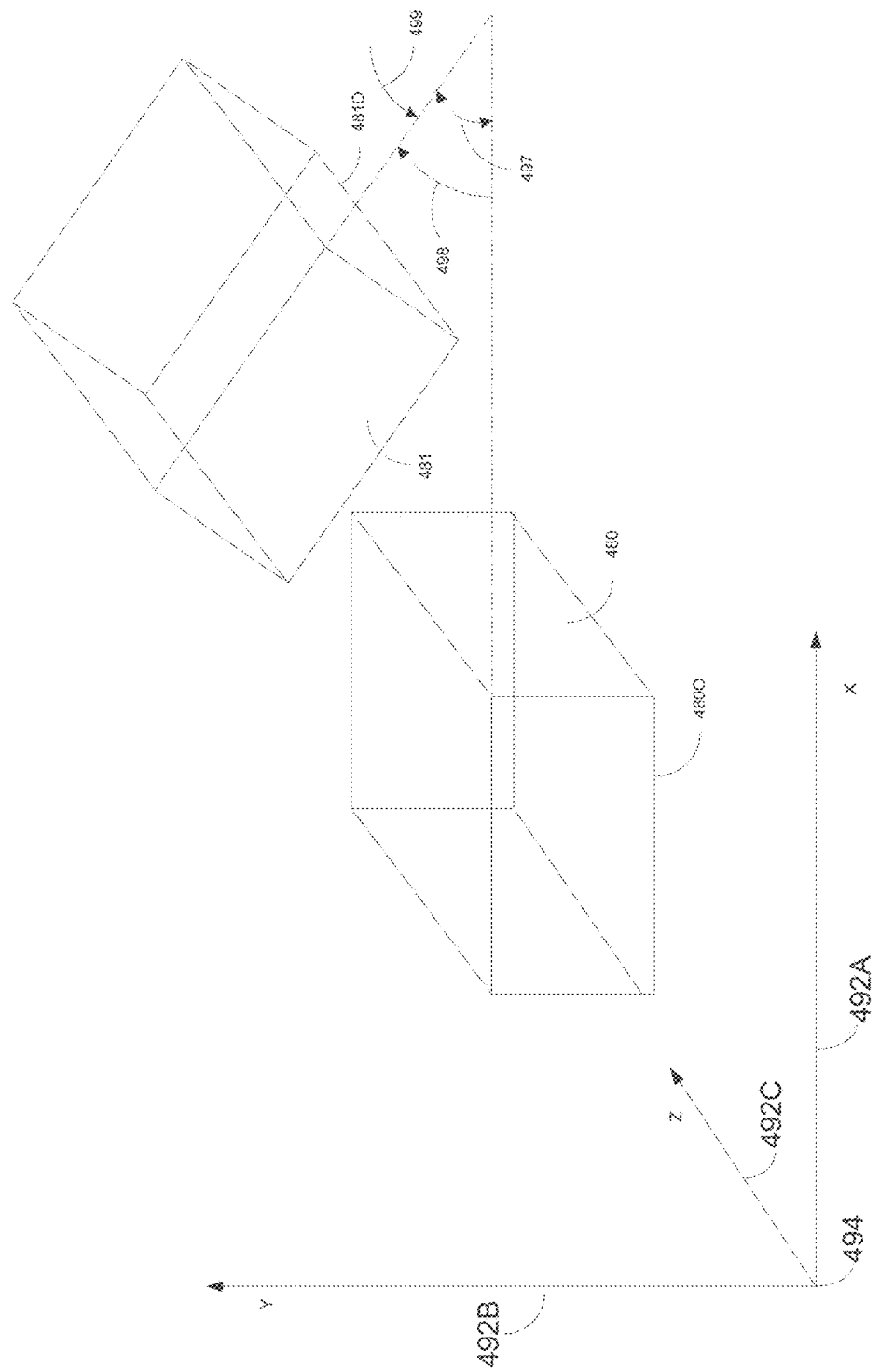
FIG. 4 shows misalignment between orientations of two devices.

FIG. 4 shows misalignment between orientations of two devices. FIG. 4 shows two wireless devices, wireless device 480 and wireless device 481. The two wireless devices are shown within a three dimensional space that is delineated by three axes, shown as X axis 492A, Y axis 492B, and Z axis 492C. The three axes meet at an origin point 494. One or more of the wireless devices are access points in some of the disclosed embodiments. One or more of the devices are wireless terminals in some of the disclosed embodiments. Wireless device 480 is shown in a first orientation 480O and wireless device 481 is shown in a second orientation 481O. The second orientation 481O has rotated the wireless device 481 about the Z axis 492C relative to the wireless device 480. FIG. 4 shows an angular difference between the first orientation 480O and second orientation 481O as angle 497. Angle 497 shows that first orientation 480O rotates the wireless device 481 about the Z axis in a direction indicated by angle 498 relative to the first orientation 480O of the wireless device 480. Some of the disclosed embodiments generate instructions to align orientations of two devices. For example, these embodiments generate instructions to rotate the wireless device 481 in the direction indicated by arrow 499 so as to cancel out the misalignment represented by the angle 497. While FIG. 4 shows a misalignment based on a rotation about the Z axis 492C in the three-dimensional space represented by FIG. 4, some embodiments align two devices across three axes of rotation. Such a misalignment is not illustrated here to maintain clarity of FIG. 4.

Figure 5:
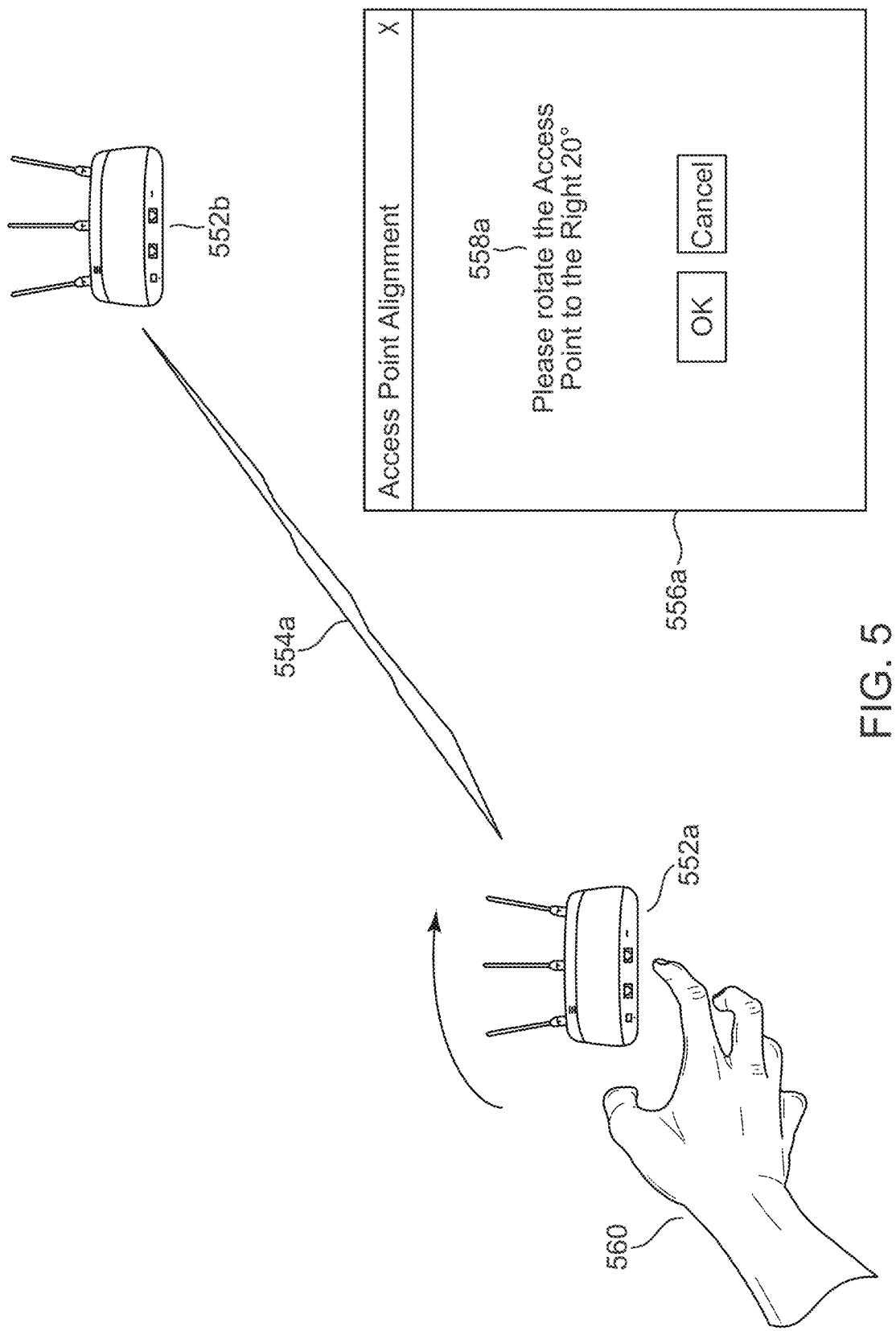
FIG. 5 shows a first wireless device alignment procedure.

FIG. 5 shows a first wireless device alignment procedure. FIG. 5 shows two wireless devices, a first wireless device 552a and a second wireless device 552b. In various embodiments, either or both of the wireless devices 552a-b are analogous to or equivalent to any of the APs discussed above. FIG. 5 shows signals 554a being exchanged between the first wireless device 552a and the second wireless device 552b. Based on the exchanged signals, at least some of the disclosed embodiments determine an orientation of the first wireless device 552a relative to the second wireless device 552b. Details of this orientation determination are explained further below. Some embodiments of this disclosure generate instructions to align an orientation of the first wireless device 552a with an orientation of the second wireless device 552b. To demonstrate, FIG. 5 shows an alignment dialog 556a, which displays instructions for aligning the orientation of the wireless device 552a with that of the wireless device 552b. In the example of FIG. 5, the instructions indicate the first wireless device 552a should be rotated to the right 20 degrees to better align with the second wireless device 552b. After the instructions 558a are displayed, a human 560 may rotate the first wireless device 552a according to the instructions. In some embodiments, after manual adjust of the orientation of the first wireless device, the updated orientation of the first wireless device is determined again, based, in some embodiments, on phase differences of signals received from the first wireless device by the second wireless device. Updated instructions are then generated, in some embodiments, based on the first wireless device's updated orientations alignment with the second wireless device.

Figure 6:
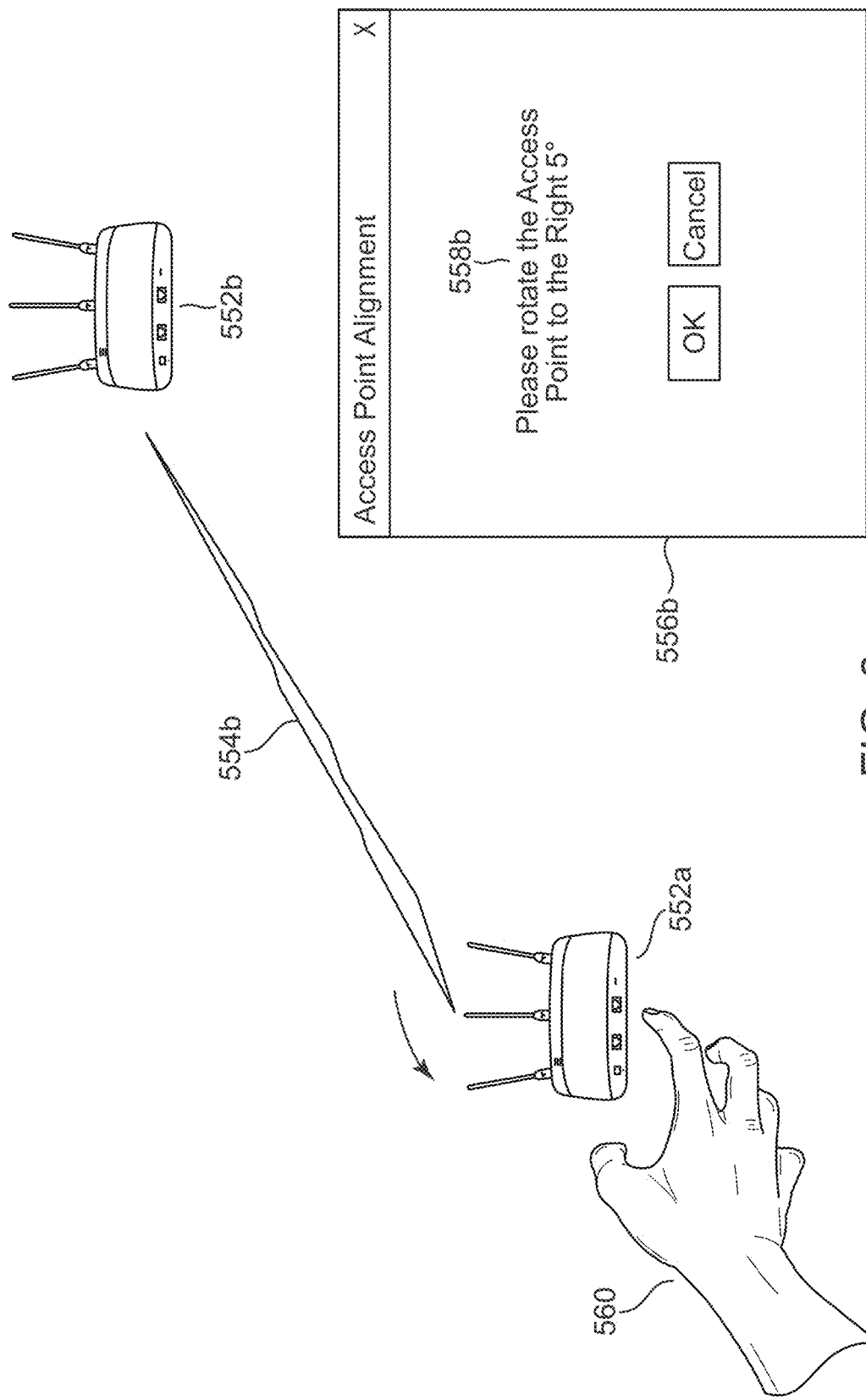
FIG. 6 shows a second wireless device alignment procedure.

FIG. 6 shows a second wireless device alignment procedure. FIG. 6 shows the same two wireless devices, the first wireless device 552a and the second wireless device 552b after the alignment procedure of FIG. 5 has been performed. Signals 554b are exchanged between the first wireless device 552a and the second wireless device 552b in order to determine an orientation of the first wireless device 552a relative to an orientation of the second wireless device 552b after the alignment procedure described by FIG. 5 has been performed. FIG. 6 shows that if the human 560 rotates the first wireless device 552a in excess of the 20 degrees specified by the first alignment procedure of FIG. 5, an additional alignment dialog 556b, (or, in other embodiments, via the alignment dialog 556a) additional instructions 558b requesting further alignment in the same (e.g. X) dimension (but an opposite direction or magnitude) as the alignment performed with respect to FIG. 5 are provided in at least some embodiments.

Figure 7:
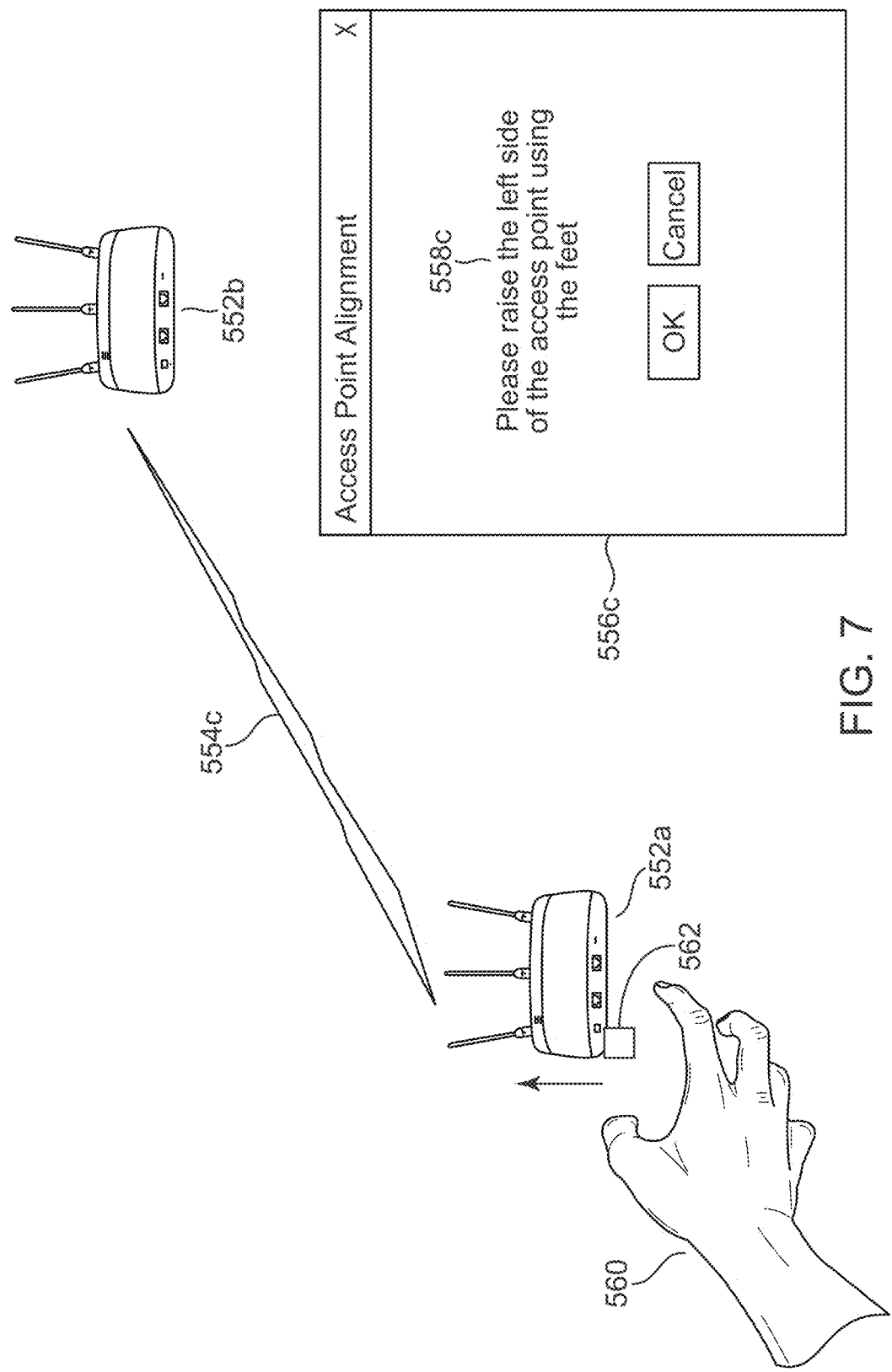
FIG. 7 shows a third wireless device alignment procedure.

FIG. 7 shows a third wireless device alignment procedure. FIG. 7 also shows the first wireless device 552a and the second wireless device 552b. Signals 554c are exchanged between the first wireless device 552a and the second wireless device 552b in order to determine an orientation of the first wireless device 552a relative to an orientation of the second wireless device 552b. An alignment dialog 556c displays instructions 558c that request a user to adjust the first wireless device 552a with respect to a second dimension, different than the first dimension adjusted with respect to FIGS. 5-6. In particular, the instructions 558c requests adjustment of the first wireless device such that a left side of the first wireless device 552a is higher relative to a right side of the first wireless device 552a. Some of the disclosed wireless devices provides adjustable legs (e.g. leg 562) to facilitate alignment of the wireless device about each of a yaw (Y), pitch (X), and roll (Z) axes. FIG. 7 demonstrates that the contemplated alignment process can generate instructions to align a wireless device, and validate those alignments, in at least three dimensions.

While FIGS. 5-7 describe a manual alignment procedure of a wireless device, with the manual alignment driven by instructions generated by the disclosed embodiments, other embodiments provide for alignment of a wireless device's orientation without manual intervention. For example, some embodiments of a wireless device are configured with electric motors capable of changing an orientation of a wireless device about each of a X, Y, and Z axis. In these embodiments, the differences in orientation between two devices is provided to an orientation controller included in one of the devices. The orientation controller is configured to adjust the orientation of the electric motors as necessary to place the first wireless device in an orientation consistent with the orientation of the second wireless device. In some embodiments, the first and/or second wireless devices are configured to be ceiling mountable. In these embodiments, the orientation controller is configured to control an orientation of the first wireless device with respect to the orientation of the second wireless device and the ceiling such that the first and second wireless devices orientations are aligned.

Figure 8:
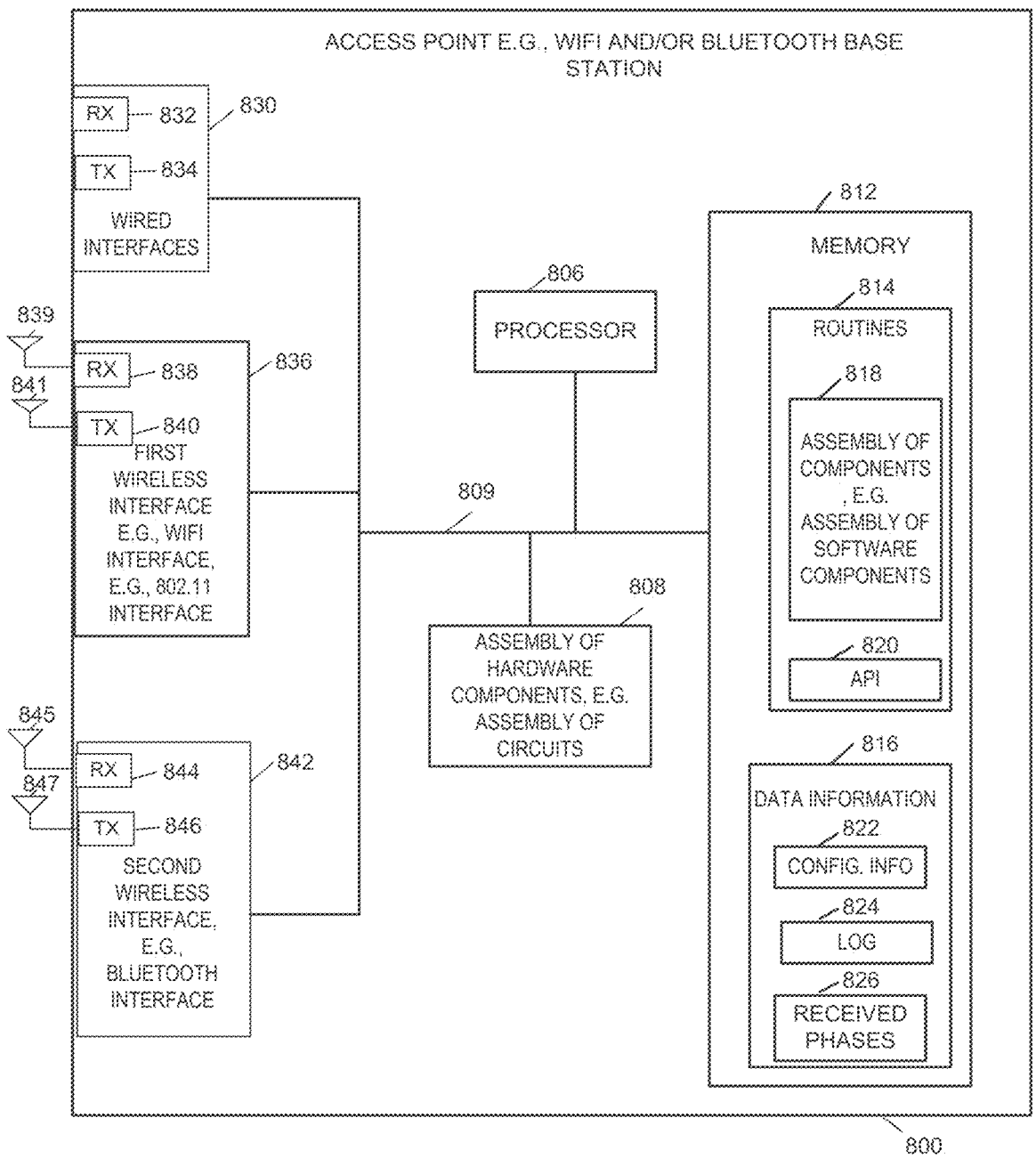
FIG. 8 is a block diagram of an example access point in accordance with one or more of the disclosed embodiments.
Figure 9:
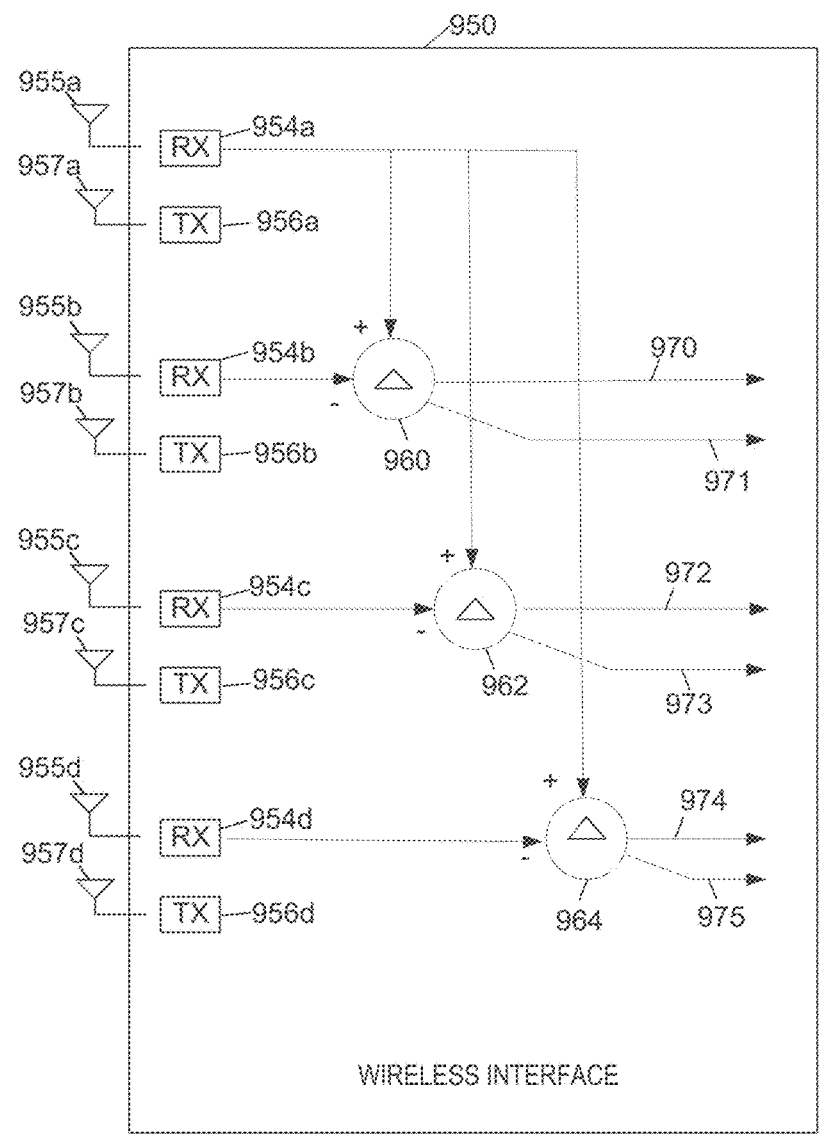
FIG. 9 shows an example of a wireless interface, such as any one or more of the interfaces of FIG. 8.

FIG. 8 is a block diagram of an example access point 800 (e.g., any one or more of access points AP 142a-d) in accordance with one or more of the disclosed embodiments. Access point 800 includes wired interface 830, wireless interfaces 836, 842, a hardware processor 806, e.g., a CPU, one or more hardware memories 812, and an assembly of components 808, e.g., assembly of hardware components, e.g., assembly of circuits, coupled together via a bus 809 over which the various elements may interchange data and information. Wired interface 830 includes a receiver 832 and a transmitter 834. The wired interface 830 couples the access point 800 to a network 134 (e.g. the Internet) of FIG. 1. First wireless interface 836, (e.g., a Wi-Fi interface, or an 802.11 interface), includes receiver 838 coupled to receive antenna 839, via which the access point may receive wireless signals from communications devices, e.g., wireless terminals, and transmitter 840 coupled to a transmit antenna 841. The access point transmits, via the transmit antenna 841, wireless signals to communications devices, e.g., wireless terminals. Second wireless interface 842, e.g., a Bluetooth interface, includes receiver 844 coupled to an antenna 845, via which the access point may receive wireless signals from communications devices, e.g., wireless terminals, and transmitter 846 coupled to a transmit antenna 847 via which the access point may transmit wireless signals to communications devices, e.g., wireless terminals. To simplify the illustration, only a single antenna, e.g., antenna 845, is shown connected to receiver 844. In some contemplated deployments, the system utilizes multiple receive antennas and processes the received signals to obtain the difference in phase between the signals received on any pair of antennas. FIG. 9 provides greater details of this phase processing. Wireless interfaces e.g., 836 and or 842, may, and usually do, include phase difference determination component as explained in greater details with reference to FIG. 9 below.

The one or more hardware memories 812 include routines 814 and data/information 816. Routines 814 include assembly of components 818, e.g., an assembly of software components, and Application Programming Interface (API) 820. Data/information 816 includes configuration information 822, device status log including error events and normal events captured as messages in a system log or an error log 824 and a dynamic list of measured arrival phase values 826 which identifies the relative arrival phase at different antennas of one AP of signals transmitted from a second AP. In accordance with another example embodiment the memory stores the phase difference between signals arriving at any antenna pairs (not shown).

FIG. 9 is a view 900 showing an example of a wireless interface 950, such as any one or more of the interfaces 836 or 842 of FIG. 8. In this illustrative example shows an interface with four receivers 954a, 954b, 954c, and 954d connected to four receiver antennas 955a, 955b, 955c, and 955d accordingly. Similarly, four transmitters 956a, 956b, 956c, and 956d are connected to four transmitter antennas 957a, 957b, 957c, and 957d.

Those skilled in the art should recognize that the disclosed embodiments can have any number of receivers (and their associated antennas) and any number of transmitters (and their associated antennas), and the number of transmitters and receivers does not need to be the same. In some embodiments, a waveform as received by antenna 955a and receiver 954a serves as a reference. Various embodiments can choose any antenna of a receiving device as a reference. The reference is fed into phase differentiators 960, 962 and 964. The other inputs of the phase differentiators are connected to the outputs of receivers 954b, 954c, and 954d respectfully. The phase differentiators detect the difference between the phases of the reference signal and the waveforms received via antennas 955b, 955c, and 955d and their corresponding receivers 954b, 954c, and 954d.

The output 970, 972, and 974 of phase differentiators 960, 962, and 964 provides the phase differences:

$$PD_i = \text{Phase}(\text{Ref}) - \text{Phase}(\text{Signal}_i) \quad \text{Equ.1}$$

where:
$PD_i$—Phase difference between reference waveform and waveform from the $i^{th}$ receive element
Phase (Sig(Ref))—the phase of the reference signal,
Phase($\text{Signal}_i$)—the phase of the $i^{th}$ waveform arriving at the $i^{th}$ receive element.

Due to uncertainty as to whether the waveform from the transmitter arrived first at the reference receive element or at the $i^{th}$ receive element, the differentiator also produces a 360 degree complement of the phase differences at its outputs 971, 973, and 975. Specifically:

$$CPD_i = 360 - PD_i \quad \text{Equ.2}$$

where:
$CPD_i$ 360 degrees complement of the $i^{th}$ phase differences,
$PD_i$ Phase difference between reference waveform and waveform from receive element i In some embodiments with n receive element pairs, n independent phase differences are generated. In some embodiments, these phase differences are represented by an n dimensional vector such as:

$$PDV = [p_1, p_2, p_3, \ldots p_n] \quad \text{Equ. 3}$$

where:
PDV received phase differences vector, and
$p_i$—phase difference between the reference waveform and the $i^{th}$ signal.

Accordingly the complementary received phase difference vector is given by:

$$CPDV = [360-p_1, 360-p_2, 360-p_3, \ldots 360-p_n] \quad \text{Equ. 4}$$

While Equation 3 and Equation 4 demonstrate generation of a phase difference for a waveform of a single frequency, some embodiments include phase differences expected from signals of different frequencies. Thus, a first set of $p_i$, where $i \leq n$ define expected phase differences of waveforms at a first frequency, and a second set of $p_i$ where $n<i<m$ define expected phase differences of waveforms at a second frequency. This can be repeated for more than two frequencies, as this simply operates as an example.

Thus, expected phase differences generated by various embodiments include those expected phase differences generated according to Equation 2 and/or Equation 3. As explained in greater detail below, the location of the wireless transmitter is determined by comparing the components of expected phase differences with the measured phase difference. If the expected phase differences include both a phase difference and its complement, then the wireless receiver needs only to produce the measured phase difference (and does not need to produce the complement of the measured difference). However, if the signature does not include the complementary phase differences, then the differentiators need to produce both the measured phase differences and their complements.

Figure 10:
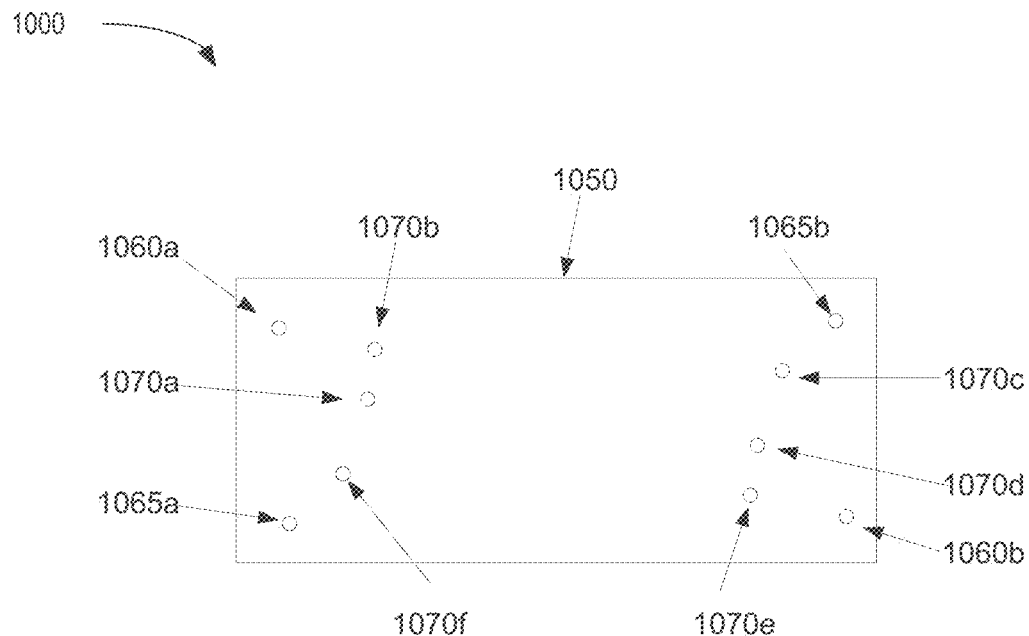
FIG. 10 shows an example top physical view of an example AP.

FIG. 10 shows an example top physical view 1000 of an example AP 1050. The example AP 1050 includes a plurality of antennas, labeled as antenna 1060a, antenna 1060b, antenna 1065a, antenna 1065b, and antennas 1070a-f. In an example embodiment, antenna 1060a and antenna 1060b are used to monitor and control the radio e.g., Wi-Fi, network. In the example embodiment, antennas 1065a and 1065b are used for communication in the 5.4 GHz band between the AP and user equipment UE, such as WT. In the example embodiment, antennas 1070a-f are used for communication in the either the 2.4 GHz or the 5.4 GHz bands between the AP and user equipment UE, such as WT. Some embodiments use these antennas to determine the distances between any transmitting antenna on a first AP and a receiving antenna on a second AP as well as the distances between any transmitting antenna on a second AP and a receiving antenna on a first AP. The distances are determined based on the difference in arrival phase values of signals in one or multiple antenna pairs communicated over one or more frequency bands. A detailed explanation of how the distances between the various pairs of transmitter/receiver antennas are calculated is provided in the Phase Differences Application.

Any one of the antennas is used for transmitting and receiving signals that facilitate estimation of a position and orientation of one AP with respect to another.

Figure 11:
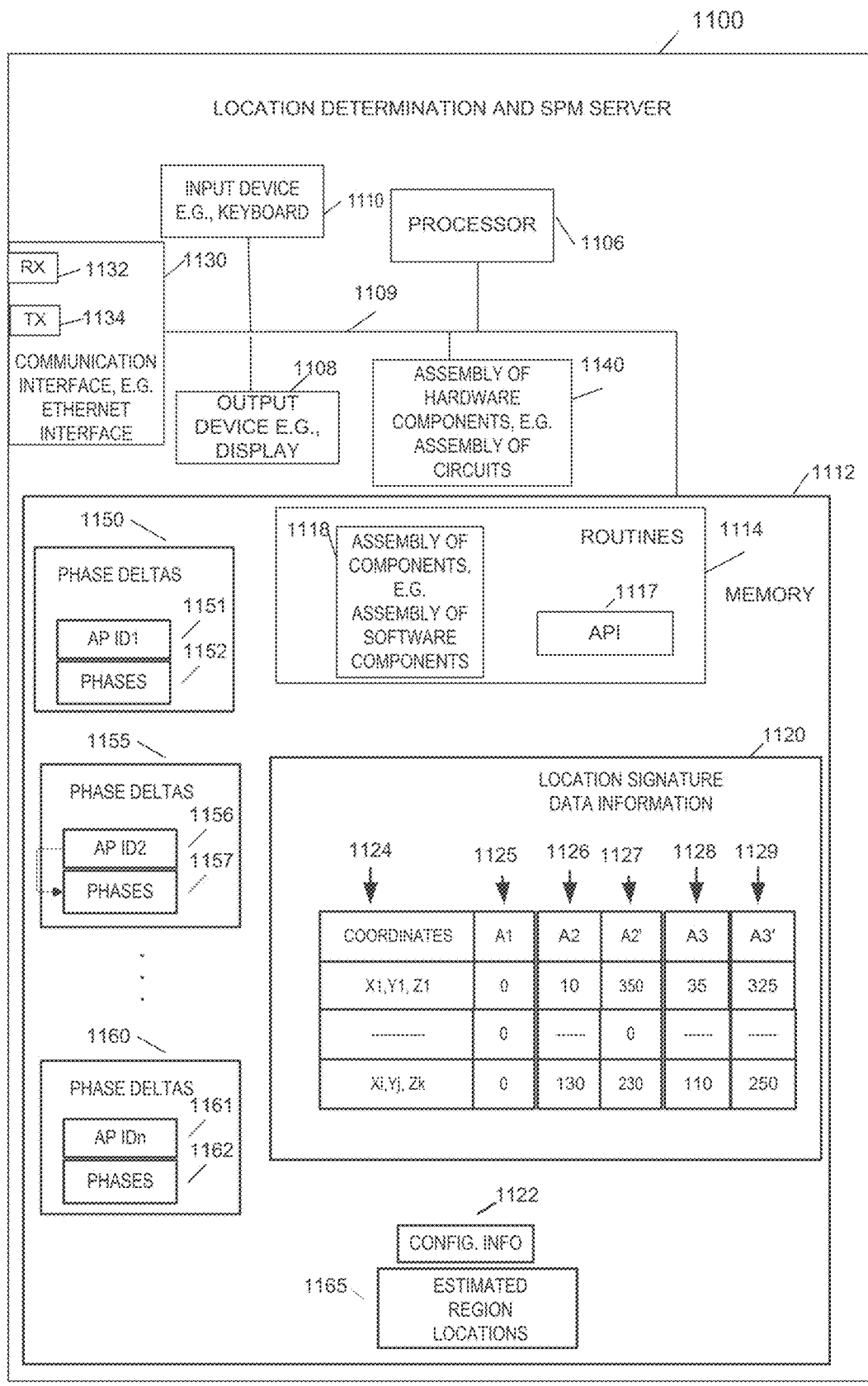
FIG. 11 is a block diagram of an example of a location determination and site provisioning manager (SPM) apparatus.

FIG. 11 is a block diagram of an example of a location determination and SPM apparatus 1100. In some embodiments, the location determination and SPM apparatus 1100 is a network node, e.g., a location and orientation server such as automated device locations determination server. In some embodiments, the location determination and SPM apparatus 1100 of FIG. 11 is the location and orientation server 165 of FIG. 1 In some embodiments the location determination and SPM apparatus 1100 is located in the cloud or is part of an access point such as any one of the access points or devices shown in FIG. 1.

Location determination and SPM apparatus 1100 includes a communications interface 1130, a hardware processor 1106, an output device 1108, e.g., display, printer, etc., an input device 1110, e.g., keyboard, keypad, touch screen, mouse, etc., one or more hardware memories 1112 and an assembly of components 1140, e.g., assembly of hardware components, e.g., assembly of circuits, coupled together via a bus 1109 over which the various elements may interchange data and information. The communications interface 1130 includes an Ethernet interface in some embodiments. Communications interface 1130 couples the location determination and SPM apparatus 1100 to a network and/or the Internet. Communications interface 1130 includes a receiver 1132 via which the location and orientation server apparatus can receive signals from wireless transmitters, and a transmitter 1134, via which the location determination and SPM apparatus 1100 can send data and information, e.g., information regarding location of various wireless transmitter to the transmitters themselves, to any other network attached server such as the network management server, etc.

The one or more hardware memories 1112 includes routines 1114 and location signature data/information 1120. Routines 1114 include assembly of components 1118, e.g., an assembly of software components, and Application Programming Interface (API) 1117. In some embodiments, routines 1114 define software that implement methods for generating instructions to guide positioning and orienting of an AP to a defined position and orientation that is aligned with a position and orientation of a reference AP. In some embodiments, the routines determine the location and orientation of each AP in reference to the reference AP and use this information to determine the location of other mobile devices such as UEs shown n FIG. 1 or other WT. Location signature data/information 1120 includes, region coordinates 1124. Depending on the specific application the coordinates can have a single dimension (for locating a wireless transmitter along a specific straight path), two dimensions (for locating a device in a two dimensional plan such as on a floor of an enterprise), or three dimensions (for locating a wireless device within a three dimensional volume such as a device on a specific shelf in a storage room).

As explained below at a greater detail, location signature data/information 1120 also includes columns 1125, 1126, 1127, 1128, and 1129, each column indicative of a relative phase of a waveform expected to be received from a specific region by a specific receive element e.g., A1, A2, A2', A3, and A3'. In this illustrative example, receive element A1 is selected to be the reference receive element and is assigned a phase difference of 0 (with respect to itself). The phases of the signals received by the other receive elements are measured with reference to the waveform (e.g. reference phase) received by receive element A1. Though the example illustrates only the phases differences of signals received by receive elements A1, A2, and A3, those skilled in the art should recognize that various embodiments will utilize any number (smaller or larger) of receive element pairs. In some embodiments, antenna element A2 can be selected to be another reference antenna resulting in additional phase differences between signals received by antennas A2-A3, A2-A4, etc. Consequently, the number of columns in the location signature data/information would increase or decrease accordingly. Columns 1126 and 1128 provide the phase difference assuming that the waveform from a wireless transmitter located in a specific region arrived first at the reference receive element and then at the corresponding $i^{th}$ receive element. Columns 1127 and 1129 provide the 360 degrees complementary phase difference assuming that the waveform from a wireless transmitter located in a specific region arrived first at the corresponding $i^{th}$ receive element and then at the reference receive element.

As explained above, the wireless interface 950 of FIG. 9 generates 360 degrees complement phase difference when the location signature does not include a column with the 360 degrees complement phase difference signature.

The one or more hardware memories 1112 also include configuration information 1122 which includes operational parameters that are either programmed into the system or entered by the system administrator.

The one or more hardware memories 1112 also include example phase delta tables 1150, 1155, and 1160 containing phase difference information. In some embodiments, the tables include a 360 degree complementary phase difference information. In some embodiments, the information in the tables is refreshed periodically, (e.g., once every second), to reflect an updated position of the wireless device, e.g., transmitter.

Phase delta tables 1150, 1155, and 1160 include the IDs 1151, 1156, through 1161 of the wireless transmitters from which a received waveform was transmitted and for which phase deltas were measured. The tables also include phase deltas information 1152, 1157, through 1162 measured between signals arriving at any antenna pair and.

Some embodiments consider a phase delta measurement error, which may vary by embodiment. In some embodiments, the phase delta measurement error is configurable, or is dynamically determined. An example phase delta measurement error is ±ten (10) degrees. The measurement error can be either fixed (e.g. hard coded) or configured via a user interface as one of the configuration information 1122. In operation, the measured phase difference information is compared against the expected phase difference information (or its 360 complement) for a particular region (the expected phase difference of each region). In some embodiments, the measured phase differences are considered to match the expected phase differences if they fall within a predefined error tolerance level. If the phase differences match those expected in a region, some embodiments determine that the wireless antenna is possibly located in that region. In some cases, multiple regions are identified as a possible location for an antenna. These one or more identified regions are represented by regions 1165. In some embodiments, a location signature vector is generated to store expected phase differences for a region. Such a vector is given by $$LSIV(x,y,z)=[S_1,S_2,S_3, \ldots ,S_n] \qquad \text{Equ. 5}$$

where:
LSIV(x,y,z) location signature vector contains expected phase differences based on a signal from a transmitter located at x, y, z, and
$s_i$ $i^{th}$ element of the location signature vector. Each element of the vector represents a phase difference of a signal at two different antennas.

Some embodiments determine whether a measured set of phase differences "matches" an expected set of phase differences for a particular region based on Equation 6 below:

$$abs(si-pi)<threshold \qquad \text{Equ. 6}$$

where:
abs the absolute value function,
si $i^{th}$ component of an expected phase difference vector,
pi $i^{th}$ component of an example measured phase difference vector, and
i i is an index that runs from 0<i<n, where n is dimension of the phase difference vector which depends on the number of antenna pairs and the number of frequencies employed.

Figure 12:
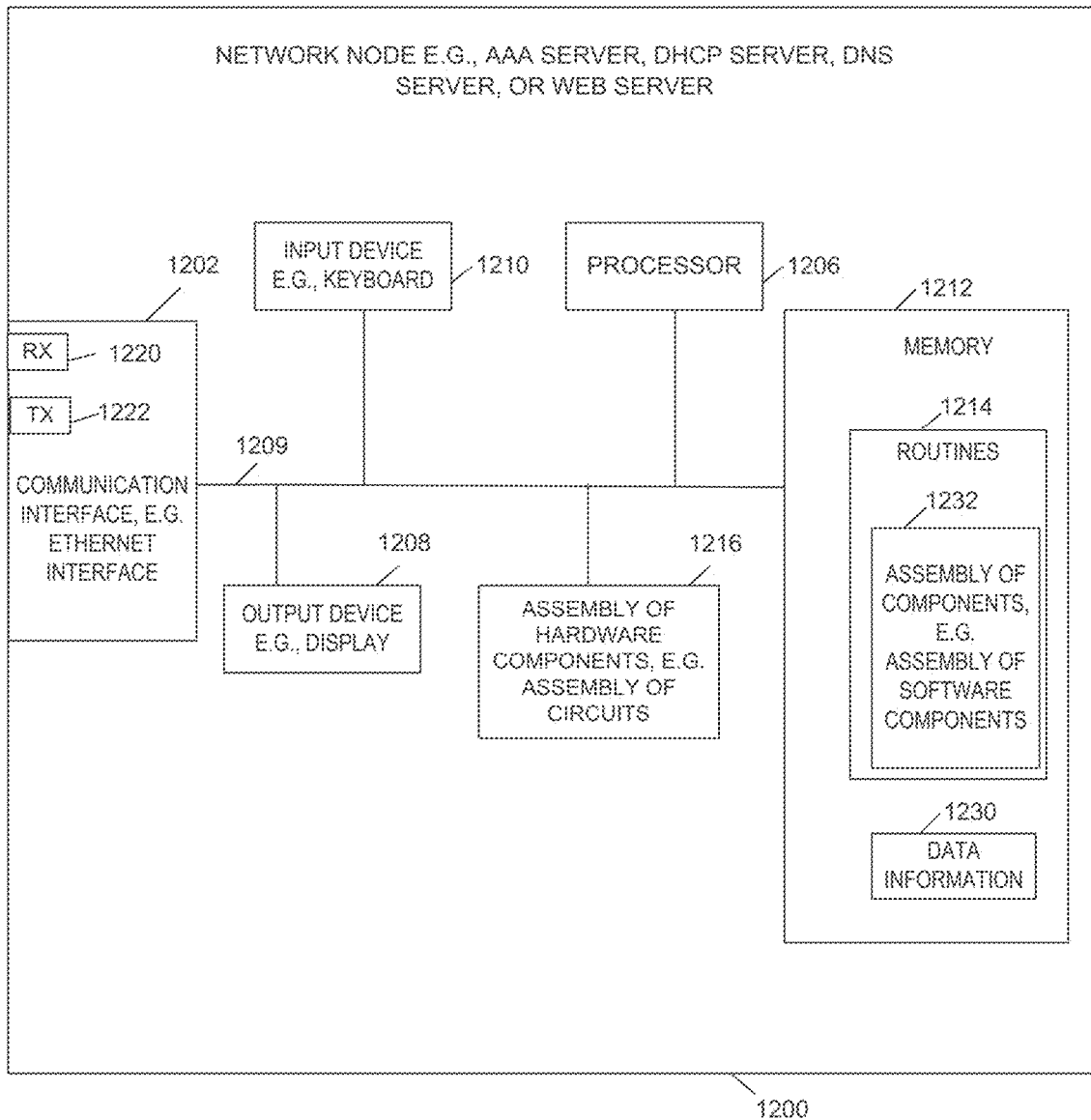
FIG. 12 is a block diagram of an example of a network node.

FIG. 12 is a block diagram of an example of a network node 1200. In some embodiments, the network node 1200 is a device or a server attached to the network 134. In some embodiments, network node 1200 of FIG. 12 represents any one or more of server 110, 116, 122, 128, 136 of FIG. 1, and/or any one or more of the routers 185, and/or the switches 180 of FIG. 1. Network node 1200 includes a communications interface 1202, (e.g., an Ethernet interface), a hardware processor 1208, an output device 1206, (e.g., display, printer, etc.), an input device 1210, (e.g., keyboard, keypad, touch screen, mouse), one or more hardware memories 1212, and an assembly of components 1216 (e.g., one or more of an assembly of hardware modules, assembly of circuits), coupled together via a bus 1209 over which the various elements may interchange data and information. Communications interface 1202 couples the network node 1200 to a network and/or the Internet. Though only one interface is shown, those skilled in the art should recognize that routers and switches may, and usually do, have multiple communication interfaces. Communications interface 1202 includes a receiver 1220 via which the network node 1200, e.g. a server, can receive data and information, e.g., including operation related information, e.g., registration request, AAA services, DHCP requests, Simple Notification Service (SNS) look-ups, and Web page requests, and a transmitter 1222, via which the network node 1200, e.g., a server, can send data and information, e.g., including configuration information, authentication information, web page data, etc.

Memory 1212 includes routines 1214 and data information 1230. Routines 1214 include an assembly of components 1232, e.g., an assembly of software components. The data information 1230 includes a system log and/or an error log.

Figure 13:
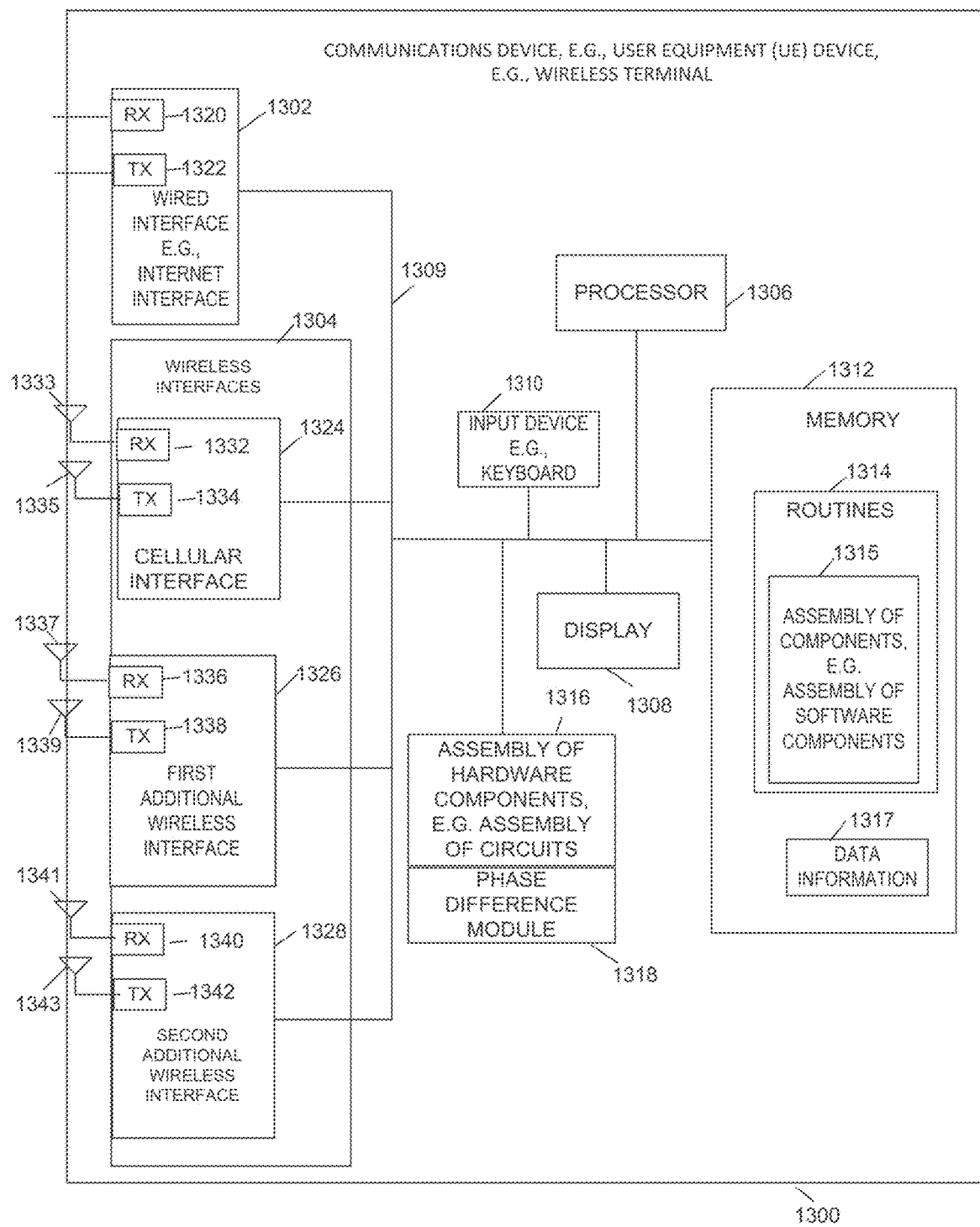
FIG. 13 is a block diagram of an example communications device.

FIG. 13 is a block diagram of an example communications device. In some embodiments, the communications device 1300 is user equipment (UE), such as any of the devices UE 1 138, . . . , UE Z 140, UE 1' 146, . . . , UE Z' 148 discussed in greater above. Communications device 1300 includes wired interfaces 1302, wireless interfaces 1304, a hardware processor 1306, (e.g., a CPU), an electronic display 1308, an input device 1310, one or more hardware memories 1312, and an assembly of components 1316, e.g., assembly of hardware module, e.g., assembly of circuits, coupled together via a bus 1309 over which the various elements may interchange data and information. Wired interface 1302 includes a receiver 1320 and a transmitter 1322. The wired interface 1302 couples the communications device 1300, e.g. a UE, to a network 134 (e.g. the Internet) of FIG. 1.

The wireless interface 1304 includes cellular interface 1324, first wireless interface 1326, (e.g., 802.11 Wi-Fi interface), and a second wireless interface 1328 (e.g., a Bluetooth interface). The cellular interface 1324 includes a receiver 1332 coupled to a receiver antenna 1333 via which the communications device 1300, e.g. UE, may receive wireless signals from a wireless device, such as any of the access points 142*a*-*d*, and transmitter 1334 coupled to a transmit antenna 1335 via which the communications device 1300, e.g. UE, may transmit wireless signals to a wireless device, such as any of the APs 142*a*-*d*. First wireless interface 1326, e.g., a Wi-Fi interface, e.g. 802.11 interface, includes receiver 1336 coupled to receive antenna 1337, via which the communications device 1300, e.g., UE, may receive wireless signals from communications devices, e.g., APs, and transmitter 1338 coupled to a transmit antenna 1339 via which the communications device 1300, e.g., UE, may transmit wireless signals to communications devices, e.g., APs. The second wireless interface 1328, e.g., a Bluetooth interface, includes receiver 1340 coupled to receive antenna 1341, via which the communications device 1300, e.g. a UE, may receive wireless signals from communications devices, e.g., APs, and transmitter 1342 coupled to a transmit antenna 1343 via which the communications device 1300, e.g., a UE, may transmit wireless signals to communications devices, e.g., APs.

Memory 1312 includes routines 1314 and data/information 1317. Routines 1314 include assembly of components 1315, e.g., an assembly of software components. Data/information 1317 may include configuration information as well as any additional information required for normal operations of communications device 1300. Data information includes also system log or error log.

Figure 14:
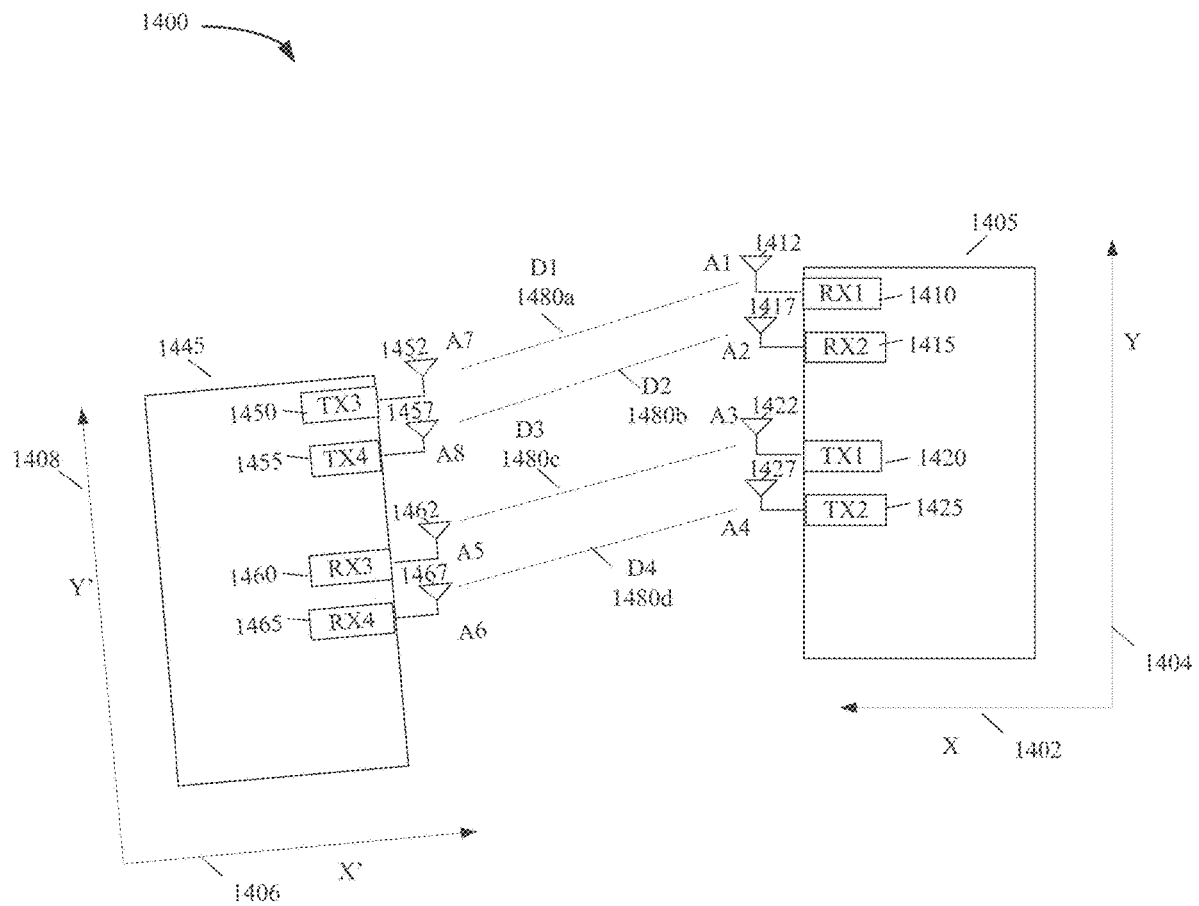
FIG. 14 shows an example misalignment between orientations of two wireless devices.

FIG. 14 shows an example misalignment 1400 between orientations of two wireless devices. The two wireless devices include a first wireless device 1405 and a second wireless device 1445. In some embodiments each of the two wireless devices are access points. A position and orientation of the wireless device 1405 is known. Moreover, the position and orientation of the wireless device AP 1405 is known or is aligned with respect to a first coordinate system, represented by X axis 1402 and Y axis 1404. The first wireless device 1405 is aligned with the first coordinate system in that predefined fixed locations or features of the first wireless device 1405 (e.g. one or more of corners of the second wireless device 1445, one or more antenna locations of the second wireless device 1445, etc.) have particular coordinates within the first coordinate system. In some embodiments, the wireless device 1405 defines a first plurality of regions (e.g. the plurality of regions illustrated in any of FIGS. 2A-C) based on its orientation with the first coordinate system.

First wireless device 1405 includes a plurality of radio receivers including RX1 1410, RX2 1415 and their associated antennas A1 1412 and A2 1417. Reference AP 1405 also includes transmitters TX1 1420 and TX2 1425 and their associated antennas A3 1422 and A4 1427. Second AP 1445 has a plurality of radio receivers RX3 1460, RX4 1465 and their associated antennas A5 1462 and A6 1467. The second wireless device 1445 also includes transmitters TX3 1450 and TX4 1455 and their associated antennas A7 1452 and A8 1457. FIG. 14 illustrates that an orientation of the second wireless device 1445 is aligned with a second coordinate system, including an X' axis 1406 and Y' axis 1408. Second AP 1445 is aligned with the second coordinate system in that predefined fixed locations or features of the second wireless device 1445 (e.g. corners of the second AP 1445, one or more antenna locations of the second AP 1445, etc.) have particular coordinates within the second coordinate system.

While FIG. 14 illustrates wireless devices with distinct and separate transmission and receiving antennas, some embodiments utilize a single antenna for both transmission and receiving of a signal. In such an embodiment, antennas 1412 and 1422 are the same physical antenna. Similarly, in these embodiments, antennas 1417 and 1427 are the same, antennas 1452 and 1462 are the same, and antennas 1457 and 1467 are the same.

FIG. 14 shows exchanged signals 1480a between antennas 1452 and 1412, exchanged signals 1480b between antennas 1457 and 1417, exchanged signals 1480c between antennas 1462 and 1422, and exchanged signals 1480d between antennas 1467 and 1427. These signals may be any waveform, including but not limited to cellular waveforms, sound waveforms, Wi-Fi waveforms, optical waveforms, or Bluetooth waveforms, in various embodiments. In some embodiments, signals are transmitted by the first wireless device 1405 and received by the second wireless device 1445. In some embodiments, signals are transmitted by the second wireless device 1445 and received by the first wireless device 1405. FIG. 14 also shows distances between each of these antenna pairs as distances D1-D4. For sake of simplifying the explanation the figure (and associated explanation) does not show that using the same methodology the system also determines the distances between transmitting A7 and receiving antenna A2, the distance between transmitting A8 and receiving antenna A1, as well as the distances between transmitting A3 and receiving antenna A6, and the distance between transmitting A4 and receiving antenna A5.

The disclosed embodiments determine phase differences between signals received via different pairs of antennas originating from a specific transmitting antenna. For example, some embodiments may transmit a signal from antenna 1452 and measure a phase difference between the signals as received by each of the antennas 1412 & 1417. A second signal is transmitted from antenna 1457 and a phase difference between the second signal as received by antenna pair 1412 & 1417. A third signal is transmitted from antenna 1422 and a phase difference of the signal as received by antennas 1462 & 1467, or a fourth signal is transmitted from antenna 1427 and a difference of the fourth signal as received by each of the antennas 1462 & 1467 is determined.

When the signals are received, differences in the phases of the received signals are measured, and using, in some embodiments, the phase differences between signals received at different antennas, are used to determine the region (location) of the transmitting antenna and estimate distances between pairs of transmitting and receiving antennas. Some embodiments determine a plurality of location/region estimates for each transmitting antenna, with each location/region in the plurality of locations/regions based on a different signal frequency used to estimate the respective distance. Some embodiments determine a plurality of distance estimates for each antenna pair, with each distance in the plurality of distances based on a different signal frequency used to estimate the respective distance.

Some of the disclosed embodiments determine expected phase differences for each of the regions. In some embodiments, the phase differences are stored as a vector or signature of phase differences between signals received by a plurality of antenna pairs, and for signals at one or more frequencies. In some embodiments, the expected phase differences are determined according to Equation 1. In some embodiments, each individual expected phase difference corresponds to a particular transmitting antenna, a specific receiving antenna pair, and a specific signal frequency.

The difference between arrival phases of signals originating from each transmitter (and at each signal frequency) are measured and compared against expected phase differences associated with a transmitted in a plurality of regions. In one example embodiment, differences between the measured phase differences and the expected phase differences are assumed to have a Gaussian distribution. Based on this assumption, a probability is assigned to each determined difference. A composite probability that the transmitting antenna is in a specific region is then determined by aggregating the probabilities associated with each phase difference measurement for all signals received by the antenna pairs and for all of the signals at different frequencies. In other embodiments, the probabilities are generated based on a distribution other than a Gaussian distribution.

Some of the disclosed embodiments rely on physical locations of antennas on a particular access point to determine an orientation of a wireless device with respect to another wireless device. For example, some embodiments may define a center position of a wireless device as a center of a coordinate system (e.g. coordinate (0,0,0)). Positions of each antenna of the wireless device are then located within the coordinate system based on their well-known locations. For example, if a particular antenna is 3 cm along the X dimension direction from the center position of the wireless device, the antenna is assigned a position in the coordinate system consistent with its offset from the center position of the wireless device. Thus, each wireless device has associated with it, in some embodiments, coordinates of each antenna of the wireless device within its respective coordinate system. When an orientation of a wireless device is determined, the physical location information for its antennas is used to determine the wireless device's orientation based on the estimated positions of its antennas.

Figure 15A:
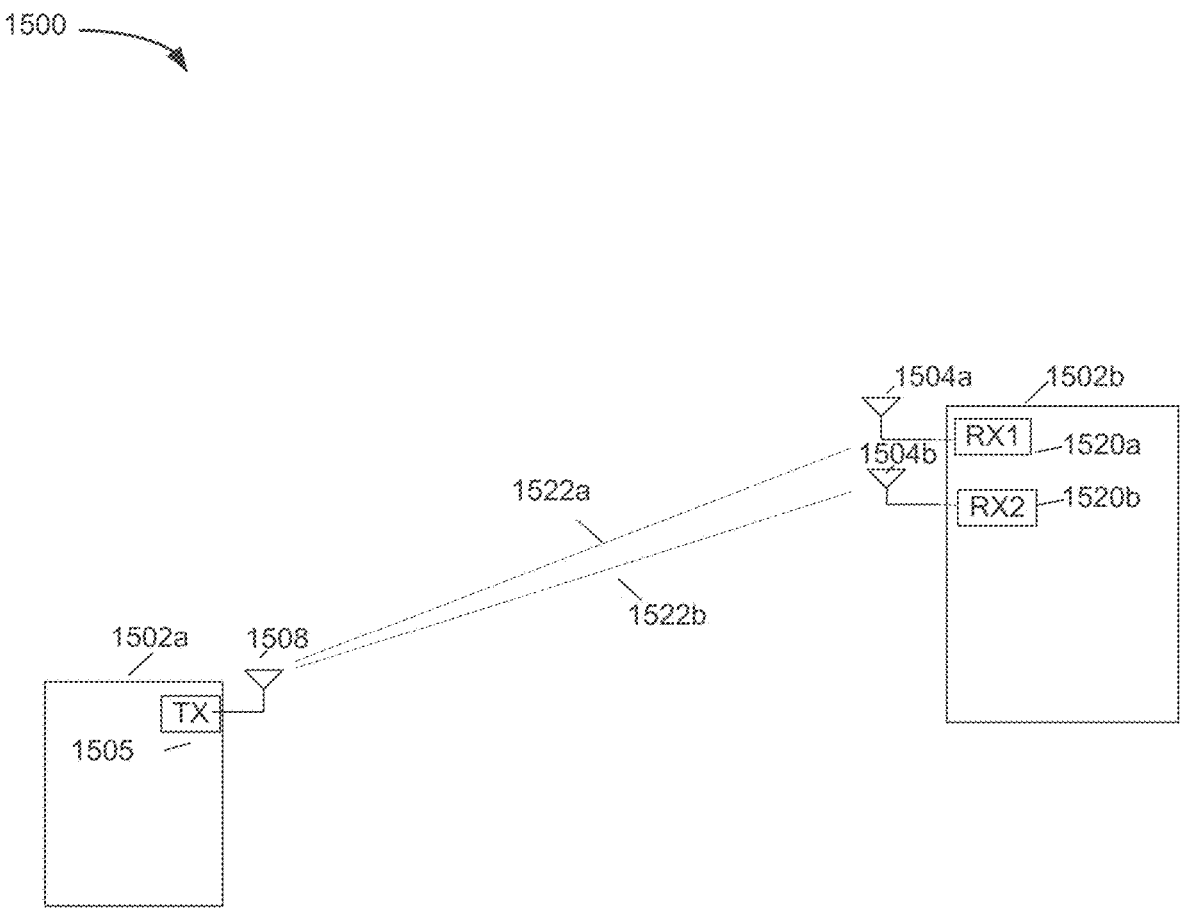
FIG. 15A shows an example topology including a first wireless device and a wireless interface.

FIG. 15A shows an example topology 1500 including a first wireless device 1502a and a wireless interface 1502b. The first wireless device 1502a is in communication with a receive element 1504a and a second receive element 1504b of the second wireless device 1502b. The receive element 1504a and the receive element 1504b are integrated into the wireless interface 1502b. Wireless device 1502a includes a transmitter 1505 operably connected to a transmission receive element 1508. A waveform transmitted from the antenna 1508 is received by the wireless interface 1502b and specifically by receiver 1520a and receive 1520b via receive elements 1504a and receive element 1504b. The waveform from 1508 to 1504a travels a distance 1522a and the waveform from 1508 to 1504b travels a distance 1522b. A distance between a time of arrival of the waveform at the respective receive elements of the receivers is given by $$\Delta t = t1 - t2 = (D1 - D2)/S_{wave} = \Delta D/S_{wave} \quad \text{Equ. 7}$$

where:
Δt difference in time of arrival of the waveform at receive elements 1504a and 1504b,
ΔD difference between travel distances of the signal/wave,
t1 travel time of waveform from 1508 to 1504a,
t2 travel time of waveform from 1508 to 1504b,
D1 distance from 1508 to 1504a,
D2 distance from 1508 to 1504b,
$S_{wave}$ speed of the waveform via the medium The speed of the wave through any medium is related to the frequency of the wave by $$S_{wave} = f_{wave} * \lambda \quad \text{Equ. 8}$$

where:
$S_{wave}$ speed of the waveform via the medium,
$f_{wave}$—frequency of the wave,
λ wavelength of the wave.

The time duration of a wave is related to its frequency by $$T = 1/f_{wave} \quad \text{Equ. 9}$$

where:
the time duration of the wave can be also expressed in angle as 360 degrees or 2π.

Substituting equation 8 in equation 7 results in $$\Delta t = t1 - t2 = \Delta D/S_{wave} = \Delta D/(f_{wave} * \lambda) \quad \text{Equ. 10}$$

And using the relationship of equation 8 results in $$\Delta t = \Delta D * T/\lambda = \Delta D * 2\pi/\lambda \quad \text{Equ. 11}$$

Or $$\Delta D = \lambda * \Delta t/T = \lambda * \Delta \phi/2\pi \quad \text{Equ. 12a}$$

Or $$\Delta \phi = 2\pi * \Delta D/\lambda \quad \text{Equ. 12b}$$

where:
Δφ difference in arrival phase of the waveform at the two receive elements.

For a waveform of a specific wavelength and a known difference distance between the two receive elements and keeping the phase difference constant, Equation 12 defines a hyperbola wherein a mobile device that transmits a waveform from any location of that hyperbola transmits a signal, the waveform would arrive at the two receive elements with the same phase difference.

When receive elements are located at a distance of less than λ/2, the receivers provide information that can be processed to determine which of the receive elements received the waveform first. However, when the receivers are located at a distance greater than λ/2, it is more challenging to determine which receive element received the waveform first and as such we need to examine the hypothesis that the waveform arrived at any receive element first as explained with reference to FIG. 15B.

Figure 15B:
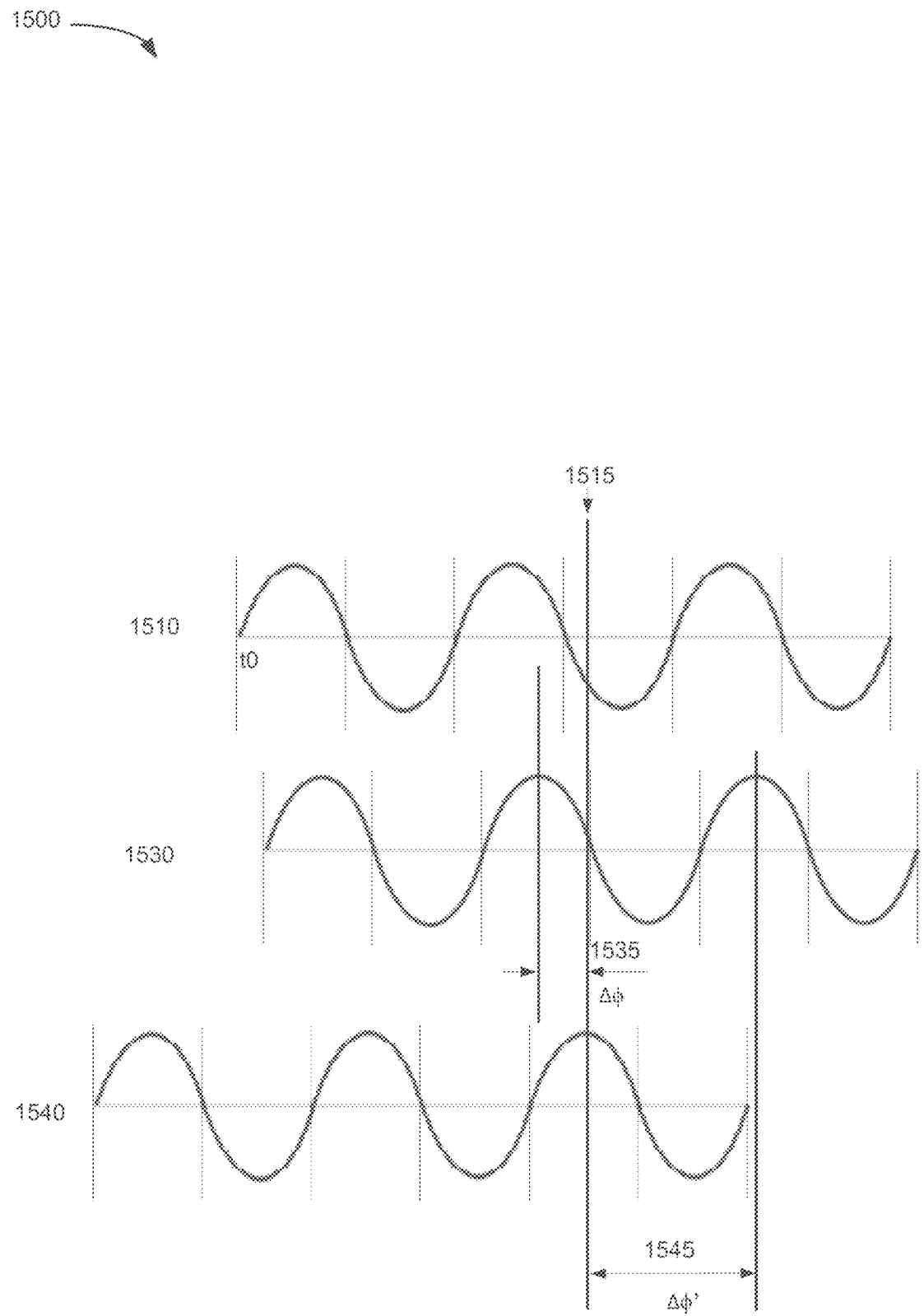
FIG. 15B is a timing diagram illustrating a waveform received via receive elements spaced at a distance greater than $\lambda/2$.

FIG. 15B is a timing diagram 1500 illustrating a waveform received via receive elements spaced at a distance greater than λ/2. Waveform 1510 is transmitted starting at a reference time t0 and is received at the first receive element such as receive element 1504a of FIG. 15A. The same transmitted waveform 1530 (originating at the same starting time t0) is received at a second receive element such as receive element 1504b of FIG. 15A. The transmitted waveform travels a shorter path to the second receive element and as such it arrives earlier at the second receive element. At time 1515 a measurement is taken of the phase difference between the two received signals, e.g., using phase differentiators such as phase differentiators 960, 962, and 964 of FIG. 9. The phase difference is determined to be Δφ 1535.

Since the receive elements are spaced at a distance greater than λ/2, the receivers cannot determine which receive element received the waveform first. It is possible that the same waveform had a shorter path to the first receive element than to the second receive element and still it exhibits the same phase difference between the signals received at the second receive element. Specifically, the same transmitted waveform 1540 (originating at the same starting time t0) is received at a second receive element. The transmitted waveform travels a longer path to the second receive element and as such it arrives later at the second receive element. At time 1515, a measurement is taken of the phase difference 1535 between the two received signals, e.g., using phase differentiators such as phase differentiators 960, 962, and 964 of FIG. 9. The phase difference 1535 is determined to be Δφ when the actual phase difference is 360-Δφ. Because of the ambiguity of the system to discriminate whether the phase difference should be Δφ as shown by phase difference 1535 or 1560-Δφ as shown by phase difference 1545. The disclosed embodiments account for both possibilities. We will denote the term 360-Δφ as Δφ'

$$\Delta \phi' = 360 - \Delta \phi \quad \text{Equ.13}$$

where:
Δφ—difference in phase arrival is smaller than 360 degrees.

Figure 16A:
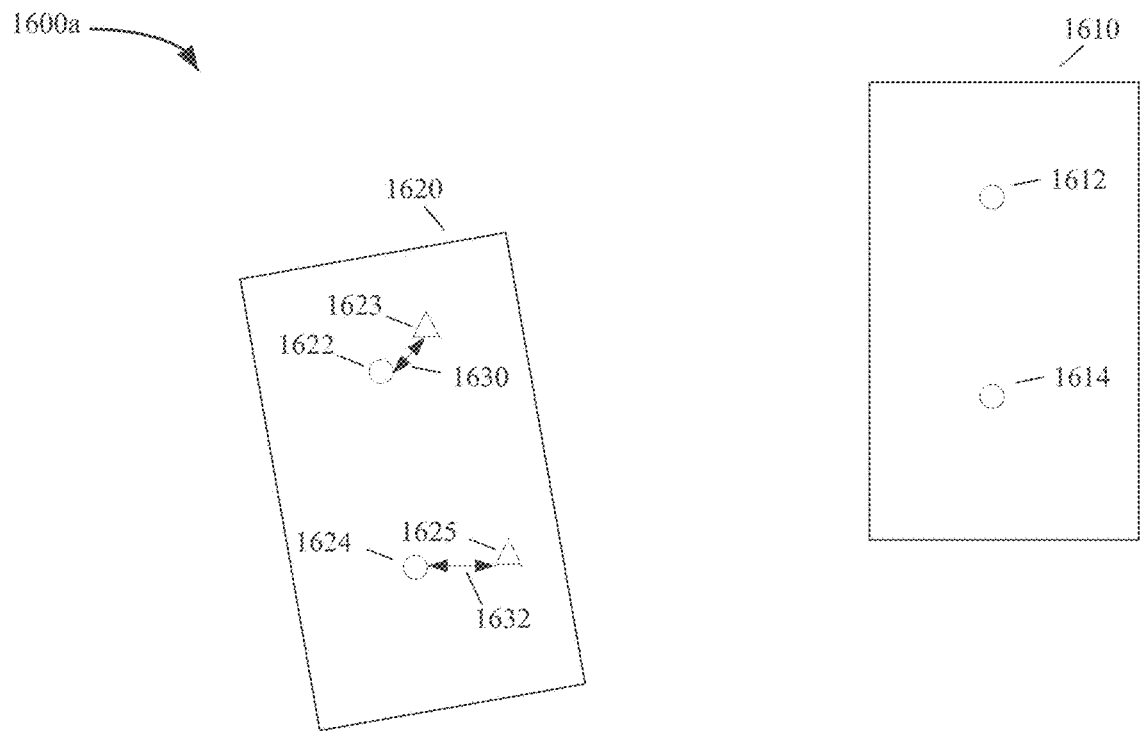
FIG. 16A shows two access points.

FIG. 16A shows two access points, a first AP 1610 and a second AP 1620. The access points are in a first orientation with respect to each other. For simplicity, both the reference AP 1610 and the second AP 1620 are depicted as having only two antennas each in FIG. 16A. AP 1610 has antennas 1612 and 1614, and AP 1620 has antennas 1622 and 1624. Each one of these antennas is configured for receiving and/or transmitting signals at multiple different frequencies. As described above, the SPM commands the various transmitters on one AP to transmit signals at different frequencies to the other AP, determines the phase differences between signals received by any antenna pairs, and estimates the region/location in which the antennas of the second AP are located.

FIG. 16A shows the antenna locations of the second AP are estimated to be located within regions described by estimated antenna location 1623 and estimated antenna location 1625 respectfully. The position and orientation of the second AP is then estimated based on the estimated antenna location 1623 and estimated antenna location 1625. For example, some embodiments determine a best fit between a position and orientation of the second AP and the estimated antenna location 1623 and estimated antenna location 1625. In some embodiments, the position and orientation of the second AP is estimated by minimizing a cumulative measure of the distance d1 1630 and the distance d2 1632. Distance d1 is a distance between the first antenna location 1622 and the estimated antenna location 1623, and distance d2 is a distance between the second antenna location 1624 and the estimated antenna location 1625. As discussed above, the relative locations of the antennas of AP 1620 are known based on the layout information defining physical dimensions of the AP 1620 and locations of antennas of the AP 1620 with respect to the physical dimensions. FIG. 2D provides examples of data structures used by some embodiments to store layout information for a wireless device, such as an access point. Another example of the use of layout information is described above with respect to FIG. 3.

Some embodiments rely on Equation 14 below to determine the position of a wireless device:

$$\text{Position} = \text{Position Min}(\Sigma_{i=1}^n f(di)) \quad \text{Equ. 14}$$

where:
Position description of the location of device antennas,
Position Min ( ) positions of antennas that minimize the term in the ( ), and
$f(d_i)$ function of the distances between the estimated positions of the antennas and the physical distances of the antennas.

In some embodiments, the function $f(d_i)$ is a mean square of the distances function. In another embodiment the function $f(d_i)$ is an absolute value. Other functions are contemplated by the disclosed embodiments.

Figure 16B:
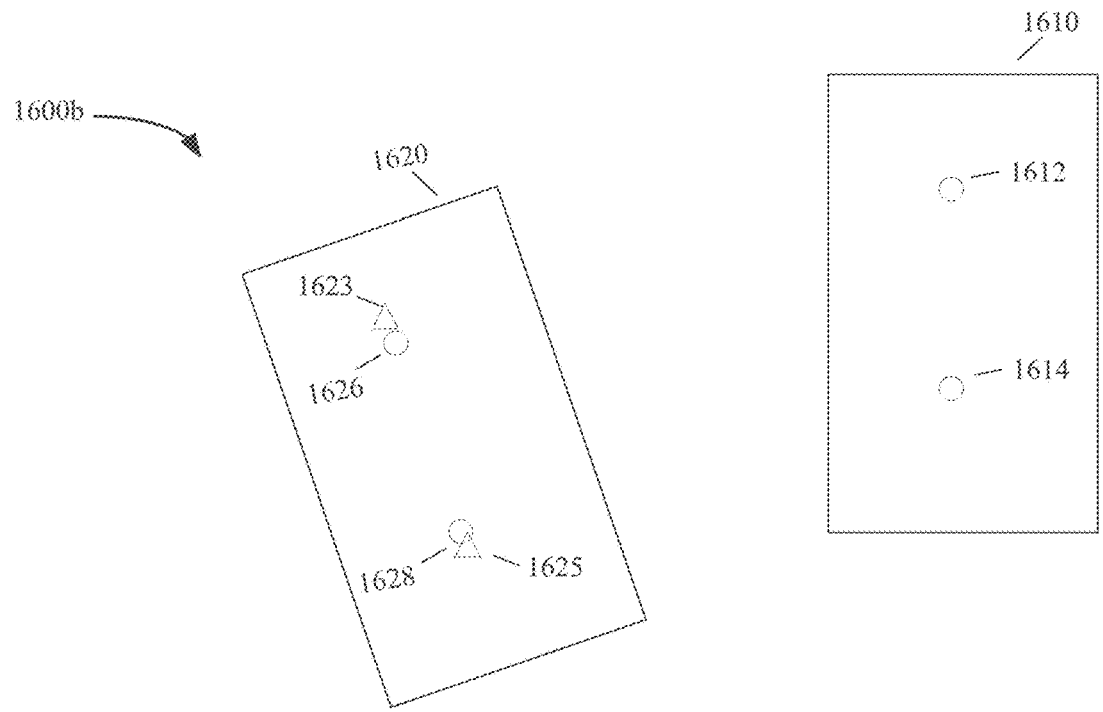
FIG. 16B shows a result of minimizing a function of the distances between two access points.

FIG. 16B shows a result of minimizing a function of the distances between estimated positions of the antennas while bringing into account the physical structure of the AP including the well-known relative locations of the antennas. FIG. 16B shows a second location and orientation between the reference AP 1610 and the second AP 1620. The second location and orientation 1600b minimizes a measure of distances d1 and d2, which were illustrated in FIG. 16A. For clarity the distances d1 and d2 are omitted from FIG. 16B but are a first distance between the first antenna location 1622 and estimated antenna location 1623 and a second distance between second antenna location 1624 and estimated antenna location 1625 respectively. The locations of the antennas of the second AP 1620 are determined to be location 1626 and location 1628 respectively. This determination is a result of these locations minimizing the cumulative function of the distances $d_i$ of Equation 14. FIG. 16B shows that the second access point's position and orientation has been modified to provide for the reduced distances relative to distances d1 and d2 shown in FIG. 16A.

Once the locations of the antennas of the second AP are determined, the distance between the reference AP and the second AP as well as the relative orientations are determined.

Figure 17:
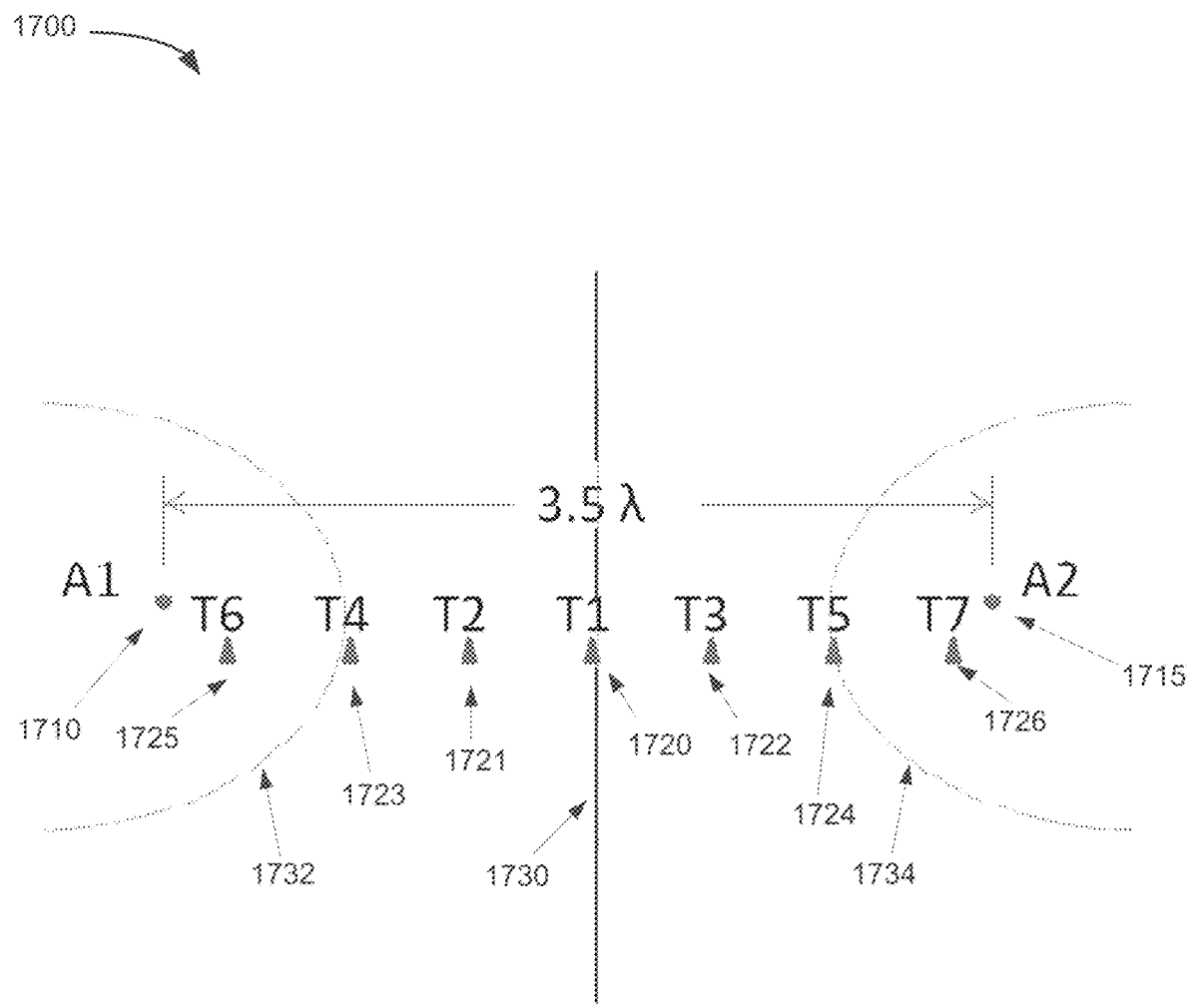
FIG. 17 is a two-dimensional example map illustrating a method of determining a location of a wireless transmitter based on phase differences between two receive elements.

FIG. 17 is a two-dimensional example map 1700 illustrating a method of determining a location of a wireless transmitter based on phase differences between two receive elements. In this example, receive element 1710 and receive element 1715 are located at a distance of 3.5λ. Example transmitter T1 1720 is located in the middle between the two receive elements 1710 and 1715. Since the wireless transmitter is equidistant to both receive elements, the waveform at the two receive elements arrives with a phase difference of zero (0) degrees. Similarly, a waveform from any transmitter located on a straight line 1730 traverses the same distance to both receive elements and as such the phase difference between the signals received at the two receive elements is also zero degrees.

In the example map 1700, transmitters T4 1723 and T5 1724 are located at a distance of λ from transmitter T1. These transmitters are located at distances 0.75λ and 2.75λ from receive elements A1 and A2. The difference in the distance that the signals from these transmitters need to travel to reach the receive elements 1710 and 1715 compared with the distance that a waveform from T1 1720 needs to travel to reach the receive elements is one wavelength. Said otherwise, the difference in the arrival phase of transmitters in these locations at either receive element 1710 or receive element 1715 is two wavelengths. Therefore, the difference in the arrival phases in receive elements A1 and A2 is zero degrees. Similarly, a waveform from any transmitter located on the hyperbolas 1732 or 1734 traverses the same distance to both receive elements and as such the phase difference between the signals received at the two receive elements is also zero degrees. Those skilled in the art should recognize that the straight line 1730 is actually a special case of a hyperbola of Equation 12 wherein ΔX=0.

Transmitters T2 1721 and T3 1722 are located at a distance of λ/2 from transmitter T1. These transmitters are located at distances of 1.25λ and 2.25λ from receiver receive elements and therefore the signals from transmitters at these two locations arrive at either one of the receive elements A1 and A2 with a delay 1.25λ and phase difference of one wavelength. Also these transmitters are located at the same distance from receive elements A1 1710 and A2 1715 and as such the signals from these transmitters arrive at both receive elements at the same phase and the phase difference between the signals received at the two receive elements is therefore zero degrees. Similarly, for the same reason, a waveform from any transmitter located on hyperbolas passing through T2 and T3 would exhibit the same phase difference of zero degrees.

Transmitters T6 1725 and T7 1726 are located at distances of 0.25λ and 3.25λ from receiver receive elements A1 and A2. Since a difference in distances from either transmitter 1725 or transmitter 1726 to any receive element is a multiple of the wavelength, signals would arrive at the two receive elements with the same phase, and thus a phase difference of zero (0) degrees. Similarly, a waveform from any transmitter located on hyperbolas passing through T6 and T7 would exhibit the same phase difference of zero degrees.

Thus, relying on phase differences of a waveform received at only two receive elements results in an infinite number of possible locations of the transmitter. Each of these infinite possible locations produce equivalent phase differences at the two receive elements. Thus, under these circumstances, uncertainty remains in the location of the transmitter based on only these phase differences.

Thus, some embodiments rely on more than two receive elements to increase certainty of location estimates. By adding additional receive elements that are located at different distances from the two original receive elements A1 and A2, the additional phase differences provide additional independent information, which can assist in a more precise location determination of the wireless transmitter.

Figure 18:
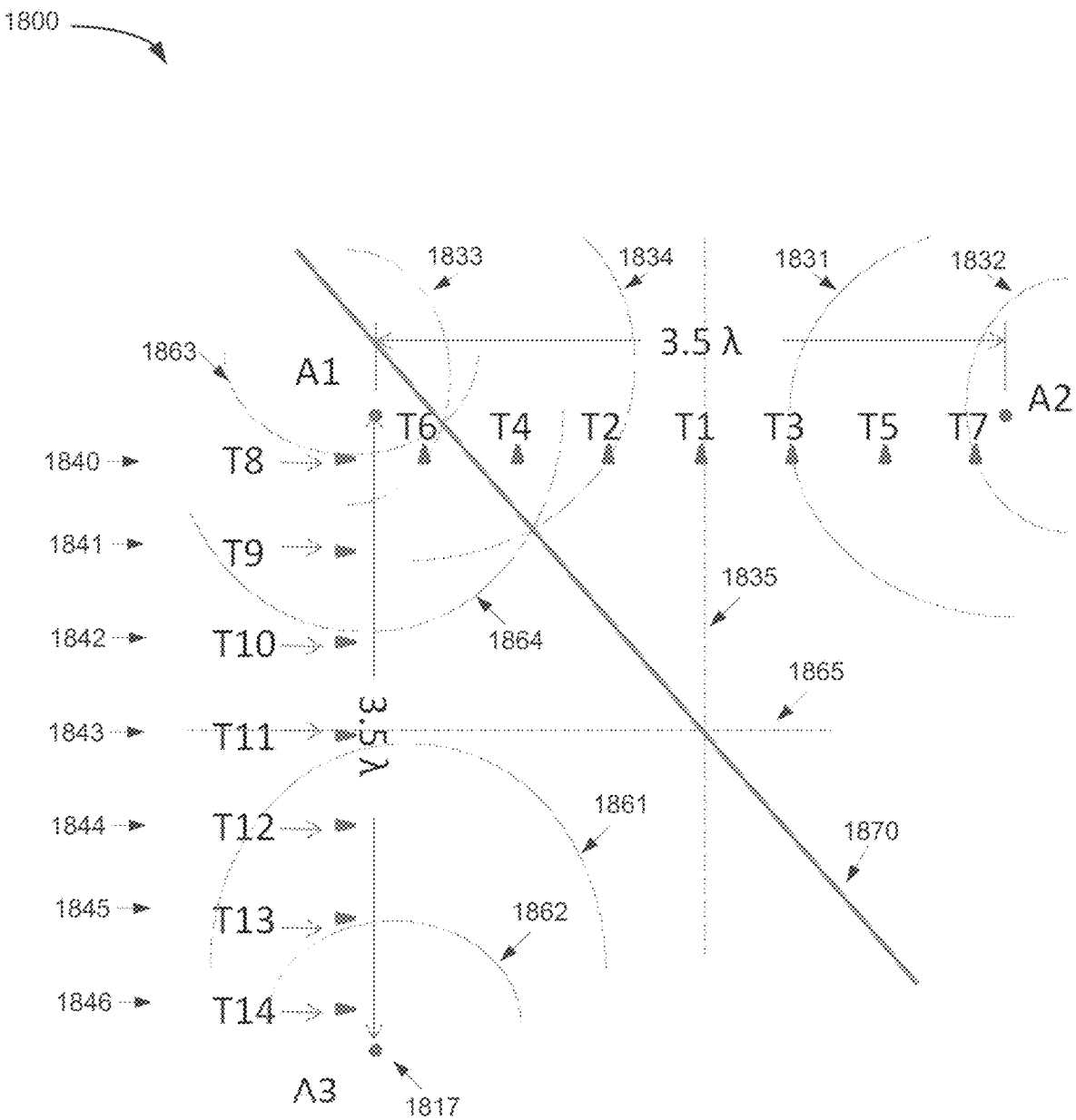
FIG. 18 is a two-dimensional map determination of a location of a wireless transmitter based on phase differences at three receive elements.

FIG. 18 is a receiver topology 1800 that demonstrates determination of a location of a wireless transmitter based on phase differences at three receive elements. FIG. 18 shows a third receive element 1817 (labeled A3). In FIG. 18, receive elements A1 and A2, and the transmissions from locations T1 through T7 are similar to those previously discussed with respect to FIG. 17. Similarly, hyperbolas 1831, 1832, 1833, 1834, and 1835 describe locations from which transmission towards receive elements A1 and A2 arrive with equivalent phases (e.g. phase difference zero degrees). As noted above, hyperbola 1835 signifies a special hyperbola wherein $\Delta X=0$ (a straight line).

Receive element 1817 is added to the receiver topology 1800 and a phase difference between an arrival phase at A1 and at receive element A3 1817 is measured. For reasons explained above when the transmitter is located at T8 location 1840, T9 location 1841, T10 location 1842, T11 location 1843, T12 location 1844, location T13 1845, and T14 location 1846 which are located $0.5\lambda$ apart and T8 location 1840 is located $0.25\lambda$ away from receive element A1, signals arriving from locations on the hyperbolas 1861, 1862, 1863, 1864 and 1865 have the same arrival phase. As such the difference between the arrival phase of the signals at A1 and A3 is zero.

FIG. 18 indicates that, with two receive elements and a single transmission frequency, for any given phase delta there are numerous hyperbolas located at the same distances from the two receive elements. A waveform transmitted from any of these hyperbolas would result in signals received at antennas A1 and A2 with the same phase difference. By adding the third receive element and measuring the phase difference between a waveform received at antennas A1 and A3 as well as the phase difference between at antennas A2 and A3 (not shown in the figure for sake of simplicity), a location of the wireless transmitter is further confined to locations that are also on new hyperbolas representing locations matching phased differences of receive elements A1 and A3.

The illustrated phase differences at antennas A1 and A2 are zero and the phase differences at antennas A1 and A3 is also zero. Thus, the only locations from which the waveform may be transmitted must be located at the intersections of hyperbolas 1831, 1832, 1833, 1834, and 1835 (which is a straight line) with hyperbolas 1861, 1862, 1863, 1864, and 1865 (which is a straight line). The intersections between these hyperbolas correspond to line 1870.

The line 1870 is at 45 degrees because this example is a special case wherein $\Delta\phi$ of the signals at antennas A1 and A2 is zero and $\Delta\phi$ of the signals at A1 and A3 is also zero. For any other non-identical $\Delta\phi$, the hyperbolas would intersect on a different line, thus indicating possible locations of the transmitter different from this example. The illustration so far took into account only a single frequency. Repeating the measurements using a different transmission frequency provides additional probable locations for each one of antennas. The system then determines the location and orientation of a second device by aggregating the estimated region/location based on difference of phase between any two antenna pairs and using one or more transmission frequencies.

FIG. 18 indicates that by adding another receive element and collecting additional independent information about the phase differences of the signals, and specifically calculating the difference in phases, we further constrained the possible locations from which the wireless transmitter could have been located (and transmitted from) to result in $\Delta\phi$ of the signals complying with a measured $\Delta\phi$.

Extending this idea and adding another receive element the system generates additional received signals with independent additional information about the location from which the wireless transmitter transmitted. In other words, measuring the difference in arrival phase of the signals received in A1, A2, A3, . . . Ak, and determining the location that satisfies all of the hyperbolas results in determining the location of the wireless transmitter. In some embodiments, the method described above is performed using different signal frequencies. Each frequency contributes additional measured phase differences as well as additional constraints that help narrow the specific location from which the transmitter operates.

Figure 19:
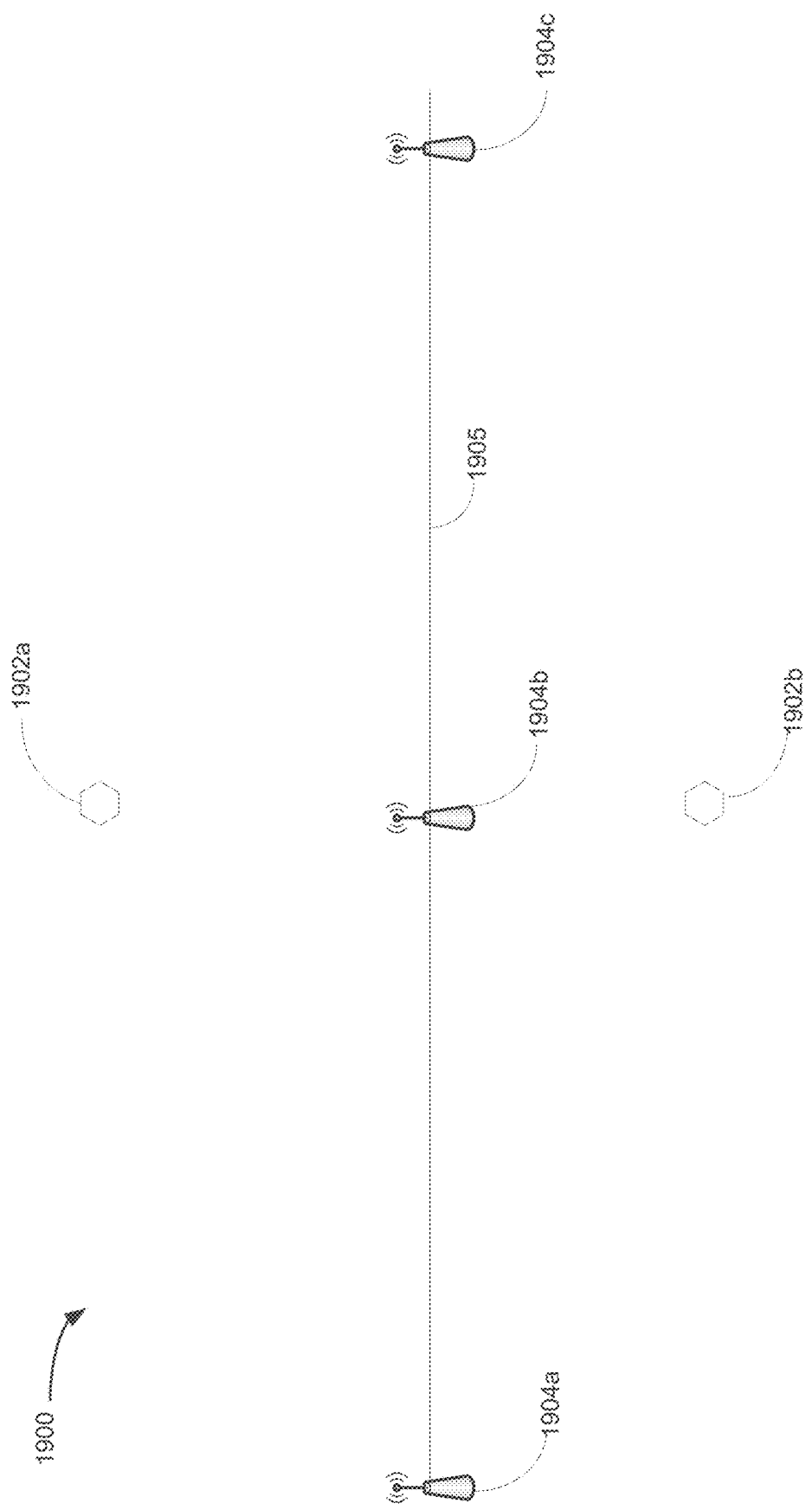
FIG. 19 is a map showing two receive elements and possible locations of an access point.

FIG. 19 is a map 1900 showing two receive elements and possible locations of an access point. FIG. 19 shows two wireless receivers 1902a and 1902b. FIG. 19 also shows three possible positions for a wireless transmitter (e.g. included in a wireless terminal, an access point, etc.), at 1904a, 1904b, and 1904c. FIG. 19 also shows a line 1905, each point on the line 1905 is equidistant from both of the receivers 1902a-b. Thus, a signal from a wireless transmitter, such as any of the access points at positions 1904a-1904b, and 1904c, will experience similar phase differences when received at a plurality of receive elements of each of the two receivers 1902a-b (e.g. zero).

Figure 20:
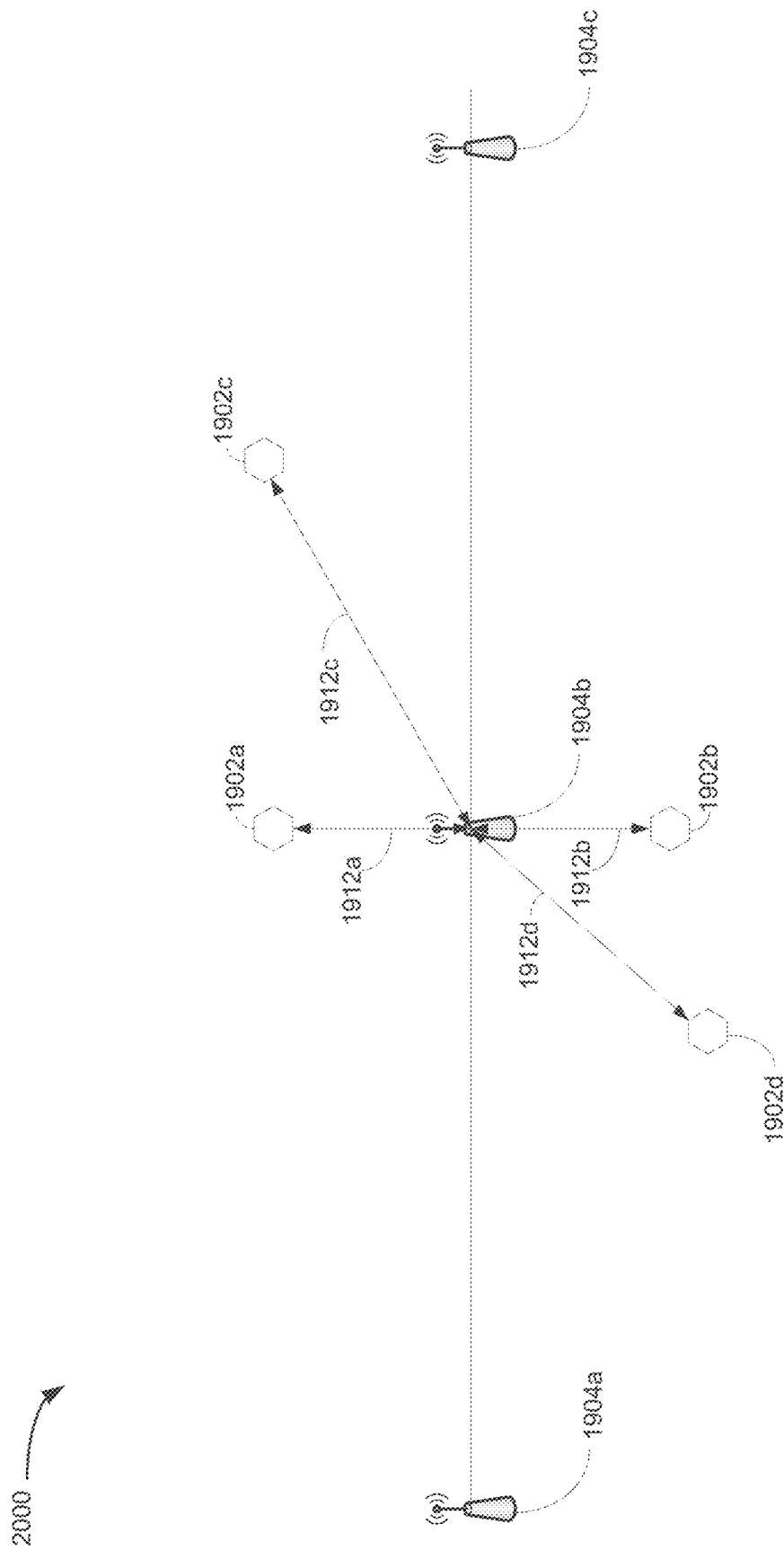
FIG. 20 is a map 2000 that is similar to that of FIG. 19 except two additional receivers are shown

FIG. 20 is a map 2000 that is similar to that of FIG. 19 except two additional receivers are shown 1902c-d in addition to the two receivers 1902a-b. FIG. 20 shows that receivers 1902a and 1902b are equidistant from the transmitter (e.g., access point) located at position 1904b. These equal distances are shown as distances 1912a and 1912b. The position 1904b is a distance 1912c from a receiver 1902c and a distance 1912d from receiver 1902d. Thus, because these additional distances, distance 1912c and distance 1912d are different than the distances 1912a-b, different phase differences of a waveform generated at position 1904c are experienced at receivers 1902c and 1902d, when compared to phase differences of the waveform when received at receivers 1902a and 1902b. These differences in distances and the resulting phase differences relative to receivers 1902a-b, assist some of the disclosed embodiments in identifying a position of a wireless transmitter located at position 1904b.

Thus, in some embodiments, a set of expected phase differences of a signal transmitted by a wireless transmitter at position 1904a (e.g. region centroid) when received at each pair of receive elements of the receivers 1902a-d are generated. A set of expected phase differences for a particular transmitter location and a particular receiver location are different from a second set of expected phase differences for a different transmitter location such as positions 1904a and 1904c, but the same particular receive location. In other words, some of the disclosed embodiments, when determining expected phase differences at a particular region or region centroid, determine expected phase differences for multiple receivers or receive antennas. For example, in the example of FIG. 20, each expected phase difference for a region or region centroid would include at least four sets of expected phase differences, one for each of the receivers. Thus, the number of expected phase differences for a region or region centroid would be at least, in these embodiments, the number of receive element pairs used in an embodiment times the number of frequencies used.

Figure 21:
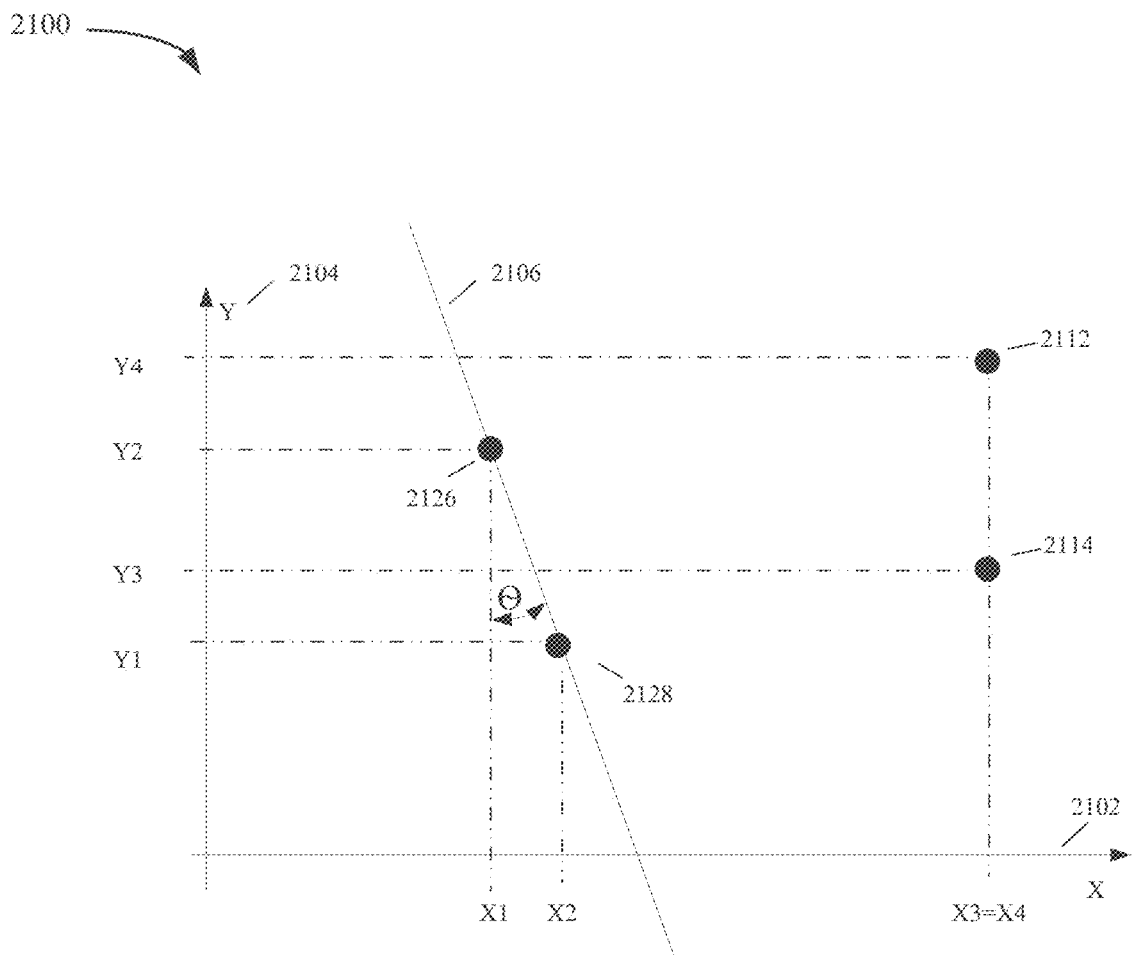
FIG. 21 shows positions of antennas of two access points in a two-dimensional space.

FIG. 21 shows example positions of antennas of two access points in a two-dimensional space 2100. While the disclosed embodiments are capable of determining differences in access point orientation in each of up to three dimensions, for simplicity, FIG. 21 illustrates only a two-dimensional space. A Z axis is not shown.

Locations are described with respect to FIG. 21 within an X axis 2102 and a Y axis 2104. A reference AP includes two antennas at locations 2112 and 2114. A second AP also has two antennas located at positions 2126 and 2128. Based on the relative positions of the locations 2112/2114 and the locations 2126/2128, it can be inferred that an orientation of the second AP is different than an orientation of the reference AP.

This difference in orientation is reflected in the two-dimensional space of FIG. 21 via the Y' axis 2106 and an angle θ made with the Y axis 2104 that is aligned with the reference AP. In some embodiments, the angle θ is determined based on the trigonometric equation:

$$\tangent \theta = (X2-X1)/(Y2-Y1) \quad \text{Equ. 15}$$

where:
X1, Y1 is a position of a first antenna of the second AP, and
X2, Y2 is a position of a second antenna of the second AP.

The example above illustrates the second AP as having a different roll (without any pitch or yaw with respect to the reference AP). Some embodiments use similar calculations to determine any pitch and/or yaw difference between the second AP and the reference AP. To calculate any pitch and/or roll differences of the second AP, the location of each of the two antennas is determined in a reference three-dimensional space. In particular, the first antenna location is estimated in the reference three-dimensional space at location [X1, Y1, Z1] and the second antenna is estimated to be located in the reference three dimensional space at location [X2, Y2, Z2]. The pitch angle α of the second AP with respect to the reference AP three dimensional space can be calculated by $$\text{Tangent } \alpha = (X2-X1)/(Z2-Z1) \quad \text{Equ. 16}$$

And the roll angle β of the second AP with respect to the reference AP can be calculated by $$\text{Tangent } \beta = (Y2-Y1)/(Z2-Z1) \quad \text{Equ. 17}$$

where:
X1, Y1, Z1—position of first antenna of the second AP in a reference three-dimensional space, and
X2, Y2, Z2—position of second antenna of the second AP in the reference three-dimensional space.

In accordance with an embodiment when the position and orientation of the second AP in the reference three-dimensional space has been calculated, guidance is generated indicating how to change the orientation (pitch, yaw, and roll) of the second AP to align its orientation with the orientation of the reference AP. For example, some embodiments determine guidance to rotate the Y' axis 2106 of the second AP, which runs through the two positions of the two second antennas, such that the Y' axis 2106 is parallel to the Y axis 2104.

In some embodiments, the guidance is provided via LEDs mounted on the second AP. In some embodiments, the LEDs signal, via different colors of light, whether the technician should push a specific corner, to lift or to rotate the AP in a specific direction. Instructions to push on a specific corner of the AP can be interpreted as instructions to pull on an opposite corner. The intensity of the light or the number of LEDs is used, in some embodiments, to indicate the amount of rotation that should be applied to the second AP.

After the orientation of the second AP is modified, the orientation of the second AP is recalculated with respect to the reference AP. This continues until the orientation of the second AP is aligned with the reference AP. The second AP is aligned with the reference AP, in some embodiments, when each of the differences in pitch, roll, and yaw angles between the second AP and reference AP are below predefined corresponding thresholds.

In some embodiments, visual guidance is provided using a mobile device or a screen of some other device, (e.g., a computer, a tablet, etc.) that may be associated with the site provisioning manager (SPM).

Some embodiments provide audible guidance using a mobile device (e.g. a mobile phone) or other device, e.g., a computer, a tablet, etc. associated with the site provisioning manager (SPM).

Figure 22:
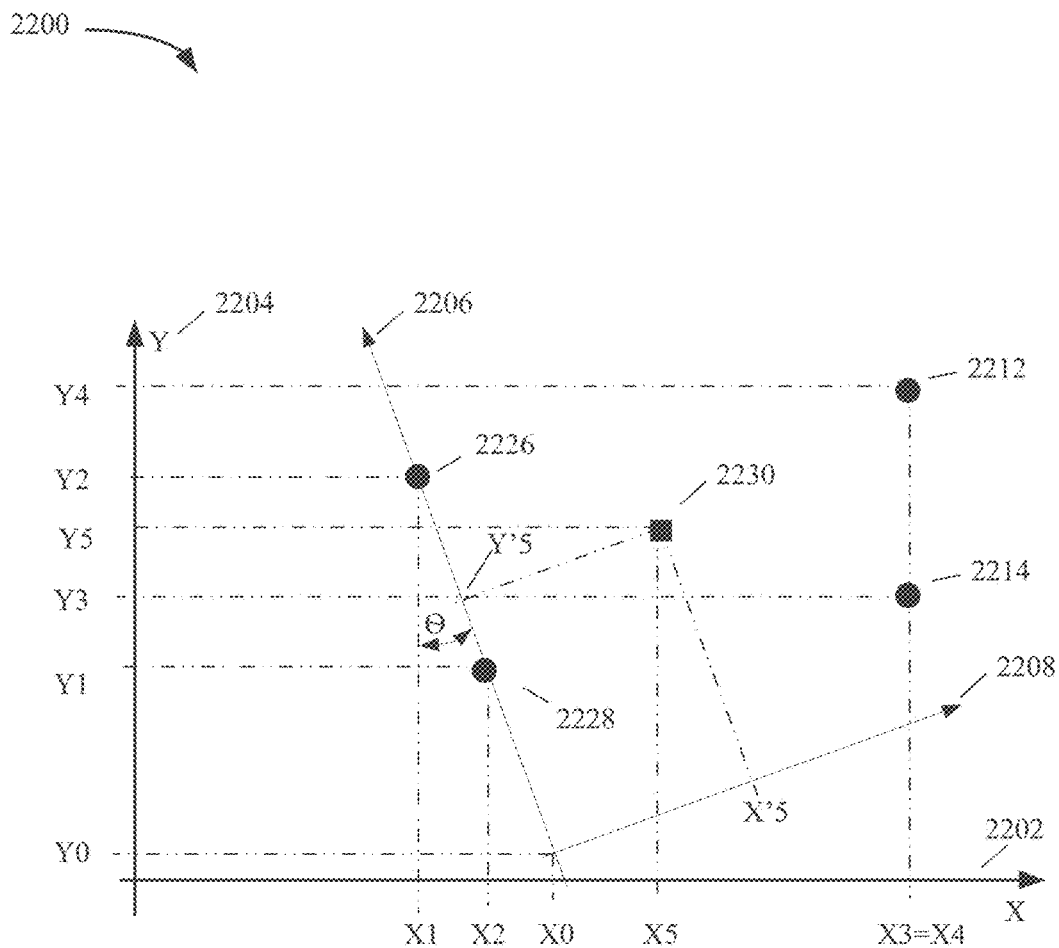
FIG. 22 shows antenna locations of two access points within a two-dimensional space.

FIG. 22 shows example antenna locations of two access points within a two-dimensional space 2200. Instead of ensuring alignment between a reference access point and a second access point, some embodiments instead store information defining a relative distance and orientation difference between the reference AP and a second AP. This information is then used to adjust location determinations that rely on position information of the second AP. For example, in some embodiments, estimation of a WT location may be performed by the second AP with respect to an orientation of the second AP. This location is then adjusted (mapped) using the location and orientation of the second AP to a location consistent with an orientation and location of the reference AP based on the stored information.

Referring to FIG. 22, a reference AP has antennas at an antenna location 2212 and a second antenna location 2214. The antenna location 2212 and second antenna location 2214 are shown with respect to an X axis 2202 and Y axis 2204. The antenna location 2212 and second antenna location 2214 are aligned with the Y axis 2204. A second AP has two antennas located at antenna locations 2226 and 2228. The Y' axis 2206 illustrates that the antenna locations 2226 and 2228 are not aligned with the Y axis, as was the case with the antenna location 2212 and second antenna location 2214, but are instead aligned with a different set of reference axis, X' 2208 and Y' 2206. This difference in alignment between the two sets of axis is illustrated by angle θ. The antenna locations 2226 and 2228 are instead aligned with a different axis, Y' axis 2206.

Based on the measurements of the difference of arrival phase of signals at the different antennas, some of the disclosed embodiments determine the locations of the second antennas to be located at [X1, Y1] and [X2, Y2].

During operations, both the reference AP and the second AP estimate the location of a WT 2230. In some embodiments, each AP determines the location of the WT with respect to its own orientation and then the system aggregates the estimated locations, e.g., by averaging the two estimated locations. As explained in greater detail in the Phase Differences Application, in an example embodiment, the system uses a weighted averaging based on the probability estimation that the WT is in each one of the said locations.

For sake of simplicity we assume that the reference AP is located in $$\text{Location of Reference AP} = [X3, (Y3+Y4)/2] \qquad \text{Equ. 18}$$

And the location of the second AP is $$\text{Location of Second AP} = [(X1+X2)/2, (Y1+Y2)/2] \qquad \text{Equ. 19}$$

For practical reasons one can assume that the distance between the coordinates of the two antennas in an AP is negligibly small as compared with the distance between an AP and a WT.

In operations information from reference AP is indicative that the location of WT 2230 is located at a region positioned at location [X5, Y5] with respect to an orientation of the reference AP. Similarly information from second AP is indicative that the location of WT 2230 is located at a location [X'5, Y'5] with respect to a Y' axis 2206 and an X' axis 2208, which is aligned with a second orientation of the second AP. To facilitate aggregation of the information from both APs, the location information from the second AP is translated or mapped to be with respect to the orientation of the reference AP.

In the illustrated example, the origin of the coordinates of the second AP is located at [X0, Y0] in the reference coordinates. Therefore, translated to the reference coordinates, the location of the WT is:

$$X5 = (X1+X2)/2 + X'5 * \cos(\theta) \qquad \text{Equ. 20}$$

and $$Y5 = (Y1+Y2)/2 + X'5 * \sin(\theta) \qquad \text{Equ. 21}$$

In accordance with yet another embodiment, rather than estimating the location of the WT with respect to the orientation of the second AP and then transforming the location to be with respect to the orientation of the reference AP, some embodiments use the orientation of the second AP to determine the regional signature of phase differences arriving at the antennas of the second AP from regions defined by the orientation of the reference AP. Thus the second AP determines the location of the WT directly in the reference coordinates (axes) of the reference AP which facilitates easier aggregation of the estimated location of the WT made by the second AP with the location estimation of the WT performed by the reference AP.

Figure 23:
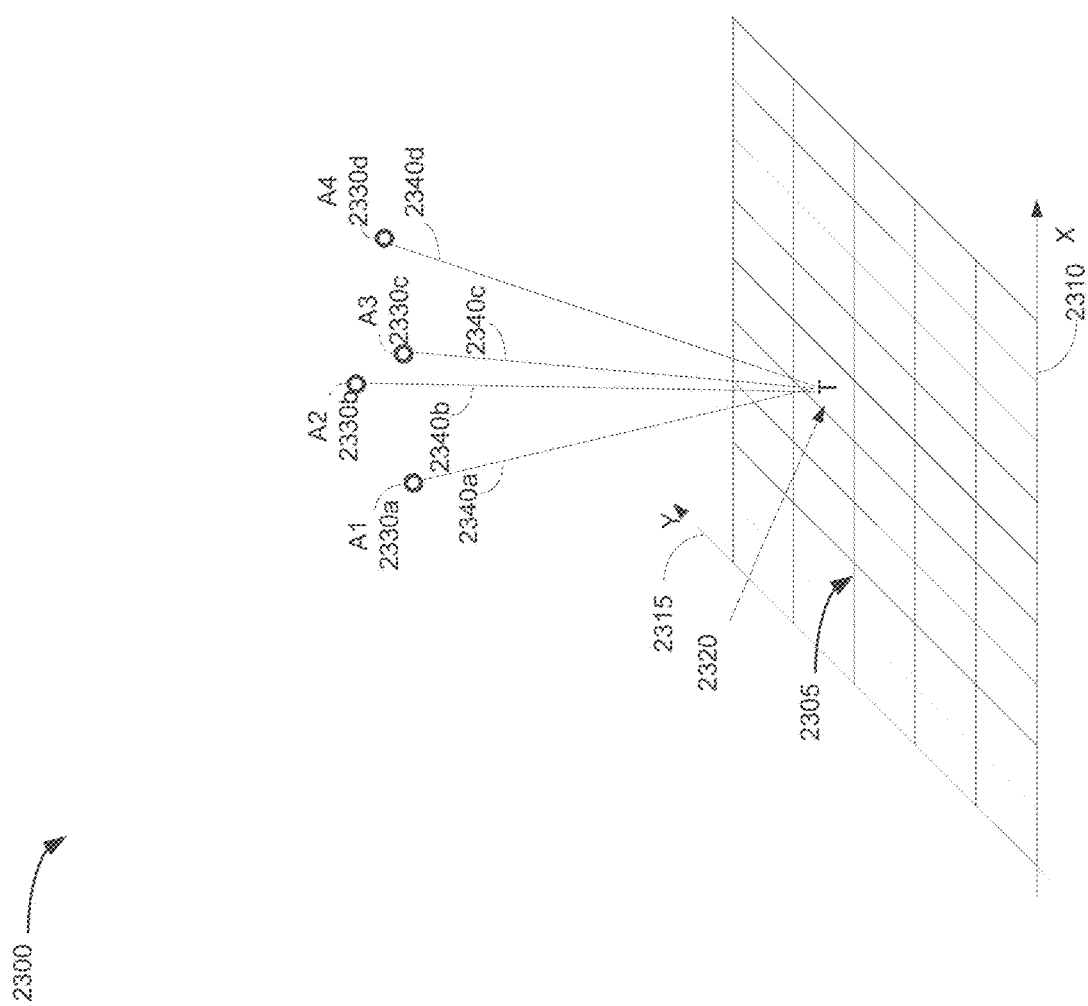
FIG. 23 is a graph illustrating a method for determining expected phase differences at a region and determining whether received phase differences match those expected phase differences.

FIG. 23 is a graph 2300 illustrating a physical configuration of a plurality of antennas with respect to a two dimensional plane. The two-dimensional plane 2305 is defined by X axis 2310 and Y axis 2315 respectively. The two-dimensional plane 2305 is divided into a plurality of regions, one of which is labeled as 2320. In some embodiments, each of the plurality of regions has a dimension length of e.g., 1.3*a wavelength (λ) of the waveform being analyzed. The two-dimensional plane 2305 represents a surface on which the wireless transmitter (e.g. included in a wireless terminal such as a smart phone) may travel and from which it transmits and/or receives wireless communication.

The physical configuration of the antennas can be used in a method for determining expected phase differences within a region of the two dimensional plane. Those expected phase differences can then be compared to actual received phase differences to determine if the transmitter is located in the region.

FIG. 23 shows a transmitter "T" located in a region 2320. The transmitter "T" transmits a signal which is received by each of four receiver antennas, 2330a-d. In some embodiments, the receive elements are co-located on or inside a single wireless device, e.g., an AP. In some other embodiments, the receive elements are distributed across multiple wireless devices.

In the example of FIG. 23, locations of the receiver antennas 2330a-d is known. The locations have been determined during an installation process, and entered manually by an administrator. In some embodiments, once the location and orientation of the AP is determined, the specific location of the antennas is determined by the physical configuration (e.g., physical properties) of the AP. Alternative, the locations may be known via satellite positioning system receiver included within one or more wireless devices. Alternatively, locations of the receiver antennas 2330a-d are known, in some embodiments, via techniques described in this disclosure. For example, in some embodiments, the location of the receiver is previously determined based on phase differences of signals exchanged with another wireless device in a known location.

For each region in the two dimensional plane 2305, the disclosed embodiments determine distances such as distance 2340a-d between a centroid of the two dimensional region 2320 and the respective receive element 2330a-d. A reference receive element is selected from the available receive elements 2330a-d, e.g., receive element 2330 and the distance from the transmitter to the other receive elements are evaluated. For each receive element i $$\Delta X_i = D_{ref} - D_i \qquad \text{Equ. 22}$$

where:
$\Delta X_i$ = difference in distances traveled from transmitter T to the reference receive element and to the receive element i.
$D_{ref}$ distance travelled from transmitter T to reference receive element,
$D_i$ distance travelled from transmitter T to receive element i Some embodiments utilize Equation 22 to determine differences in travel distance. For example, the difference in travel distance is translated into differences of arrival phases of a waveform from transmitter T in a given region (x, y) to the various receive elements.

$$\Delta \phi_i = \Delta X_i * 2\pi / \lambda \qquad \text{Equ. 23}$$

For a system with n antennas there are k=(n−1)+(n−2)+(n−3)+0.1 pairs of antennas. Expected phase difference in each region can be expressed as a phase difference signature by $$[\Delta \phi_1, \Delta \phi_2, \Delta \phi_3, \ldots \Delta \phi_k, \Delta \phi'_1, \Delta \phi'_2, \Delta \phi'_3, \ldots \Delta \phi'_k,] \qquad \text{Equ. 24}$$

Equation 24 assumes a single frequency. When more than one frequency is used, the number of phase differences increases accordingly and the dimension of the signature vector of equation 24 increases proportionally. For example, in a simplified system with four receive elements, the expected phase differences for a specific region may have the values, in one example embodiment, of:

$$[10, 65, 185, 15, 33, 235, 350, 295, 175, 345, 327, 125] \qquad \text{Equ.25.}$$

Some embodiments measure phase differences of a signal from a wireless transmitter, such as the transmitter "T" of FIG. 23, periodically (e.g., every one second). These embodiments then compare the actual receive phase differences to the expected phase differences for each region. Regions with expected phase differences matching the actual received phase differences are determined to be possible locations of the wireless transmitter.

As explained with reference to Equation 5, some embodiments compensate for errors in the measurement of the phase differences by comparing the received phase differences to the expected phase differences while considering a predetermined error tolerance or margin. To facilitate this comparison, the expected phase differences for a particular region (e.g. Equation 23) are replaced by differences that include accommodation for error (e.g. a range of acceptable values). For example, when vectors are used to represent the received phase differences and the expected phase differences, a vector of adjusted expected phase differences is described below:

$$[s_1, s_1, s_3, \ldots s_k, s'_1, s'_2, s_3, \ldots s'_k]$$ Equ. 26 where:

$s_i$—$i^{th}$ element of phase difference segment location signature $$si = [\Delta\phi_i, +\delta, \Delta\phi_i, -\delta]$$ Equ. 27 where:

$\delta$—estimated error in the arrival waveform phase measurement.

Using the example phase differences of Equation 25, and an estimated error $\delta$ of ±ten (10) degrees, an example of location signature for the region used for Equation 25 is given by Equation 28 below, which defines ranges of phase differences instead of single degree values:

$$[0\text{-}20, 55\text{-}75, 175\text{-}195, 5\text{-}25, 23\text{-}43, 225\text{-}245, 340\text{-}360, 285\text{-}305, 165\text{-}185, 335\text{-}355, 317\text{-}337, 115\text{-}135]$$ Equ. 28.

Some embodiments determine whether the expected phase differences (signatures) across regions overlap, and to what extent they overlap. For example, in some embodiments, if the number of regions that overlap is above a predetermined threshold, a notification is generated indicating additional APs/receive elements should be added or additional frequencies should be used thus increasing the dimensions of the phase differences across multiple frequencies and the ability to discriminate between regions. This notification is provided via any known messaging technology or via a note in an error log. Adding additional receive elements or increasing the number of frequencies used increases a probability that a location determination can be made more accurately, and the amount of overlap between expected phase differences in different regions will be reduced relative to solutions employing fewer receive elements or using fewer transmission frequencies. The above explanation also applies when determining a location in three dimensions, as described below with respect to FIG. 24.

Figure 24:
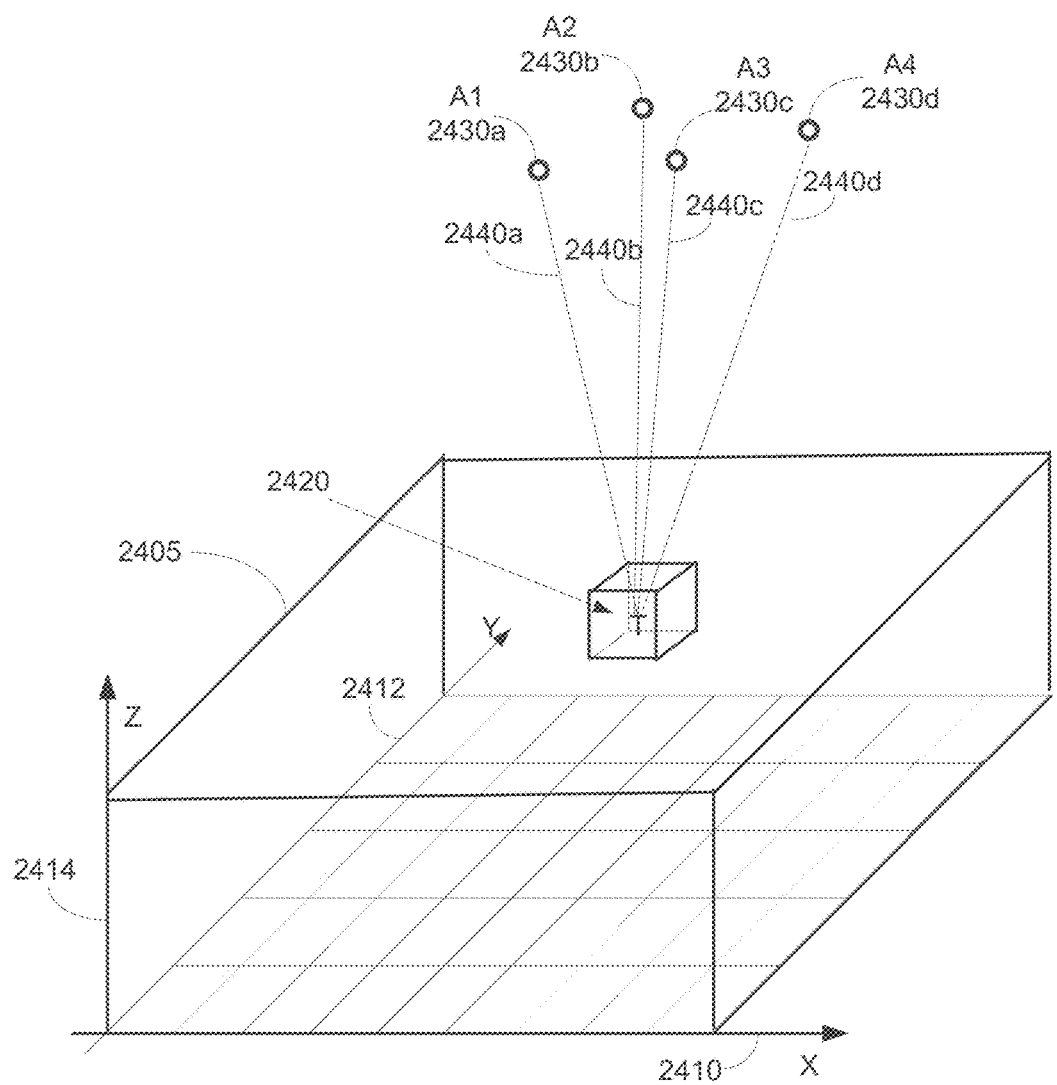
FIG. 24 is a graph illustrating how a transmitter in a three-dimensional space is located by one or more of the disclosed embodiments.

FIG. 24 is a graph 2400 illustrating how a transmitter in a three-dimensional space is located by one or more of the disclosed embodiments. FIG. 24 shows a three-dimensional geographic volume 2405, which is delineated by axis X 2410, Y axis 2412, and Z axis 2414. The three-dimensional geographic volume 2405 is comprised of a plurality of three-dimensional regions, an example of which is shown by three-dimensional region 2420. FIG. 24 illustrates that a transmitter "T" located within the three-dimensional region 2420 is at different distances from each of four receive elements 2430a-d. These distances are shown as 2440a-d respectively. As discussed above, at least some of the disclosed embodiments determine phase differences that would be expected by the receive elements 2430a-d if the wireless transmitter were located within the three-dimensional region 2420. If the expected phase differences match phase differences actually experienced by the receive elements 2430a-d when a signal from the transmitter "T" is received, then at least some of the disclosed embodiments determined that the three-dimensional region 2420 is one possible location of the wireless transmitter generating the signal.

Figure 25:
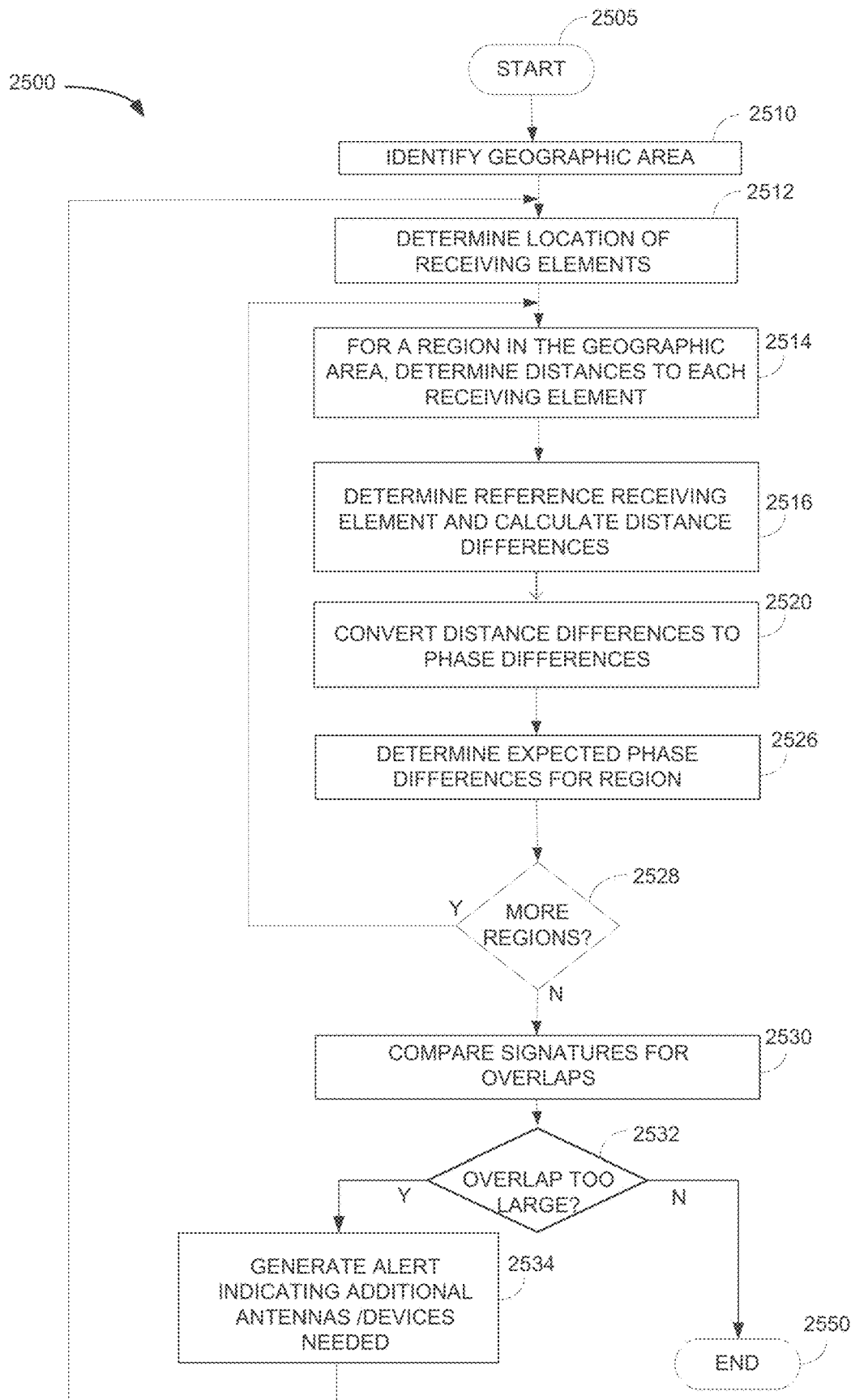
FIG. 25 is a flowchart of an example process for determining expected phase differences for a plurality or geographic regions.

FIG. 25 is a flowchart of an example process for determining expected phase differences for a plurality or geographic regions. Each of the plurality of geographic regions may have a corresponding phase difference including a plurality of expected phase differences. Each region's respective phase differences are based on a difference of distances between the respective region and receive elements that would receive a waveform from a wireless transmitter if the wireless transmitter was located in the respective region. In some embodiments, one or more of the functions discussed below with respect to method 2500 and FIG. 25 are performed by hardware processing circuitry (e.g., 806, 1106, 1206, 1306). In some embodiments, instructions (228, 314, 428, 529) stored in a memory (e.g. 812, 1112, 1212, 1312) configure the hardware processing circuitry to perform one or more of the functions discussed below.

After start operation 2505, method 2500 moves to operation 2510, which identifies a geographic area. Identifying a geographic area may include determining a boundary of the geographic area in which a wireless transmitter is located. For example, in embodiments that define two dimensional regions, operation 2510 includes determining a geographic area analogous to the two-dimensional plane 2305. In embodiments that define three dimensional regions, operation 2510 includes determining a geographic volume analogous to the three-dimensional geographic volume 2405. In some embodiments, the area or the volume are represented by a centroid or other similar position within said area or volume.

In operation 2512, locations of a plurality of receive elements are determined in space relative to the geographic region. In some embodiments, the plurality of receive elements are a plurality of antennas. For example, with respect to the wireless interface 950 discussed above with respect to FIG. 9, some embodiments of operation 2512 include determining a location of two or more of the antennas (e.g. such as 955a, 955b, 955c, or 955d) relative to the geographic region.

In operation 2514, a distance to each region is determined for each receive element. For example, since each receive element is located in a different location, its respective distance to a centroid of each region (in some embodiments) in the three-dimensional geographic space is different. Thus, some disclosed embodiments calculate, for each region, distances to each receive element. In some embodiments, the differences determined in operation 2514 vary depending on a type of device transmitting the signal and/or a type of device receiving the signal. As discussed above, some embodiments maintain information defining relative positions of transmit elements and/or receive elements of a device. Depending on how the receive elements and/or transmit elements are positioned, distances between a transmit element and a receive element will vary.

In operation 2516, differences in distances to the receive elements from each region are then determined. Some embodiments of operation 2516 define receive element pairs, with one element of the pair functioning as a reference receive element. A phase difference is then defined as a difference between the signal as received at the reference receive element and the phase as received at the non-reference receive element. This process is repeated for multiple pairs of receive elements in at least some embodiments.

In operation 2520, the distance differences are converted to expected phase differences. In some embodiments, operation 2520 determines the expected phase differences based on the distances, a frequency of the waveform, and a wavelength of the waveform. Thus, for example, to determine a number of wavelengths between a first receiving element and a centroid of a region, the distance is divided by the wavelength to get the number of wavelengths. A similar calculation is made for the second receiving element. Once the number of wavelengths between the centroid of the region and each receiving element is known, the phase difference can be determined via subtracting the fractional portion of the number of wavelengths, and multiplying this fraction portion by 360° (or $2\pi$). Some embodiments of operation 2520 determine expected phase differences based on Equations 7-12b discussed above.

Thus, for example, in one example, a first distance between a centroid of a region to a first receive element is 100.12 meters. A second distance between the centroid of the region and a second receive element is 100.3 meters. The frequency is 5.4 Ghz, or 5.4*109. Using equations 8 and 12 above and taking the modulo 360 of the result, we get that a phase difference of 87.207 degrees.

In operation 2526, expected phase differences for the region are constructed. (The expected phase differences are sometimes referred to in this disclosure as a location signature). Some embodiments represent these expected phase differences via location signature vectors as described above. Vectors are described here only for notational convenience and not all embodiments generate vectors.

Decision operation 2528 determines if expected phase differences for additional regions need to be calculated. If more regions need to be processed, method 2500 moves from decision operation 2528 to operation 2514, which selects another region in the geographic area and continues processing. Otherwise, method 2500 moves from decision operation 2528 to operation 2530.

In operation 2530, the expected phase differences (location signatures) are compared for overlaps. In some embodiments, the comparison for overlaps considers errors associated with the phase determinations/measurements across the plurality of regions. For example, errors in phase difference measurement may be, as one example ±10 degrees. When this variation is added to each expected phase difference for each region (resulting a range of acceptable phase differences), some regions may share some portion of the phase difference ranges. In this case, an embodiment experiencing received waveforms having a phase difference within ranges that overlap in two or more regions will be unable to determine from which of the overlapped regions the transmission originated.

Decision operation 2532 determines if the number of regions with overlapping expected phase differences is too large or otherwise meet a criterion (e.g. greater than a predetermined threshold). If the overlaps are too numerous, method 2500 moves to operation 2534, which, in some embodiments, generates an alert or notification. The notification indicates, in some embodiments, that too many overlaps exist and therefore a location of a wireless transmitter cannot be determined with sufficient accuracy. Alternatively, the notification suggests adding additional receive elements (e.g. antennas) and/or access points can be included to increase the number of antennas in use to determine phase differences and therefore increase the accuracy of the location determination.

In some embodiments, operation 2534 generates a notification suggesting the addition of more frequencies to the process. Additional frequencies or additional antenna elements increases the size (dimensions) of the phase difference signature vector. Processing then returns, in at least some aspects to operation 2512. If the overlaps between the predicted phase differences are not too large (or does not exist), such that sufficient location determination accuracy can be achieved, processing moves from decision operation 2532 to end operation 2550.

Figure 26:
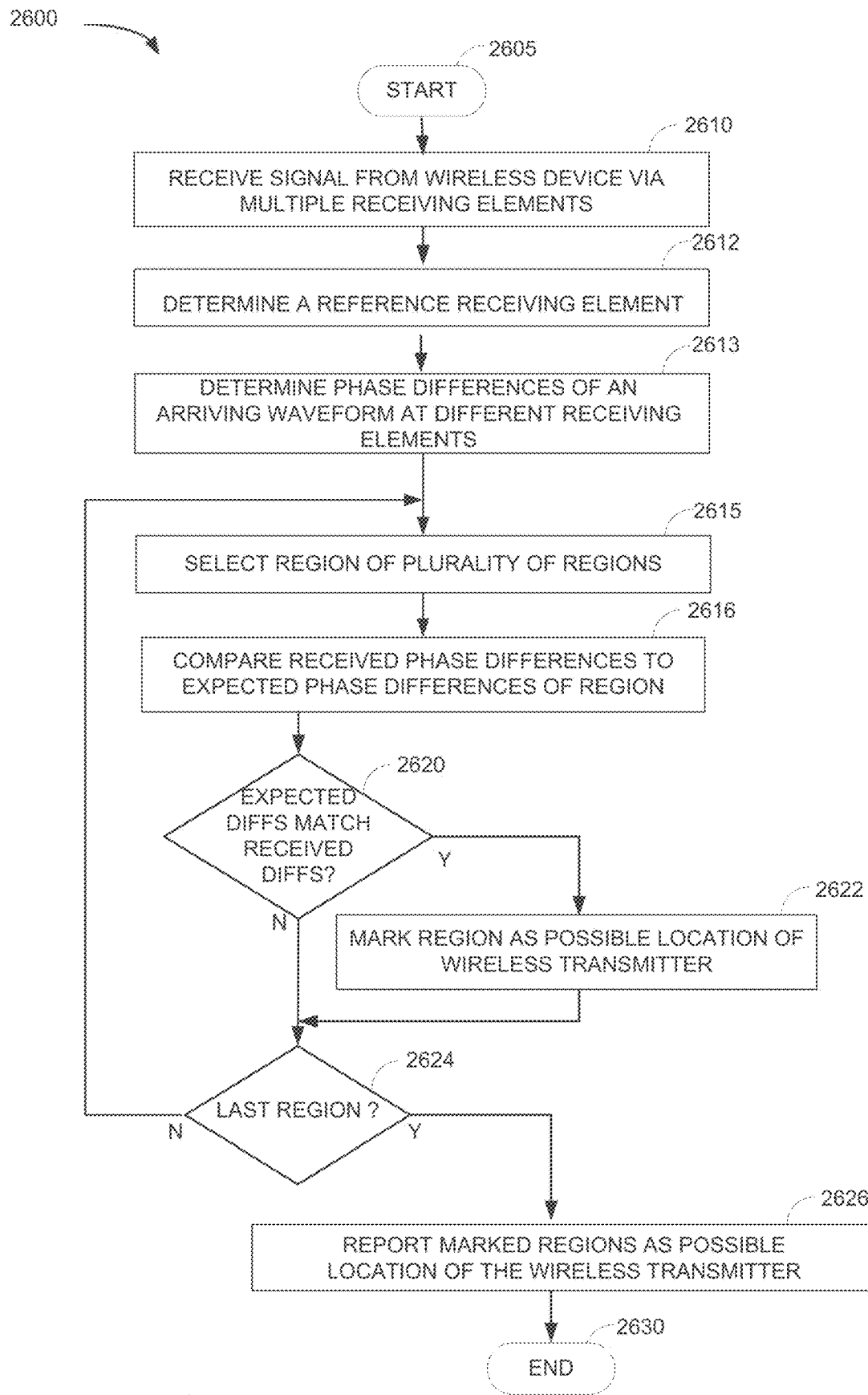
FIG. 26 is a flowchart of an example process for determining a location of a wireless transmitter using phase differences experienced at a plurality of receivers.

FIG. 26 is a flowchart of an example process for determining a location of a wireless transmitter using phase differences measured between signals received by a plurality of receive elements. In some embodiments, one or more of the functions discussed below with respect to the method 2600 and FIG. 26 are performed by hardware processing circuitry (e.g., 806, 1106, 1206, 1306). In some embodiments, instructions (228, 314, 428, 529) stored in a memory (e.g. any of memory 812, 1112, 1212, 1312) configure the hardware processing circuitry to perform one or more of the functions discussed below.

After start operation 2605, the method 2600 moves to operation 2610, which receives waveforms from a wireless transmitter via the plurality of receive elements. In some embodiments, the receive elements are antennas. In operation 2612, a reference receive element is determined. In some embodiments, the reference receive element is determined at design time, and thus there is no dynamic determination of a reference receive element. In accordance with another example embodiment, rather than determining a reference receive element the operation determines pairs of antenna elements for which a difference in measured phase of received signals/waves is to be measured (not shown).

In operation 2613, phase differences between an arriving waveform at second receive elements and the reference receive element are determined. For example, as discussed above with respect to FIG. 9, some embodiments of operation 2613 determine phase differences between, for example, receive antenna 955a and receive antenna 955b, receive antenna 955a and receive antenna 955c, and receive antenna 955a and receive antenna 955d. In this example, receive antenna 955a is a reference receive element. In some embodiments, rather than using only a single reference antenna, multiple antenna pairs with different reference antennas are utilized. For example, receive antennas 955b and 955c, antennas 955b and 955d, as well as antennas 955c and 955d. In some embodiments, the phase differences is obtained from the channel state information (CSI). In some embodiments, operation 2613 repeats for additional frequencies. This results in collection of phase differences across a plurality of frequencies.

In operation 2615, a region of a plurality of geographic regions is selected. An example region is three-dimensional region 2420 of three-dimensional geographic area 2405 shown in FIG. 24. Three-dimensional geographic space (or volume) 2405 includes a plurality of regions such as the three-dimensional region 2420.

In operation 2616, the determined receive phase difference of operation 2613 are compared to phase differences expected if the wireless transmitter is located in the selected region (e.g. these are computed by method 2300 discussed above with respect to FIG. 23 in some embodiments). The comparison performed in the operation 2616 considers phase difference error tolerances, which may vary by embodiment. For example, as discussed above with respect to Equations 26 and 28, expected phase differences are modified into expected ranges of phase differences, in some embodiments, based on an acceptable error tolerance.

Decision operation 2620 determines if the expected phase difference of the selected region match the measured phase difference (including any consideration of error tolerances). If the phase differences do match, the method 2600 moves to operation 2622, which marks the selected region as a possible location of the wireless transmitter. Marking the region includes, in some embodiments, writing a value to a memory location indicating the marking. Thus, regions are conditionally marked as possible locations based on whether the expected phase differences for the geographic region match the measured phase differences (determined in operation 2613).

Note that a phase difference does not necessarily represent a precise value, but one with an error tolerance associated with it, at least in some aspects. For specific technologies, and perhaps even for specific measurements, probability density functions may be used based on an error from a mean location. For instance, a mean phase difference may be 20 degrees, with a maximum error bound of +/−3 degrees. A potential location that matches a phase difference will therefore have distance from the mean offset, such that an error is an element of [−3 degrees, +3 degrees] in this instance.

In some embodiments, a probability density function is defined as Pdf(x), x is the distance to the mean phase difference. Pdf(x) has a probability value from [0, 1]. These values may be applied to the operation of matching potential location. In order to generate a final surface, some embodiments aggregate all probabilities in the map, represented by the probability Paggr. In accordance with a specific implementation, provided the aggregation is not zero ("0"), the probability Pdf(x) of each location in the map is divided by the probability Paggr, to generate a surface probability that sums to "1".

Decision operation 2624 determines if the currently selected region is the last region, or if additional regions of the plurality of regions remain to be examined. If additional regions remain, method 2600 moves from decision operation 2624 to operation 2615, where another region of the plurality of regions is selected. If no further regions need to be evaluated, method 2600 moves from decision operation 2624 to operation 2626, which reports the marked regions as possible locations of the wireless transmitter. Reporting the marked regions in operation 2626 includes, in some embodiments, to output data indicating the marked regions. The data is output, in some embodiments, to an electronic display, a data store, or a network interface (e.g. indications of the marked regions are provided to a network management device in some embodiments). In accordance with an example embodiment the output data includes the probability associated with each region as being the region from which the transmitted wave/signal originated. After operation 2626, method 2600 moves to end operation 2630.

Some embodiments of method 2600 determine a geographic location of an apparatus or device performing the method 2600. The geographic location is determined, in various embodiments, via a variety of localization techniques. For example, in some embodiments, the apparatus or device includes satellite positioning receiver, and the geographic location is determined based on the satellite positioning receiver. In other embodiments, the geographic location is determined via configuration parameters, which are manually entered at least in some embodiments.

While the description of method 2600 above describes the use of at least two receive elements, embodiments are contemplated that include at least a third receive element, and may include a fourth receive element, fifth receive element, and/or sixth receive element, or even more receive elements in various embodiments. In embodiments that include at least a third receive element, additional phase differences resulting from the third receive element are generated. For each of the plurality of geographic regions, a corresponding plurality of expected phase differences between a waveform transmitted from the respective region and received by the plurality of the antenna pairs are generated. These phase differences are measured as they would be received by antennas of any pair of receive elements. The conditional marking then takes into account the additional expected phase difference between the received signals when determining whether a signal is likely to have been transmitted from any of the plurality of regions.

Figure 27:
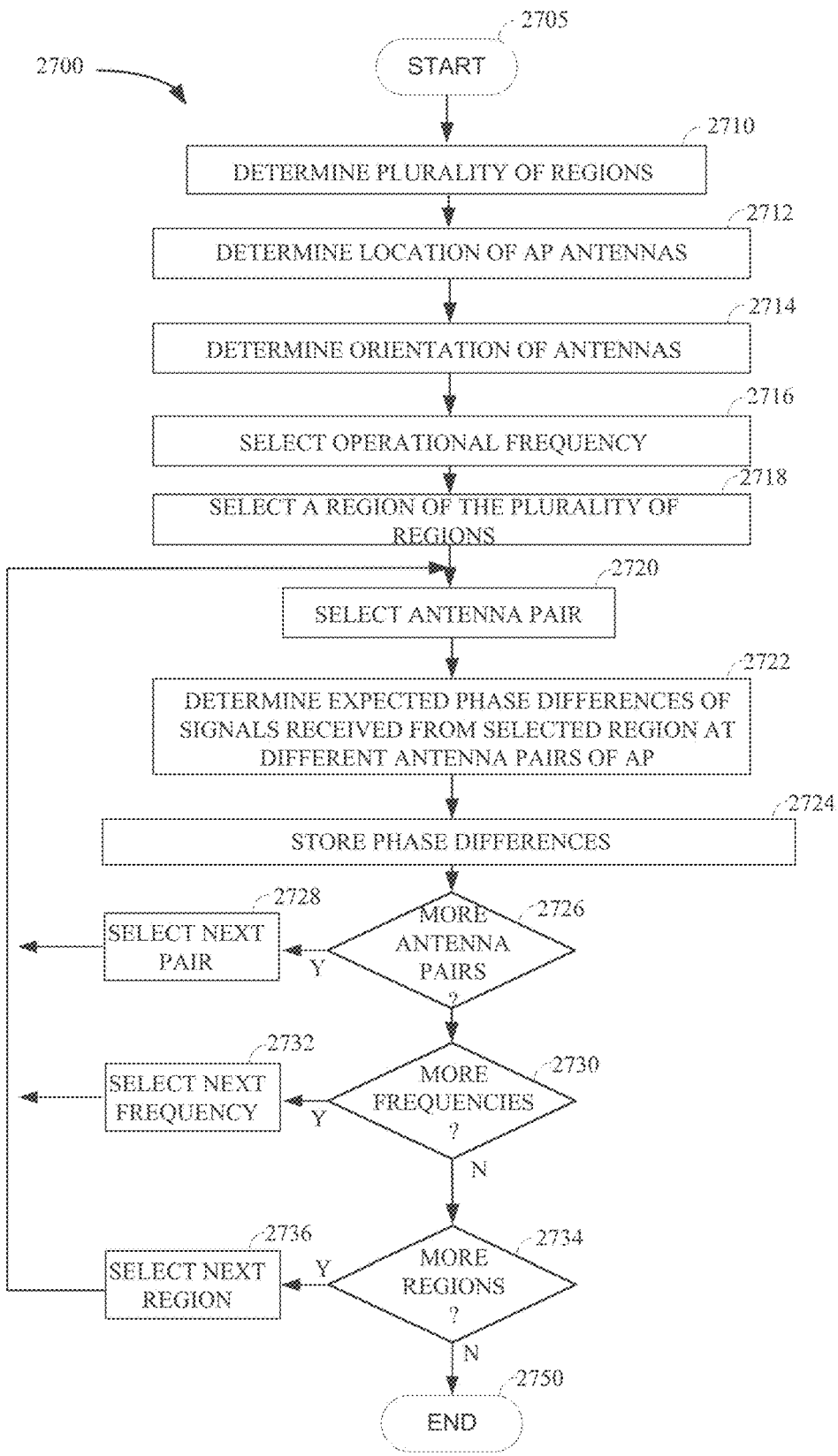
FIG. 27 is a flowchart of an example method for determining expected phase differences.

FIG. 27 is a flowchart of an example method for determining a expected phase differences. In at least some of the disclosed embodiments, one or more of the functions discussed below with respect to FIG. 27 and method 2700 are performed by hardware processing circuitry (e.g. any one or more of hardware processors (e.g. 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below with respect to FIG. 27 and method 2700.

The phase differences are utilized, in at least some embodiments, to estimate locations (region) of transmitting antennas. In a first pass the method is used to establish expected phase differences associated with a plurality of regions for transmissions from antennas of a first wireless device based on a second device located in a known location of the plurality of regions. A location and orientation of the first wireless device within the plurality of regions is then determined based on the expected phase differences. In a second pass, some embodiments then rely on the determined location and orientation of the first wireless device to estimate a position and orientation of a third wireless device. For example, in these embodiments, a second set of expected phase differences are determined for transmissions by the third wireless device as received by the first wireless device in its determined location and orientation. In some embodiments, a location of the third wireless device is first determined in the coordinate system of the first device (e.g. using region definitions defined by the first device) and then mapped into a coordinate system defined by the second device (relying on region definitions defined by the second device). In other embodiments, the first device obtains information relating to the coordinate system defined by the second device, and/or the definitions of regions defined by the second device. With this information the first device is able to determine the location of the third device relative to the coordinate system of the second device. In either case, the estimated location of the third device is generated by aggregating the estimated locations of the third device by the first and second devices.

The method 2700 begins in operation 2705 and proceeds to operation 2710 where the area of interest is defined and divided into regions. The method proceeds to operation 2712 where the locations (regions) of the reference AP antennas are determined. For example, the specific regions or the X and Y coordinates of each reference antenna are determined. In operation 2714, an orientation of receive elements or antennas of the AP is determined. In some embodiments, the orientation of the AP is determined based on an orientation sensor integrated with the AP. In other embodiments, the orientation of the AP is determined relative to a second AP, as discussed above. In some embodiments, the orientation of the AP is based on configuration information. For example, some embodiments provide a configuration file or other user interface that allows an operator to manually configure the AP's orientation information. In operation 2716, an operational frequency is determined. In operation 2718, a specific region of the plurality of regions is selected.

In operation 2720 a receive element pair of the AP is selected. In operation 2722 a difference in distances between the selected region and the two antennas is determined and converted, based on the transmission frequency, and speed of the wave propagation into a difference in signal arrival phase. Note that the distances between the selected region and the two antennas is based, in at least some embodiments, on layout information of the receiving device, and an orientation of the receiving device. For example, as discussed above, with respect to Equations 7-12b, phase differences experienced at antenna pairs are a function of a difference in distance between a transmitting antenna and the two antennas. This difference in distance is a function of the general distance between the transmitting antenna and a device receiving the signal, the orientation of the receiving device, and the relative position of the two receiving antennas to each other. This relative position is defined, in at least some embodiments, by layout information. For example, the data structures described above with respect to FIG. 2D describe one embodiment of layout information maintained by one or more of the disclosed embodiments.

In operation 2724 the difference in arrival phase is stored (e.g. in a phase difference vector to establish a phase difference signature for the selected region). Operation 2726 determines if there are other receive element pairs for which a difference in arrival phase should be calculated. If there are other receive element pairs, a new antenna pair is selected in operation 2728 and the method loops back to operation 2720.

However, if it is determined that the phase difference was calculated for all of the antenna pairs, the method continues to operation 2730 where the method determines if there are any other operational frequencies for which the phase difference of arriving signal should be calculated.

If operation 2730 determines that there are additional operating frequencies for which the phase difference of arriving signals should be determined, the method proceeds to operation 2732 where another operational frequency is selected, and the method loops back to operation 2722.

However, if it is determined that the phase difference was calculated for all of the operational frequencies, the method continues to operation 2734 where the method determines if there are any other regions for which the phase difference of arriving signal should be calculated.

If operation 2734 determines that there are additional regions for which the phase difference of arriving signals should be determined, the method proceeds to operation 2736 where a new region is selected, and the method loops back to operation 2722.

However, if it is determined that the phase difference was calculated for all of the regions, the method ends at operation 2750.

The method described with respect to FIG. 27 above describes an embodiment wherein the expected phase difference vector (phase difference signature) and the location of a WT are calculated in the reference coordinates. In accordance with another embodiment, each AP can use its own phase difference vector to estimate the region of a WT in its own coordinates. To facilitate aggregation of WT location estimations from multiple APs, that region is then mapped (transformed) into the reference coordinates based on the estimated location and orientation of the first AP in the coordinated of the second AP.

Figure 28A:
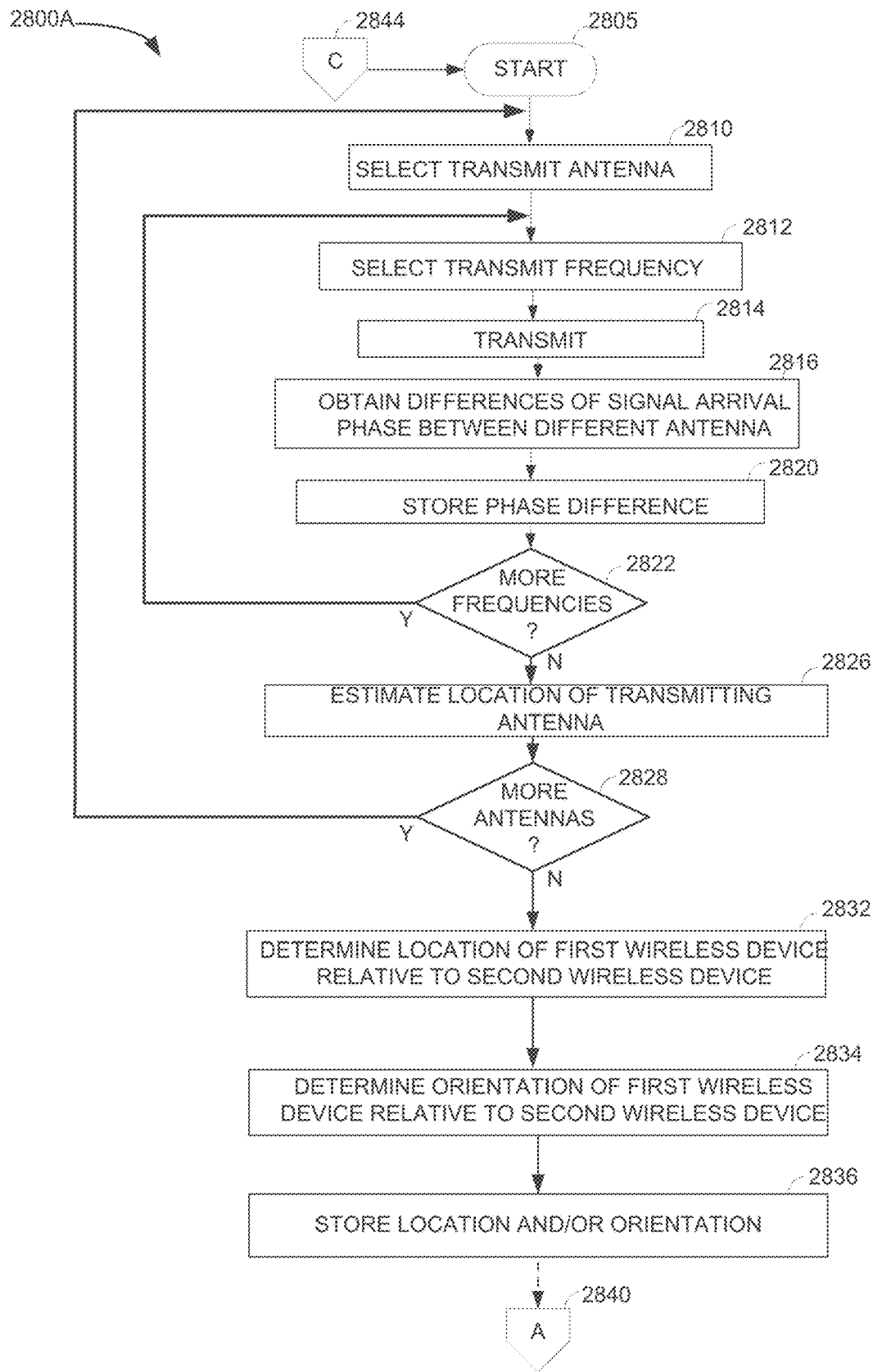
FIGS. 28A-B are an example flowchart describing a method for determining and utilizing a location and an orientation of second AP.
Figure 28B:
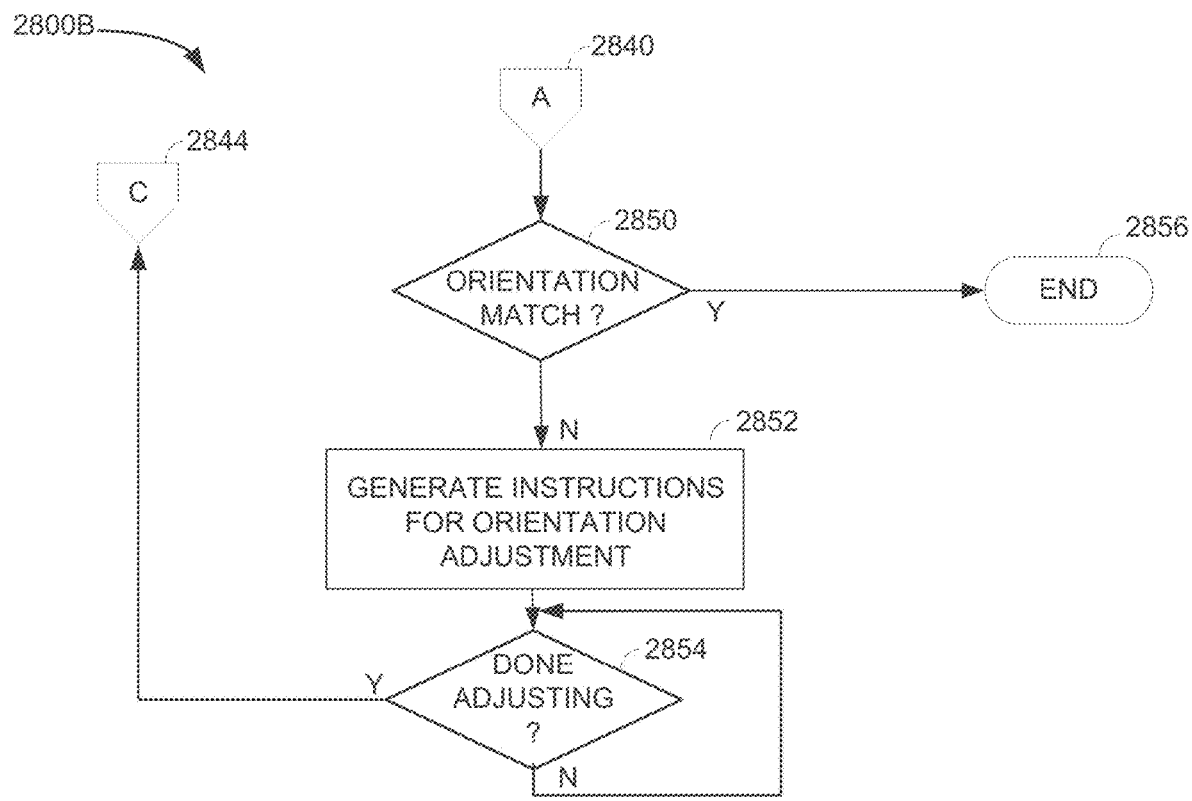

FIGS. 28A-B are example flowcharts describing a method for determining and utilizing a location and an orientation of first wireless device. In at least some of the disclosed embodiments, one or more of the functions discussed below with respect to FIG. 28A-B and method 2800A-B are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below with respect to FIG. 28A-B and methods 2800A-B. Methods 2800A and 2800B demonstrate how at least some of the disclosed embodiments iteratively determine distances between antennas in a pair of antennas, and utilize these determined distances to estimate a position of a first wireless device and an orientation of the first wireless device with respect to a second wireless device.

The method starts at operation 2805 and proceeds to operation 2810 where an initial transmit antenna is selected. The method proceeds to operation 2812 which selects an initial transmission frequency. The method proceeds to operation 2814 which instructs the selected transmitter to send a signal at the said frequency using said antenna.

The method proceeds to operation 2816 where signals are received by one or more antenna pairs and the associated phase differences of the received signals over a plurality of antenna pairs is determined. In operation 2820 the phase differences are stored (e.g., in a phase difference vector).

The method proceeds to operation 2822 that determines whether additional signals using different frequencies should be transmitted. If the operation determines that other frequencies should be used, method 2800A returns to operation 2812 where a different transmission frequency is selected. If operation 2822 determines that there are no further operational frequencies, the method proceeds to operation 2826 where the location of the transmitting antenna is estimated. Operation 2826 estimates the location of the transmitting antenna by comparing the determined phase differences to expected phase difference signatures in a plurality of regions, as discussed above.

The method proceeds to operation 2828 where the operation determines whether there are additional antennas (antennas of the AP whose location and orientation the system is estimating). If the operation determines that there are other antennas for which the location should be estimated, method 2800A returns to operation 2810 where a different transmission antenna is selected.

If operation 2828 determines that no more locations of transmitting antennas are needed, the method proceeds to operation 2832 where the location of the first wireless device relative to a location of the second wireless device is determined. In some embodiments, operation 2832 compares the estimated locations of the transmitting antennas to a known layout of antennas on the first wireless device and determines the antennas to be in locations that provide a best fit with the known layout of the antennas using the operation of equation 14. A centroid of those selected transmit antenna locations is selected as the first wireless device location, at least in some embodiments.

In operation 2834, an orientation of the first wireless device relative to the second wireless device is determined. In some embodiments, the best fit between the known antenna layout of the first wireless device and the transmit antenna locations determined by the operations of method 2800A described above is used to identify the first wireless device's location and orientation. Thus, the orientation is determined to be an orientation defined by a best fit of the estimated transmit antenna locations and a known first wireless device antenna layout. Operation 2836 stores the determined location and orientation. The stored location and orientation information is used, in some embodiments, for further location determinations performed by the first wireless device. For example, when determining expected phase differences experienced by the first wireless device, the location and orientation of the first wireless device is relevant, as it will affect the distances between receive elements of the first wireless device and one or more of a plurality of regions for which expected phase differences are determined.

In some embodiments, method 2800A then proceeds to connection operation 2840.

Via connection operation 2840, method 2800A moves to operation 2850 in FIG. 28B. Operation 2850 determines whether the first wireless device is aligned with the second wireless device. For example, the method determines the difference between the roll, yaw, and pitch of the first wireless device and the corresponding roll, yaw, and pitch of the second wireless device. In accordance with an example embodiment, the second set of coordinates is assumed to be a reference coordinates and as such its roll, yaw, and pitch are considered to be zero. As such alignment is considered to be achieved when the roll, yaw, and pitch of the first device are determined to be equal to zero, or below a predetermined small threshold in the reference coordinates. If any of these angle differences exceeds a predefined threshold, the method proceeds to operation 2852 where instructions are generated for manual alignment of the first wireless device so as to minimize the angular difference(s). The instructions are output as audible or visual instructions. For example, visual instructions are provided, in some embodiments, via AP mounted LEDs, by a screen of associated mobile phone, iPad, or computer.

The method 2800A proceeds to operation 2854 where it loops until the input is received indicating a manual alignment process has been completed in accordance with the generated instructions. Upon detecting that the manual alignment is complete, the method loops via connector operation C 2844 back to operation 2805 where the new location of the antennas and orientation of the AP are estimated.

However, if operation 2850 determines that the first wireless device is aligned with the second wireless device, method 2800B ends in operation 2856.

The embodiments below describe two examples of how the location and orientation of the first wireless device are utilized.

Figure 29:
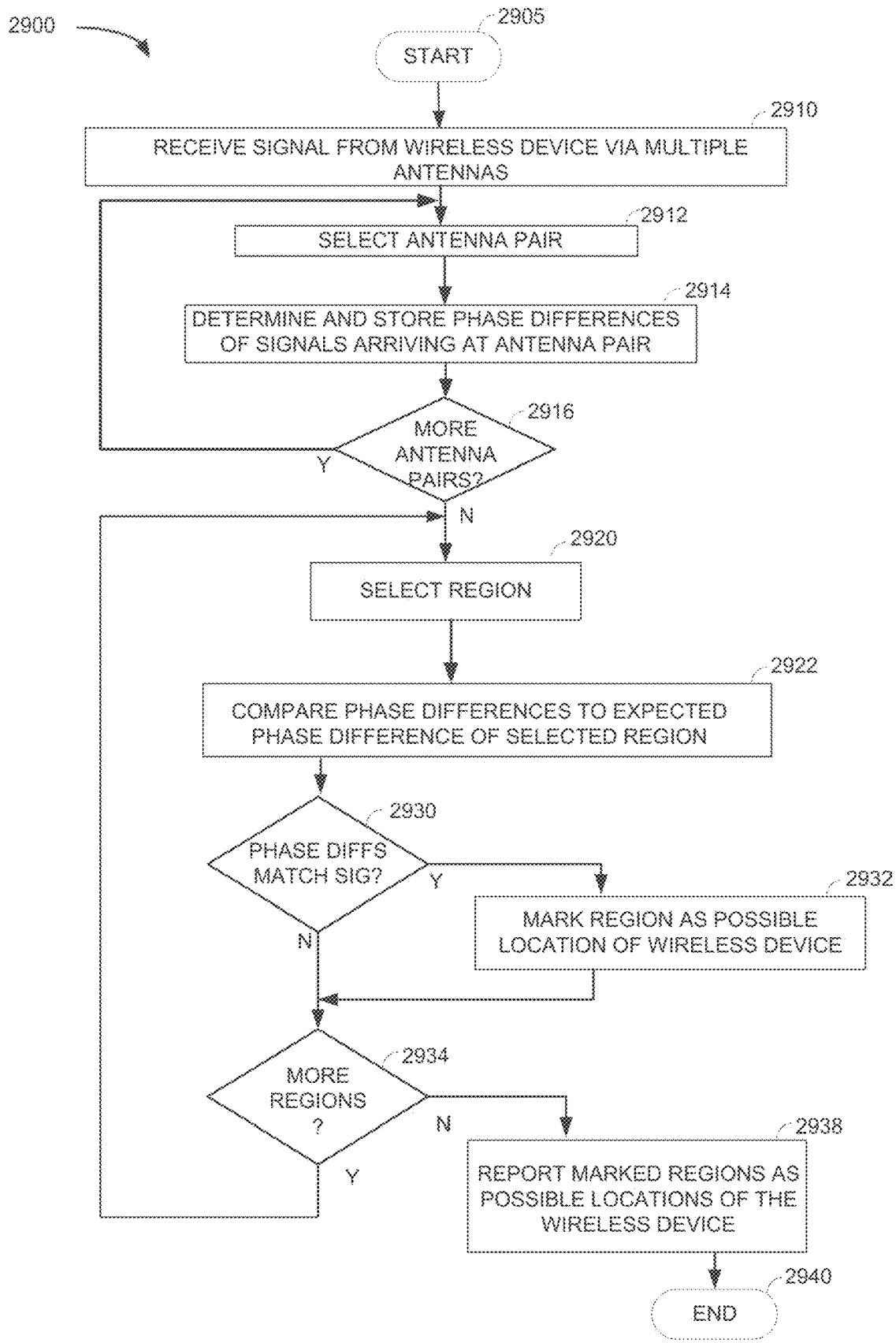
FIG. 29 is a flowchart describing an example method for determining a location of a wireless terminal based on expected phase differences for signals from multiple devices.

FIG. 29 is a flowchart describing an example method for determining a location of a WT based on expected phase differences of at least two other wireless devices. In at least some of the disclosed embodiments, one or more of the functions discussed below with respect to FIG. 29 and method 2900 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below with respect to FIG. 29 and method 2900.

Method 2900 starts at operation 2905 and proceeds to operation 2910 where signal(s) from a WT are received by multiple antennas. The method proceeds to operation 2912 where a pair of antennas is selected and in operation 2914 the difference in arrival phase of the signals at these two antennas is determined and stored.

Method 2900 proceeds to operation 2916 where the operation determines whether there are additional pairs of antennas to be processed. If the operation determines that there are additional pairs of antennas to be processed, method 2900 returns to operation 2912 and selects a next antenna pair. However, if operation 2916 determines that all of the phased differences from all antenna pairs have been determined, the method proceeds to operation 2920 where a region is selected.

In some embodiments, method 2900 performs operation 2922 though the end operation 2940 to determine a location of the WT. Operation 2922 compares phase differences of the received signals at the different antennas to the expected phase differences of the selected region. As discussed above, expected phase differences are determined according to one or more of Equations 7-12b. The expected phase differences are also a function of, in at least some embodiments, layout information of the transmitting device and/or the receiving device, as the layout of transmit elements and/or receive elements affects distances between the elements.

Decision operation 2930 determines whether the comparison indicates the measured phase differences and the expected phase differences for the selected region match. What determines if a match occurs may vary by embodiment, as described above. If a match is detected, method 2900 moves from decision operation 2930 to operation 2932 where the region is marked as a potential location of the WT. In some embodiments, along with storing an indication that the region is a possible match, an associated probability is also stored. The probability indicates a likelihood that the region is a match. After all the "matching" regions are identified, some embodiments use these stored probabilities to weight or otherwise select a location estimate from multiple stored location estimates. Returning to the discussion of decision operation 2930, if the measured phase differences do not match the expected phase differences for the region, method 2900 moves from decision operation 2930 to decision operation 2934.

In either case, the method 2900 proceeds to decision operation 2934 which examines whether there are other regions that need to be evaluated as potential locations of the WT. If the operation determines that there are additional regions, method 2900 returns to operation 2920 and a next region is selected. However, if decision operation 2934 determines that all of the regions have been processed, then method 2900 moves from decision operation 2934 to operation 2938, where the location of the WT is determined and then reported. In one example embodiment, the location of the WT is determined based on a weighted average of the regions marked in operation 2932. In some embodiments, the weighting is based on the respective probabilities that the WT is located in a corresponding region. In accordance with yet another example embodiment, the method determines that the WT is located in the region with the highest probability.

In accordance with another embodiment, the location of the WT is calculated in the coordinates of each WT and then the respective locations are mapped/transformed based on the orientation of each AP to the reference coordinates. In either case, the location of the WT is determined and reported. After operation 2938, method 2900 moves to end operation 2940.

Figure 30:
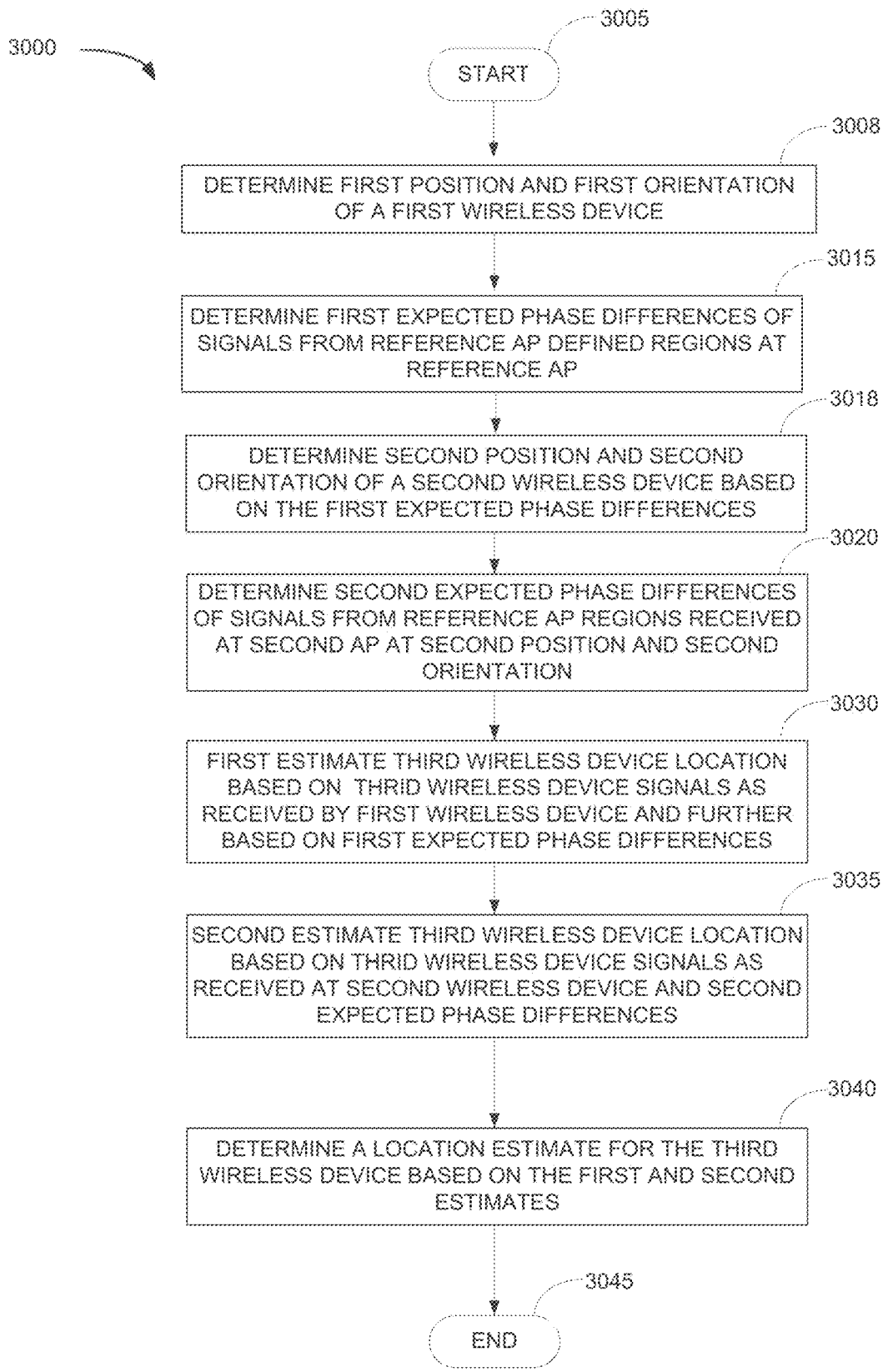
FIG. 30 is a flowchart of an example method for estimating a location of a wireless terminal.

FIG. 30 is a flowchart of an example method for estimating a location of a wireless terminal. In at least some of the disclosed embodiments, one or more of the functions discussed below with respect to FIG. 30 and method 3000 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3005, method 3000 moves to operation 3008, where a first position and first orientation of a first wireless device is determined. In some embodiments, the first wireless device is a reference access point. The first position and first orientation are determined, in some embodiments, based on configuration information provided by an operator. In other embodiments, the first position and first orientation are determined based on integrated orientation and/or positioning sensors of the first wireless device itself.

In operation 3015, first expected phase differences of signals when received at the reference AP are determined. The first expected phase differences are computed for each of a plurality of regions. In some embodiments, the plurality of regions are defined by the first wireless device and/or based on the first wireless device's first position and/or first orientation. In some embodiments, operation 3015 is performed in accordance with method 2700, discussed above with respect to FIG. 27. In some embodiments, operation 3015 is performed for each region in accordance with one or more of Equations 7-12b discussed above.

In operation 3018, a second position and a second orientation of a second wireless device is determined. In some embodiments, the second position and second orientation is based on the first position and orientation. The determination is also based on the first expected phase differences. In some embodiments, the determined second position and second orientation is relative to the first wireless device. For example, as discussed above, in some embodiments, a location of the second wireless device is determined, by at least some of the disclosed embodiments, by comparing phase differences of a signal received at the first wireless device, where the signal is transmitted by the second wireless device, to expected phase differences defined for a plurality of regions, such as the plurality of regions discussed with respect to operation 3015 above and the first expected phase differences. In some embodiments, operation 3018 is consistent with the discussion above with respect to FIG. 14 and/or that of method 3200 discussed below with respect to FIG. 32. For example, operation 3018 is repeated, in some embodiments, for a plurality of antennas of the second wireless device. In some embodiment, operation 3018 includes reception, by the first wireless device, of multiple signals from the second wireless device. The multiple signals are transmitted at different frequencies and/or by multiple different transmit elements of the second wireless device. Thus, some embodiments of operation 3015, discussed above, generate expected phase differences for multiple signals transmitted from multiple antennas and/or at multiple different frequencies.

As also discussed above, some of the disclosed embodiments compare the expected phase differences with phase differences of signals received from a device to determine a location of that device.

As discussed with respect to FIG. 33 below, some embodiments obtain a predefined layout defining relative physical locations of transmit elements of the second wireless device. The relative physical locations are shifted and/or rotated in three-dimensional space until a best fit between the relative locations defined by the layout and the estimated positions of the second wireless device's transmit elements are obtained.

In operation 3020, second expected phase differences of signals received at the second wireless device are determined. This establishes expected phase differences of the second wireless device in the plurality of regions using the second location and second orientation of the second wireless device which was determined in operation 3018. In other words, in method 3000, both the first wireless device and the second wireless device determine location estimates using a common coordinate space and/or common plurality of regions. Because the first wireless device and second wireless device are located in different positions relative to the common plurality of regions, the expected phase differences used by each device for location determinations will be different. However, both of these sets of expected phase differences reference the same set of regions for location estimates. This facilitates combining location estimates generated by the two wireless devices, as discussed further below.

In some embodiments, operation 3020 includes determining locations of each of the plurality of regions relative to the second wireless device. This includes, in some embodiments, determining a position and orientation of the second wireless device relative to the first position and first orientation of the first wireless device. Once the relative position and orientation of the second wireless device is known, the relative position of each of the plurality of regions relative to the receive elements of the second wireless device can also be understood, since the relative orientation of the plurality of regions and the first location and first position are already known. From this information, the second expected phase differences can be determined. An example of one embodiment of operation 3020 is described above with respect to method 2700 and FIG. 27.

In operation 3030, a third location of a third wireless device is estimated based on signals received from a third wireless device by the first wireless device. The third location is further determined based on the first expected phase differences. In some embodiments, operation 3030 operates in accordance with the method 3200, discussed below with respect to FIG. 32, to estimate the third location of the third wireless device. Method 3200 is performed, in some embodiments of operation 3030, once for each transmit element (or at least multiple transmit elements) of the third wireless device. Thus, in some embodiments, operation 3030 estimates a third location of each transmit antenna (or transmit element) of the third wireless device.

In operation 3035, a fourth location of the third wireless device is estimated based on signals received from the third wireless device by the second wireless device. The fourth location is further determined based on the second expected phase differences, Since the second expected phase difference is determined with respect to the plurality of regions, which are common with the first location estimate of operation 3030, the fourth location of the third wireless device determined by the second wireless device is also with respect to the common plurality of regions. In some embodiments, operation 3035 operates consistent with the discussion of FIG. 14, discussed above, and/or in accordance with the method 3200, discussed below with respect to FIG. 32, to generate the second estimate of the location of the third wireless device. Method 3200 is performed, in some embodiments of operation 3035, once for each transmit element of the third wireless device. Thus, in some embodiments, operation 3035 estimates a location of each transmit element or antenna of the third wireless device.

In operation 3040, the first and second location estimates (e.g. those derived from signals exchanged between the third wireless device and the first wireless device, and those derived from signals exchanged between the third wireless device and the second wireless device), are aggregated. In some embodiments, the aggregation includes averaging some or all of the location estimates. In some embodiments, outlier location estimates are discarded before the averaging. In some embodiments, a centroid of the location estimates is determined and used as a location estimate for the third wireless device.

Some embodiments aggregate the third location and fourth location estimates by determining a mid-point of the location estimates. In some embodiments, a centroid of the location estimates is determined. In some embodiments, each of operation 3030 and operation 3035 obtain a plurality of location estimates for the third wireless device. Operation 3040 then aggregates these two pluralities of estimates. An aggregated location estimate is then determined based on the aggregated probabilities. For example, regions are weighted based on their probabilities to determine an aggregated location estimate. In some embodiments, operation 3040 discards outlier location estimates, and identifies a subset of the two pluralities of estimates within a threshold distance of a centroid of the subset. The subset of location estimates are then averaged or aggregated.

In some embodiments, each one of the third and fourth location estimates has an associated probability. In some of these embodiments, the aggregation is based on the associated probabilities. For example, some embodiments weight each of the third and fourth location estimates based on its corresponding probabilities (high confidence estimates receiving more weight than lower confidence estimates)

Some embodiments of method 3000 determine an aggregated location estimate based on the aggregated first and second location estimates. In some embodiments, the first and second location estimates are averaged, or a weighted average is determined based on probabilities associated with each of the first and second location estimates.

In some embodiments, the location estimate of the third wireless device is based on the aggregated estimate, but is also augmented by motion information received from the third wireless device itself, and prior location estimates.

Some embodiments of method 3000 transmit the aggregated location estimate over a network to another device. For example, in some embodiments, the location estimate is sent to a back-end and/or back-haul server. The back-end or back-haul server then distributes the location estimate to one or more services. In some embodiments, the location estimate, along with information identifying the third wireless device, such as the third wireless device's station address, a mobile identification number (MIN), or other unique identifier of the wireless terminal is transmitted to another device. In some embodiments, the information determined and/or collected is transmitted to an advertising network, which uses the information to select advertisements displayed on a screen of the third wireless device.

After operation 3040 completes, method 3000 moves to end operation 3045.

Figure 31:
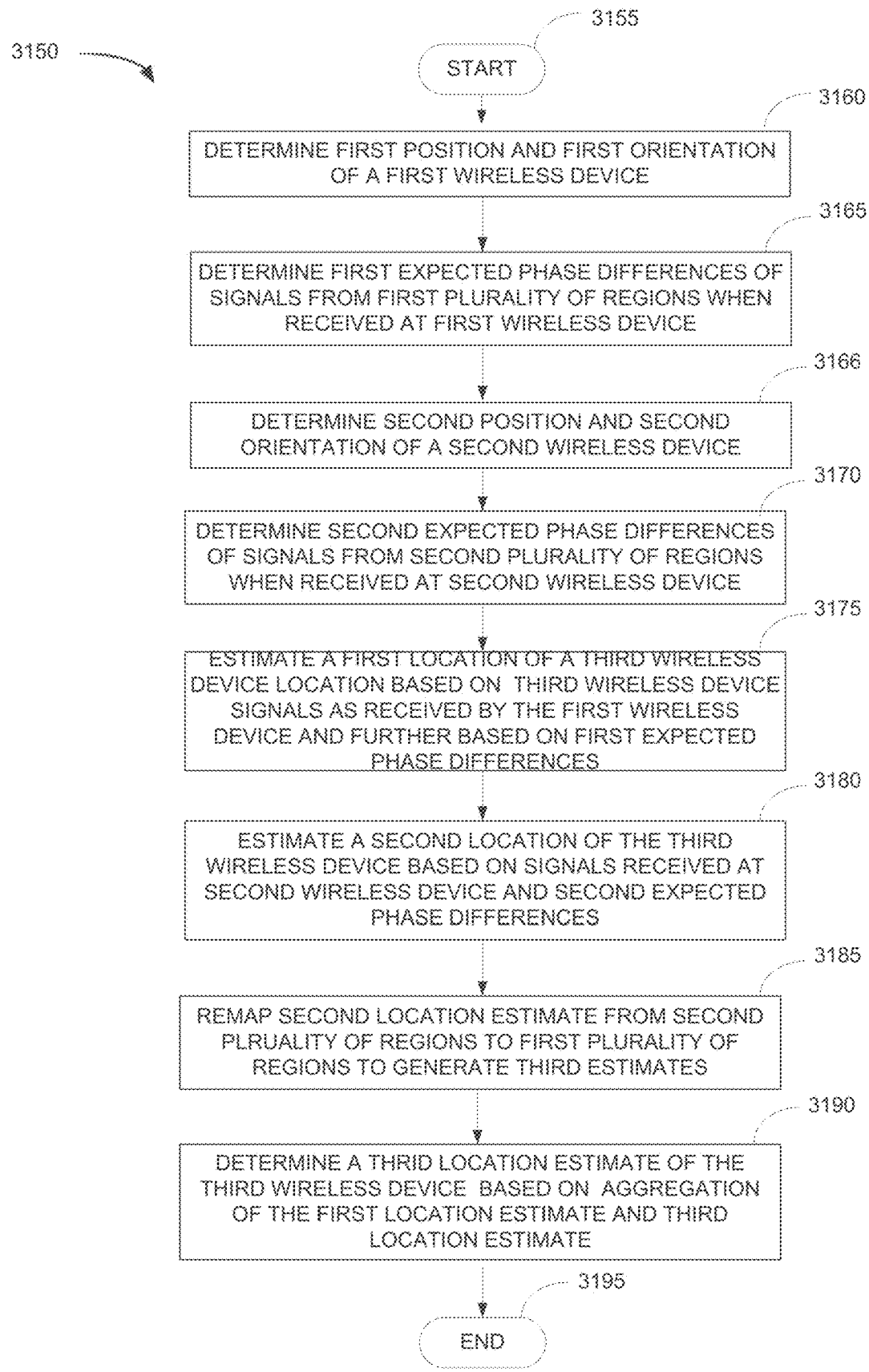
FIG. 31 is a flowchart of an example method for estimating a location of a wireless terminal.

FIG. 31 is a flowchart of an example method for estimating a location of a wireless terminal. In at least some of the disclosed embodiments, one or more of the functions discussed below with respect to FIG. 31 and method 3150 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3155, method 3150 moves to operation 3160 that determines a first position and first orientation of a first AP. In some embodiments, operation 3160 operates in accordance with the method 3200, discussed below to determine the first wireless device first position and the first orientation.

In operation 3165, first expected phase differences are determined. The first expected phase differences are determined for a transmitter in each of a first plurality of regions. The first plurality of regions are assigned to and/or defined by the first wireless device. In other words, the first wireless device performs its location estimates with reference to the first plurality of regions. The first expected phase differences are those phase differences that would be experienced by two or more receive elements at the first wireless device location and orientation when the transmitter transmits from each of the plurality of regions. In some embodiments, the first expected phase differences are determined in accordance with method 2700, discussed above with respect to FIG. 27.

In operation 3166, a second position and second location of a second wireless device are determined. In some embodiments, the second position and second orientation are relative to the first position and first orientation of operation 3160. Some embodiments of operation 3166 operate in a similar manner to operation 3018. For example, the second position and second location are determined based on the first expected phase differences, and a signal transmitted by the second wireless device and received by the first wireless device. By comparing the phase differences of the transmitted signal against the first expected phase differences of operation 3015, location(s) of one or more transmit elements of the second wireless device within the first plurality of regions is determined.

In operation 3170, second expected phase differences are determined. The second expected phase differences are determined for a transmitter in each of a second plurality regions defined by and/or assigned to the second wireless device. In other words, the second wireless device performs location estimates with reference to the second plurality of regions. Furthermore, expected phase differences used for those location estimates are with respect to the second plurality of regions.

The second expected phase differences are those phase differences that would be experienced by a receiver at the second wireless device location and orientation when the transmitter transmits from each of the plurality of second wireless device regions. In some embodiments, the second expected phase differences are determined in the coordinates of the second wireless device in accordance with method 2700, discussed above with respect to FIG. 27.

Operation 3175 estimates a first location(s) of a third wireless device based on signals received by the first wireless device from the third wireless device. The first location(s) are further estimated based on the first expected phase differences and are with respect to the first plurality of regions.

Operation 3180 generates second estimates second location(s) of the third wireless device in the coordinates of the second wireless device based on signals received by the second wireless device from the third wireless device. The second location(s) are further estimated based on the second expected phase differences and are with respect to the second plurality of regions.

Operation 3185 maps the second location(s) estimate(s), which are with respect to the second plurality of regions, to be instead with respect to the first plurality of regions. This mapping is based on, at least the second location/position and second orientation of the second wireless device relative to the first position/location and first orientation of the first wireless device. The relative position defines a shift operation that transforms the second position of the second wireless device to be equivalent to the first position of the first wireless device, discussed above with respect to operation 3160. This shift operation is then applied to the second location estimate to shift the second location estimate to an equivalent position within the first plurality of regions. Thus, in some embodiments, the mapping translates the second location estimate from an estimate relative to the second plurality of regions to a third location estimate that is relative to the first plurality of regions.

In operation 3190, the first and third location estimates (e.g. those derived from signals exchanged between the third wireless device and the first wireless device, and those derived from signals exchanged between the third wireless device and the second wireless device), are aggregated. In some embodiments, the aggregation includes averaging some or all of the location estimates. In some embodiments, outlier location estimates are discarded before the averaging. In some embodiments, a centroid of the location estimates is determined and used as a location estimate for the third wireless device. After operation 3190 completes, method 3150 moves to end operation 3195.

Figure 32:
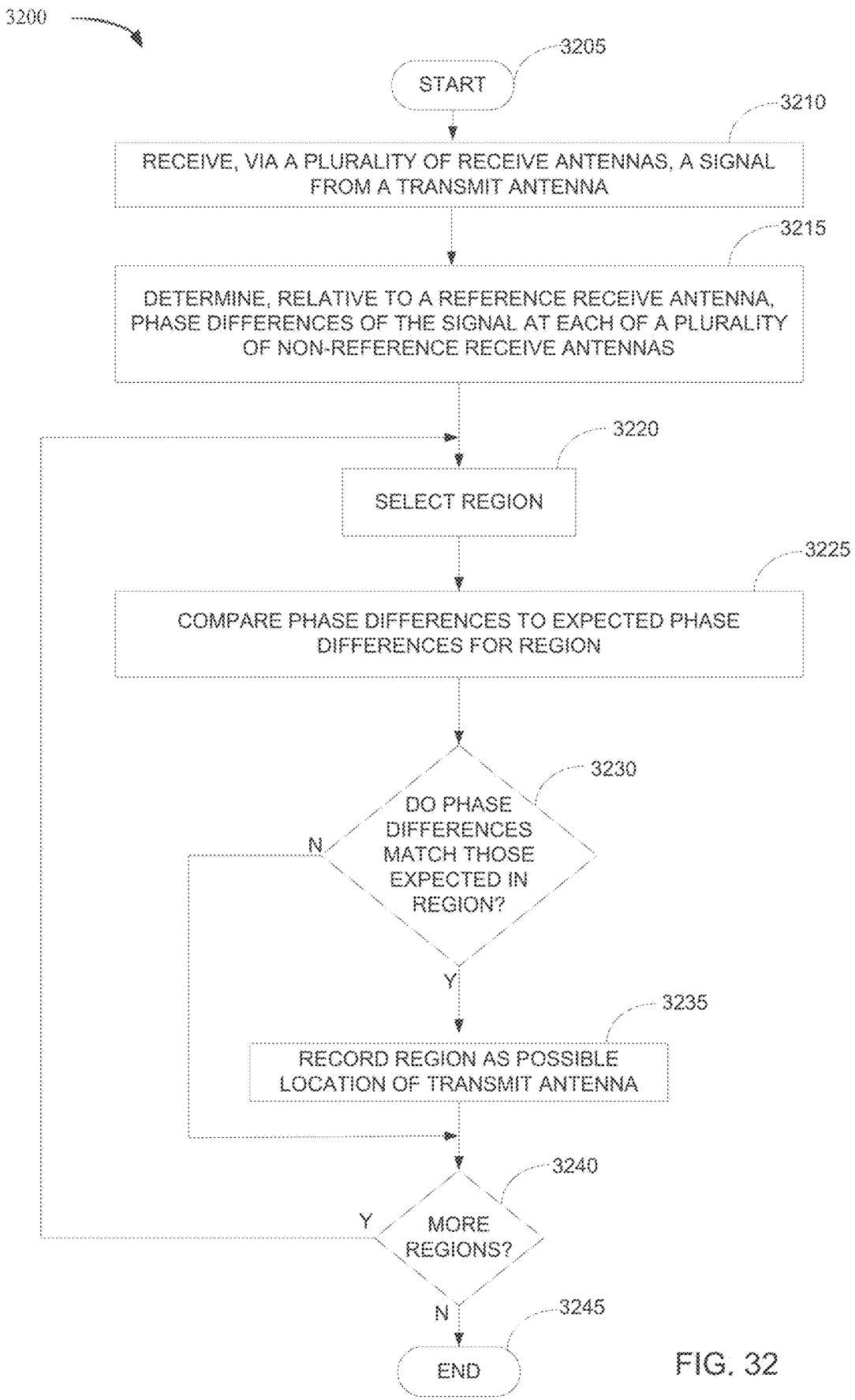
FIG. 32 is a flowchart of an example method for estimating a location of a transmit antenna.

FIG. 32 is a flowchart of an example method for estimating a location of a transmit antenna. In at least some of the disclosed embodiments, one or more of the functions discussed below with respect to FIG. 32 and the method 3200 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3205, method 3200 moves to operation 3210, where a signal from a transmit antenna is received by a plurality of receive antennas. For example, as discussed above, a wireless terminal, or an access point, transmits a signal via the transmit antenna. The signal is received by another device, such as an access point. In some embodiments, the receiving device is a reference access point. The plurality of receive antennas include a reference antenna and one or more non-reference antennas. The reference antenna is used to generate relative phase differences between a signal received by the reference antenna and each of the non-reference antennas, as discussed further below.

Operation 3215 determines relative phase differences between the signal received at the reference receive antenna and the signal received at each of the non-reference receive antennas.

In operation 3220, a region is selected. The region selected is one of a plurality of regions defined by a location relative to an access point. For example, the region selected is, in some embodiments, one of the regions in the first plurality of regions 192A or the second plurality of regions 192B, discussed above with respect to FIG. 2. In operation 3225, the phase differences measured/determined in operation 3215 are compared to expected phase differences for the selected region. For example, as discussed above with respect to FIG. 27 and method 2700, some embodiments compute expected phase differences to be experienced by a specific antenna pair of a receiving device at a particular location from a device located in a particular region of a plurality of regions. For example, the expected phase differences of a signal generated by the WT 194 of FIG. 2 as received by a pair of receiving antennas of the access point 191A or access point 191B are determined in an example embodiment.

Decision operation 3230 evaluates results of the comparison performed by operation 3225. If the expected phase differences from the selected region match those determined in operation 3215, method 3200 moves from decision operation 3230 to operation 3235, which marks, records, or otherwise stores an indication that the selected region is one possible location of the device. After operation 3235 completes, method 3200 moves to decision operation 3240.

If the expected phase differences of the region are substantially different from those determined in operation 3215 (e.g. larger than a predefined threshold), then the method 3200 moves from decision operation 3230 to decision operation 3240 (and does not perform operation 3235). Decision operation 3240 evaluates whether additional regions in the plurality of regions are to be evaluated. If more regions are available for evaluation, method 3200 moves from decision operation 3240 to operation 3220, where an additional region is selected. If no further regions are available for evaluation, method 3200 moves from decision operation 3240 to end operation 3245.

Figure 33:
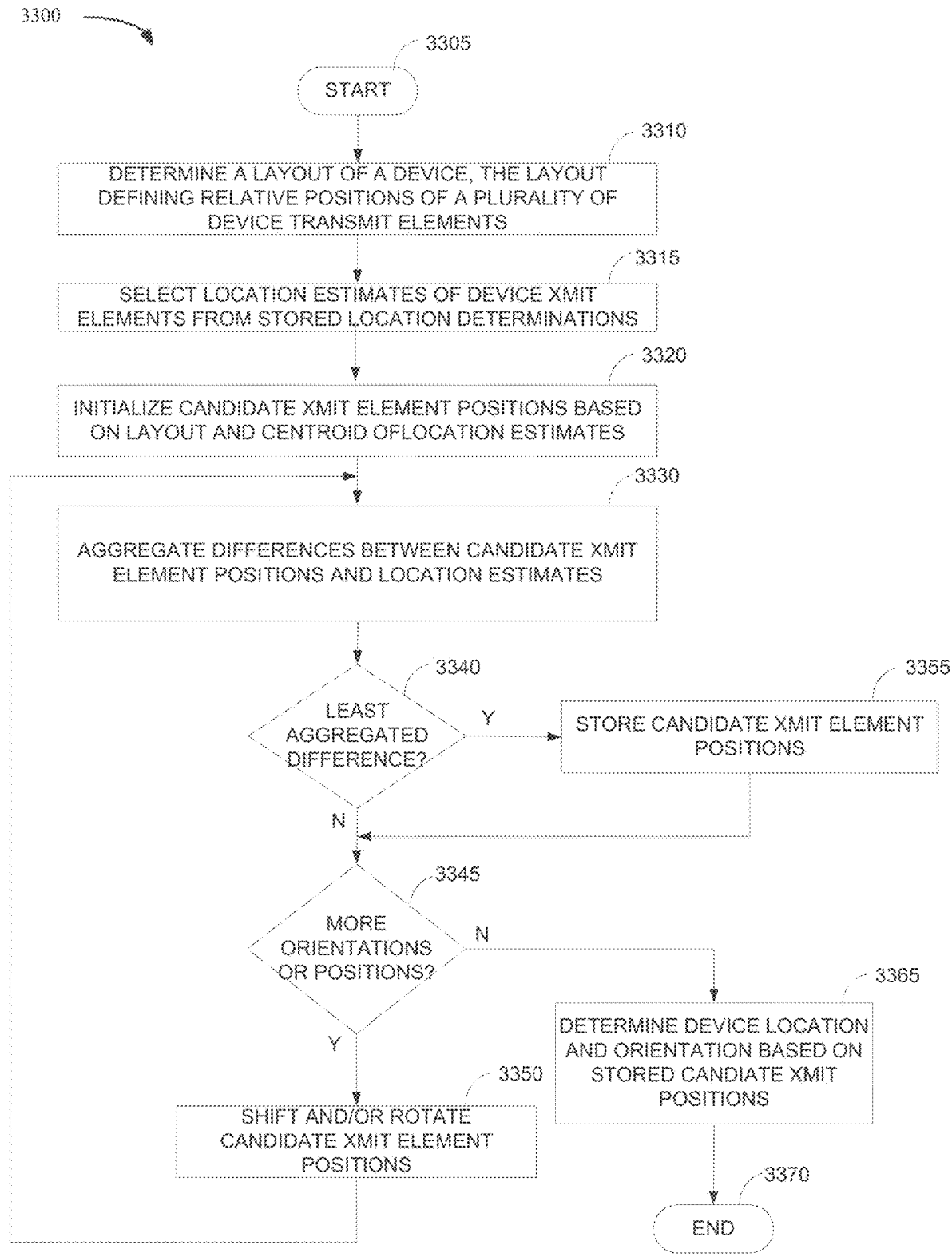
FIG. 33 is a flowchart of an example method for estimating a location and an orientation of a wireless device.

FIG. 33 is a flowchart of an example method for estimating a location and an orientation of a wireless device. In some embodiments, the wireless device is an access point. In at least some of the disclosed embodiments, one or more of the functions discussed below with respect to FIG. 33 and method 3300 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3305, method 3300 moves to operation 3310 that determines a transmit element layout of a device. The transmit element layout defines relative positions of a plurality of device transmit elements. For example, as discussed above with respect to FIG. 3, the layout includes, in some embodiments, the relative antenna coordinates 395A-E, which represent positions of the transmit elements relative to a reference point (e.g. reference point 393) of a device (e.g. wireless device 480). FIG. 2D discussed above, provides example data structures used in some embodiments to store antenna (e.g. transmit element, receive element) position information.

Operation 3315 selects location estimates of device transmit elements from stored transmit element location determinations. For example, as discussed above with respect to FIG. 32, operation 3235 stores locations of a transmit element that exhibits relative matches with expected phase differences of signals received from the transmit element. Method 3200 operates iteratively in some embodiments to store locations of multiple transmit elements for a single device. Furthermore, in some embodiments, multiple possible or candidate location estimates of a single transmit element are stored by operation 3235. Thus, operation 3315 selects a single set of location estimates for a set of device transmit elements.

In operation 3320, initial candidate positions of the transmit elements is determined. These initial candidate positions are based, in some embodiments, on a centroid of the location estimates for the transmit elements, and the relative positions of the transmit elements as defined by the layout. For example, in some embodiments, a reference point defined by the layout is aligned with the centroid for the location estimates, and the candidate positions are then determined based on the relative positions of the antennas from the reference point as defined by the layout.

In operation 3330, aggregated function of differences between the candidate positions and the location estimates are determined. For example, a different distance is determined between each transmit element position defined by the candidate positions and a location estimate for that transmit element obtained in operation 3315. (See equation 14.)

Operation 3330 compares the function of aggregated differences in transmit element positions determined by operation 3330 to previously obtained aggregated differences. For example, if a layout defines positions for five different transmit elements of a device, operation 3330 generates at least five differences between the candidate transmit element positions for those five transmit elements to the location estimates obtained in operation 3315. Operation 3330 then aggregates these differences.

Decision operation 3340 determines if the function of the aggregated difference determined in operation 3330 is the smallest thus far evaluated (an initial evaluation of operation 3340 assumes the first aggregated difference is the smallest). If a smallest aggregated difference is identified, method 3300 moves from decision operation 3340 to operation 3355, which stores the candidate positions of the transmit elements. Decision operation 3345 determines whether additional orientations and/or positions of the candidate transmit element positions are to be evaluated. For example, some embodiments of method 3300 shift the candidate transmit element positions through a plurality of x, y, and z coordinates (in both a positive and negative direction) from the initial positions that are based on the centroid, discussed above. These embodiments also rotate the candidate transmit element positions as defined by the layout through rotations around each of the x, y, and z axis. If all of these shifts and rotate operations have been completed, method 3300 moves from decision operation 3345 to operation 3365, which determines a device location and orientation based on the stored candidate transmit positions (that represent the minimum aggregated difference as determined by decision operation 3340). in some embodiments, operations 3340 through operation 3360 determine the location of the transmit elements as described above based on Equation 14.

If additional shifting and/or rotating of the candidate transmit element positions are to be evaluated, process 3300 moves from decision operation 3345 to operation 3350 where the shifting and/or rotating occurs. Processing then returns to operation 3330.

Figure 34:
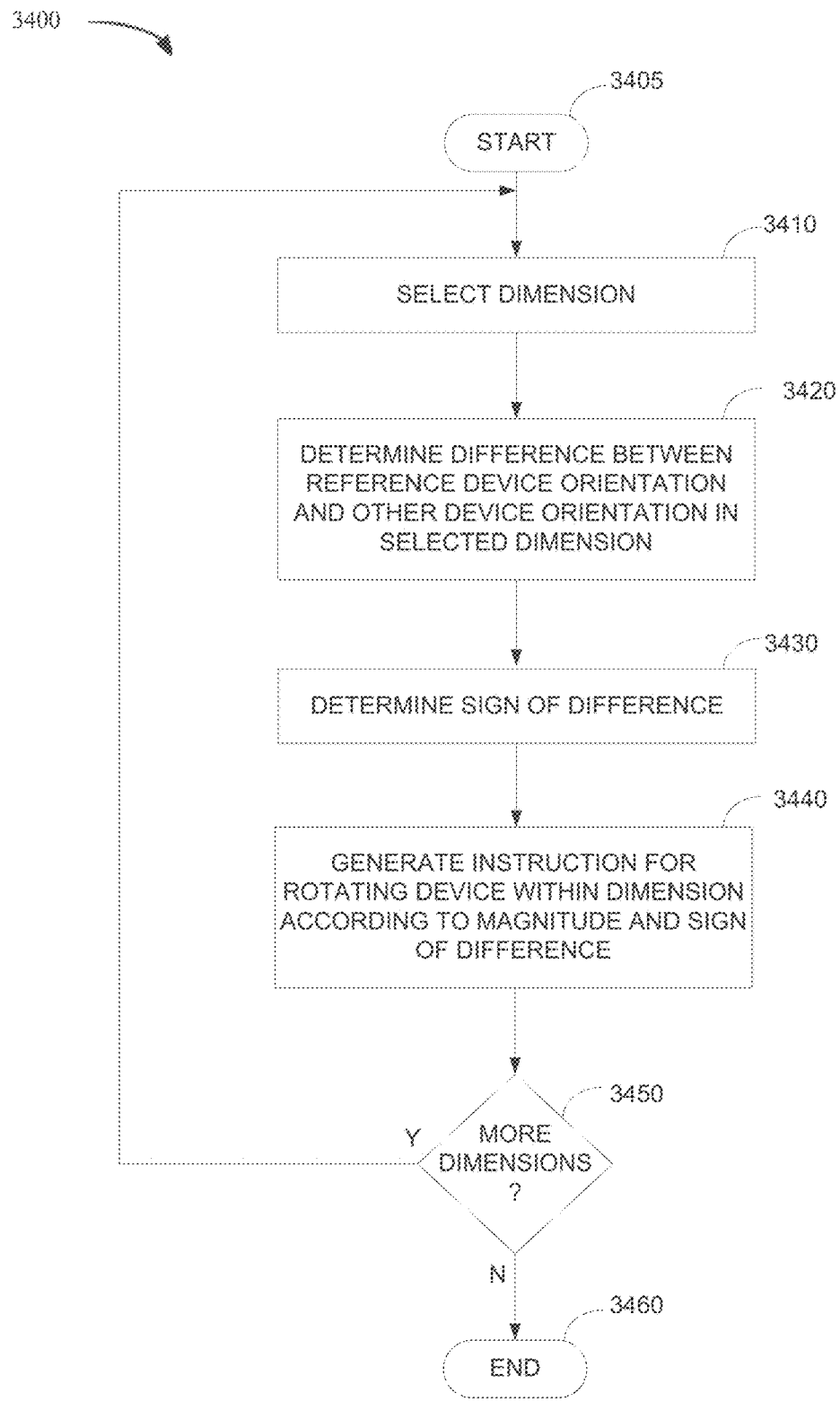
FIG. 34 is a flowchart of an example method for generating alignment instructions for a wireless device.

FIG. 34 is a flowchart of an example method for generating alignment instructions for a wireless device. In some embodiments, the wireless device is an access point. In some embodiments the wireless device is an access point (e.g. a "second access point), whose orientation is to be aligned with a reference access point orientation. In at least some of the disclosed embodiments, one or more of the functions discussed below with respect to FIG. 34 and method 3400 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3405, method 3400 moves to operation 3410 that selects a dimension. Possible dimensions selected in operation 3410 include a horizontal dimension or yaw, vertical dimension or pitch, and a rotation dimension or roll. These dimensions may also be considered an X, Y, and Z axis delineating a three-dimensional space.

In operation 3420, a difference between a reference device orientation and a second device orientation is determined. For example, in some embodiments, after an orientation of a reference AP is determined and a second orientation of a second AP is determined, a relative difference between the first and second orientations is determined. Some embodiments of operation 3420 determine the relative difference in each of the pitch, roll, and yaw, the three dimensions discussed above with respect to operation 3410. For example, as discussed above with respect to FIG. 4, a difference in orientation between two devices is shown by angles 497 and 498. Operation 3420 determines angle 497, in some embodiments, and analogous angles of rotation about other axis, such as the X and Y axis of FIG. 4.

In operation 3430, a sign of the difference between the device orientation and the second device orientation is determined. In other words, some embodiments represent a direction in one dimension as positive, and an opposite direction in that dimension as negative. Thus, if two devices differ in their orientation with respect to a specific dimension, the difference is represented as either positive or negative depending on which direction the non-reference device needs to be rotated in order to align with the reference device in that dimension. For example, as illustrated in FIG. 4, the sign of the difference relates to a direction of misalignment between the two devices. As illustrated in FIG. 4, a sign of a misalignment of device 481 relative to wireless device 480 of FIG. 4 is shown by angle 498. A rotation of opposite sign (e.g. the arrow 499) is needed to align the orientations of the two devices, wireless device 480 and wireless device 481.

In operation 3440, instructions to rotate the non-reference device about the selected axis are generated based on a magnitude of the difference between the non-reference device and the reference device in that dimension, and the sign of the difference. For example, the instructions are generated, in some embodiments, to rotate the non-reference device in a direction opposite the determined difference. The magnitude of the rotation instructed is equivalent to the magnitude of the difference determined in operation 3420, at least in some embodiments. For example, while angle 498 of FIG. 4 shows a direction of misalignment of the device 481 relative to the wireless device 480, arrow 499 shows a direction of rotation needed to realign the two deices, at least about the Z axis 492C.

Decision operation 3450 determines if alignment along additional dimensions need to be evaluated (in some embodiments, method 3400 iterates three times, once for each of three axes). If more dimensions need to be evaluated, method 3400 moves from decision operation 3450 to operation 3410, where a different dimension is selected. Otherwise, method 3400 moves from decision operation 3450 to end operation 3460. In accordance with another example embodiment, the alignment is done in an iterative manner wherein in each iteration the alignment is done only partially and repeated until the misalignment is driven to be smaller than a predetermined threshold.

Figure 35:
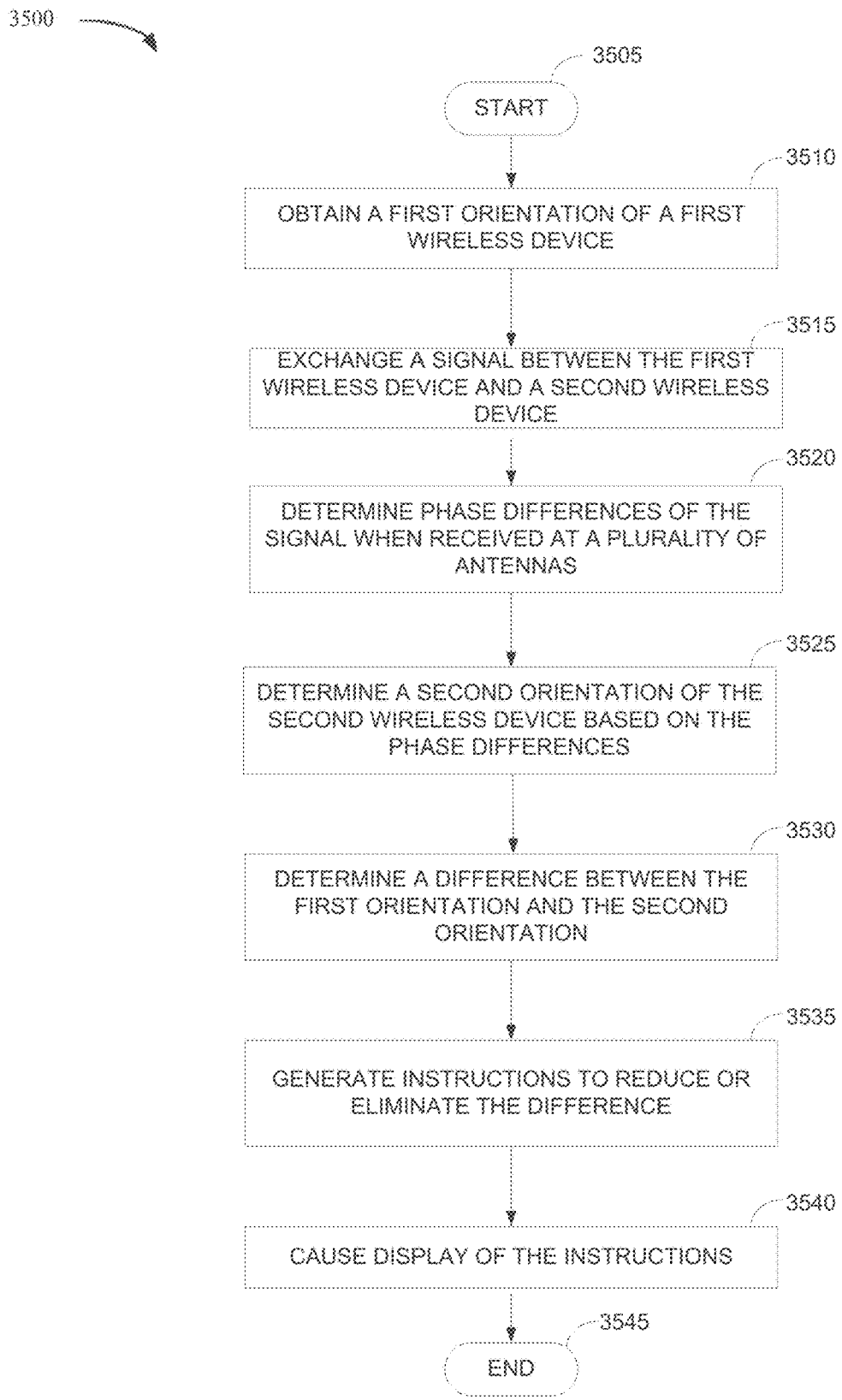
FIG. 35 is a flowchart of an example method for determining a location of a wireless terminal.

FIG. 35 is a flowchart of an example method for determining a location of a wireless terminal. In some embodiments, one or more of the functions discussed below are performed by an access point. In at least some of the disclosed embodiments, one or more of the functions discussed below with respect to FIG. 35 and method 3500 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3505, method 3500 moves to operation 3510. In operation 3510, a first orientation of a first wireless device is obtained. Some embodiments obtain the first orientation via an orientation sensor that is integrated into the first wireless device. In accordance with another example embodiment the location and orientation of the wireless device are obtained by using tools external to the wireless device. Some embodiments set the orientation of the first wireless device to a reference predefined orientation (e.g. some embodiments use the orientation of the first wireless device as a reference orientation, and in some of these embodiments the location of the first wireless device is set to coordinates (0, 0, 0) and the orientation (pitch, roll, yaw) is set to (0, 0, 0) as well.

In operation 3515, a signal is exchanged between the first wireless device and a second wireless device. In some embodiments, exchanging the signal includes receiving the signal at the first wireless device, where the signal was transmitted by the second wireless device. In some other embodiments, exchanging the signal includes receiving the signal at the second wireless device, where the signal was transmitted by the first wireless device. The disclosed embodiments may operate with any waveform as a signal. In various embodiments, the signal is a Wi-Fi signal/waveform, a Bluetooth signal/waveform, a cellular signal/waveform, an optical signal/waveform, or a sound waveform.

In operation 3520, phase differences of the signal when received at a plurality of antenna pairs is determined. As discussed above, in some embodiments, operation 3520 receives a signal from the first wireless device at a plurality of antenna pairs of the second device. Phase differences between the signal as received at a reference antenna of the second device and each of the plurality of antennas are determined. In accordance with another example embodiment, rather than defining a reference antenna, phase differences are measured between any pair of the receiver's antennas.

In operation 3525, a second location and orientation of the second wireless device is determined based on the determined phase differences. For example, as discussed above with respect to FIG. 15B, some embodiments estimate locations of a plurality of antennas of the second wireless device. These location estimates are made, in some embodiments, by comparing the phase differences determined in operation 3520 to expected phase differences in a plurality of regions. A region having expected phase differences that match phase differences determined by the operation 3520 is an indication that the antenna generating the signal is located in the region.

Once the antenna locations are determined, some embodiments obtain a predefined layout of relative antenna locations on the second wireless device (e.g. as discussed above with respect to FIG. 3). Some embodiments maintain a library or data store of antenna layouts for a variety of wireless devices. In some embodiments, a particular layout is identified based on a model number or other description of the wireless device.

Some embodiments then move and rotate the layout of the plurality of antennas of the second device within a three-dimensional space, and compare the move and rotated layout to the estimated antenna locations of the second device. The orientation of the second device is than based on a rotation of the layout (in pitch, yaw, and roll) that provides a best fit with the estimated antenna locations. As discussed above, in some embodiments, an orientation (such as the second orientation) is defined by the three angle space (e.g. pitch, yaw, roll). In some embodiments, the orientation is relative to another orientation. For example, in some embodiments, the second orientation is determined relative to the first orientation of the reference device. In some other embodiments, the second orientation is defined relative to a predefined reference orientation.

In operation 3530, a difference between the first and second orientation is determined. In some embodiments, operation 3530 determines between one and three differences between the first and second orientations. A first difference is with respect to rotation about a first axis of a three-dimensional space (e.g. a pitch about the X axis). A second difference is with respect to a rotation about second axis of the three-dimensional space (a roll about the Y axis). A third difference is with respect to a rotation about a third axis of the three-dimensional space (e.g. a Yaw about the Z axis).

In operation 3535, instructions are generated to reduce or eliminate the difference. In some embodiments, operation 3535 includes generating one or more instructions for each of the pitch, roll, and yaw rotations, depending on differences determined in operation 3530, as discussed above. Some embodiments of operation 3535 include one or more of the functions discussed above with respect to FIG. 34 and method 3400.

Operation 3540 causes display of the instructions generated in operation 3535. As discussed above, instructions for aligning a wireless device take different forms in various embodiments. In some embodiments, instructions are displayed by illuminating one or more lights (e.g. LEDs) that are physically attached to the wireless device. In some embodiments, instructions are displayed via an electronic display, such as on a mobile device or administrative console. In some embodiments, instructions are displayed via audio (e.g. an audio signal is generated and provided to a speaker). For example, some wireless devices generate verbal instructions to align the second wireless device with the first wireless device. After operation 3540 completes, method 3500 moves to end operation 3545. Examples of instructions generated and displayed in operations 3535 and 3540 are provided above with respect to any one or more of FIGS. 5-7.

Some embodiments of method 3500 iteratively perform the alignment process described above. Thus, these embodiments iteratively determine an orientation of the second wireless device, calculate differences between the orientation and that of the first wireless device, and generate instructions to correct any misalignment between the two orientations. Instructions are caused to be displayed, and then additional orientation determinations are made until either input is received ending the alignment process or the alignment between the two devices meets a criterion (e.g. one or more dimensions of the alignment fall within an alignment tolerance.

Figure 36:
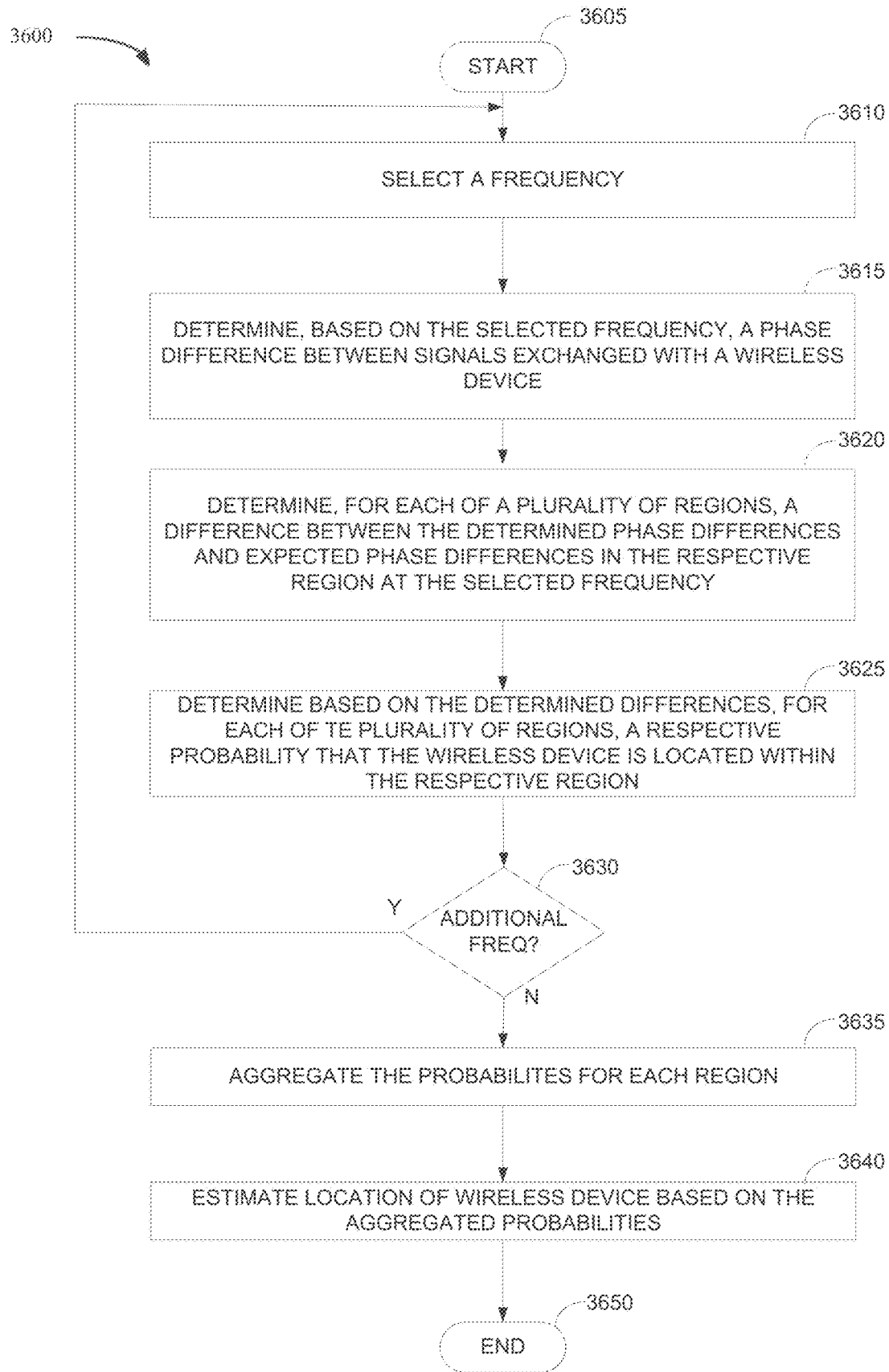
FIG. 36 is a flowchart of an example method for determining a location of a wireless device.

FIG. 36 is a flowchart of an example method for determining a location of a wireless device. In some embodiments, one or more of the functions discussed below are performed by an access point. In accordance with yet another example embodiments, one or more of the functions discussed below are performed by a location engine, e.g., 165 of FIG. 1. In at least some of the disclosed embodiments, one or more of the functions discussed below with respect to FIG. 36 and method 3600 are performed by hardware processing circuitry (e.g. any one or more of 806, 1106, 1206, or 1306). For example, in some embodiments, instructions (e.g. any one or more of routines 814, 1114, 1214, 1314) stored in an electronic memory (e.g. any one or more of hardware memories 812, 1112, 1212, or 1312) configure the hardware processing circuitry to perform one or more of the functions discussed below.

After start operation 3605, method 3600 moves to operation 3610 where a frequency is selected. As discussed above, wireless devices are capable, in at least some embodiments, of transmitting and/or receiving at a plurality of radio frequencies. Thus, operation 3610 selects one of the plurality of radio frequencies. As discussed below, method 3600 iterates, in at least some embodiments, such that operation 3610 selects a different frequency with each iteration.

Operation 3615 determines, based on the selected frequency, one or more phase differences between signals exchanged with a wireless device at the selected frequency. In some embodiments, operation 3615 includes transmitting the signals at the selected frequencies and receiving information from the wireless device that indicates the phase differences between signals received by any pair of antennas of the device. In some other embodiments, operation 3615 includes receiving the signals at the selected frequency, and measuring the phase differences at a plurality of antenna pairs.

In operation 3620, the phase differences determined in operation 3615 are compared to expected phase differences at each of a plurality of regions. Differences between the measured phase differences and the expected phase differences are determined at each of the plurality of regions.

In operation 3625, a probability that the wireless device is located in each of the respective regions is determined based on the differences associated with each region. In various embodiments, the probabilities are further based on a probabilistic distribution, such as a Gaussian distribution. The use of other types of distributions is also contemplated.

Decision operation 3630 determines if there are additional frequencies that are to be processed. For example, if a wireless device supports a plurality of frequencies, decision operation 3630 determines if all of the plurality of frequencies have been processed via method 3600. If there are additional frequencies, method 3600 returns to operation 3610, where a difference frequency is selected and processing continues as described above.

If no further frequencies need to be processed, method 3600 moves from decision operation 3630 to 3635, which aggregated probabilities associated with each region. Thus, for example, probabilities associated with a first region are aggregated into a first aggregated probability, while probabilities associated with a second region are aggregated into a second aggregated probability. In some embodiments, aggregating the probabilities includes multiplying the probabilities.

In operation 3640, a location of the wireless device is estimated based on the aggregated probabilities. In some embodiments, operation 3640 selects a region having a highest aggregated probability as the estimated location of the wireless device. In other embodiments, a plurality of regions having the highest probabilities are selected, and a centroid of the selected regions is used as the estimated location. Other embodiments vary from these two examples. After operation 3640 completes, method 3600 moves to end operation 3650.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, one or more of waveform generation, transmitting, emitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a hardware processor configured to implement one, multiple or all of the steps of one or more methods disclosed.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or mechanical devices, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems. Some of the embodiments are applicable to passive detection system that detect natural events such as earthquakes, solar flares, and other natural events.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a method of aligning orientations of two wireless devices, comprising: determining a first orientation and first position of a first wireless device; determining a second orientation and a second position of a second wireless device based on a first signal exchanged between the first and second wireless devices; generating instructions to reduce or eliminate a difference between the first orientation and the second orientation; causing performance of the instructions; in response to the causing, determining an updated orientation of the second wireless device based on a second signal exchanged between the first and second wireless devices; obtaining a first location estimate of a third wireless device, the first location estimate determined by the first wireless device at the first orientation; obtaining a second location estimate of the third wireless device, the second location estimate determined by the second wireless device at the updated orientation; and generating a third location estimate of the third wireless device based on the first location estimate and the second location estimate.

In Example 2, the subject matter of Example 1 optionally includes wherein the determining of the second orientation of the second wireless device comprises determining phase differences of the signal when received at a plurality of receive element pairs of the first wireless device, the signal transmitted from a plurality of transmit elements of the second wireless device, and determining the second orientation of the second wireless device based on the phase differences.

In Example 3, the subject matter of Example 2 optionally includes iteratively performing, until a difference between the first orientation and the second orientation meets a criterion: exchanging a signal between the first wireless device and the second wireless device, determining phase differences between signals received at the plurality of receiving elements, determining an updated second orientation based on the determined phase differences, determining an updated difference between the first orientation and the updated second orientation; generating updated instructions to reduce or eliminate the updated difference, and causing performance of the updated instructions.

In Example 4, the subject matter of Example 3 optionally includes wherein the criterion is met when at least one of a difference between the first orientation and the second orientation with respect to a first axis of a three dimensional space is below a first threshold, a second difference between the first orientation and the second orientation with respect to a second axis of the three dimensional space is below a second predefined threshold, or a third difference between the first orientation and the second orientation with respect to a third axis of the three dimensional space is below a third predefined threshold.

In Example 5, the subject matter of any one or more of Examples 2-4 optionally include receiving the signal at the plurality of receive elements, and comparing a phase of the signal when received at each receive element with respect to a reference phase of the signal when received at a reference receive element, wherein the determining of the phase differences is based on the comparing.

In Example 6, the subject matter of any one or more of Examples 1-5 optionally include wherein determining the first orientation of the first wireless device comprises initializing the first orientation to a predefined orientation with respect to at least one dimension of a three-dimensional space.

In Example 7, the subject matter of any one or more of Examples 1-6 optionally include wherein causing performance of the instructions comprises one or more of illuminating a light physically attached to the second wireless device, displaying the instructions on an electronic display, or outputting an audio signal to a speaker.

In Example 8, the subject matter of any one or more of Examples 1-7 optionally include wherein determining the second orientation comprises: estimating locations of each of a plurality of transmit elements of the second wireless device; identifying a respective layout of the second plurality of transmit elements; rotating and/or shifting the layout within a three-dimensional space; and identifying a best fit between the estimated locations and the rotated and/or shifted layout, wherein the second orientation is based on the best fit.

In Example 9, the subject matter of any one or more of Examples 1-8 optionally include wherein the generating of the instructions comprises one or more of: generating a first instruction to reduce or eliminate the orientation difference with respect to a first three-dimensional axis; generating a second instruction to reduce or eliminate a second difference between the first orientation and the second orientation with respect to a second three-dimensional axis; or generating a third instruction to reduce or eliminate a third difference between the first orientation and the second orientation with respect to a third three-dimensional axis.

In Example 10, the subject matter of any one or more of Examples 1-9 optionally include determining a difference between the first position and the second position; and shifting the second location estimate based on the determined difference, wherein the determining of the third location estimate is based on the shifted second location estimate.

In Example 11, the subject matter of any one or more of Examples 1-10 optionally include obtaining a plurality of probabilities that the third device is located within each of a corresponding plurality of regions, wherein the first location estimate of the third device is based on the plurality of probabilities.

In Example 12, the subject matter of Example 11 optionally includes weighting each of the plurality of regions based on the region's respective probability, wherein the first location estimate is based on the weightings.

In Example 13, the subject matter of any one or more of Examples 1-12 optionally include receiving input, via a user interface, indicating a change in alignment of the second wireless device and determining an updated orientation of the second wireless device in response to the input.

In Example 14, the subject matter of any one or more of Examples 1-13 optionally include determining a difference between the first orientation and the second orientation, determining the instructions based on the difference and commanding an electric motor configured to change an orientation of the second wireless device to perform the instructions.

Example 15 is a system, comprising: hardware processing circuitry; one or more hardware memories storing instructions that when executed configure the hardware processing circuitry to perform operations to align orientations of two wireless devices, the operations comprising: determining a first orientation and first position of a first wireless device; determining a second orientation and a second position of a second wireless device based on a first signal exchanged between the first and second wireless devices; generating instructions to reduce or eliminate a difference between the first orientation and the second orientation; causing performance of the instructions; in response to the causing, determining an updated orientation of the second wireless device based on a second signal exchanged between the first and second wireless devices; obtaining a first location estimate of a third wireless device, the first location estimate determined by the first wireless device at the first orientation; obtaining a second location estimate of the third wireless device, the second location estimate determined by the second wireless device at the updated orientation; and generating a third location estimate of the third wireless device based on the first location estimate and the second location estimate.

In Example 16, the subject matter of Example 15 optionally includes wherein the determining of the second orientation of the second wireless device comprises determining phase differences of the signal when received at a plurality of receive element pairs of the first wireless device, the signal transmitted from a plurality of transmit elements of the second wireless device, and determining the second orientation of the second wireless device based on the phase differences.

In Example 17, the subject matter of Example 16 optionally includes the operations further comprising iteratively performing, until a difference between the first orientation and the second orientation meets a criterion: exchanging a signal between the first wireless device and the second wireless device, determining phase differences between signals received at the plurality of receiving elements, determining an updated second orientation based on the determined phase differences, determining an updated difference between the first orientation and the updated second orientation; generating updated instructions to reduce or eliminate the updated difference, and causing performance of the updated instructions.

In Example 18, the subject matter of Example 17 optionally includes wherein the criterion is met when at least one of a difference between the first orientation and the second orientation with respect to a first axis of a three dimensional space is below a first threshold, a second difference between the first orientation and the second orientation with respect to a second axis of the three dimensional space is below a second predefined threshold, or a third difference between the first orientation and the second orientation with respect to a third axis of the three dimensional space is below a third predefined threshold.

In Example 19, the subject matter of any one or more of Examples 16-18 optionally include the operations further comprising receiving the signal at the plurality of receive elements, and comparing a phase of the signal when received at each receive element with respect to a reference phase of the signal when received at a reference receive element, wherein the determining of the phase differences is based on the comparing.

In Example 20, the subject matter of any one or more of Examples 15-19 optionally include wherein determining the first orientation of the first wireless device comprises initializing the first orientation to a predefined orientation with respect to at least one dimension of a three-dimensional space.

In Example 21, the subject matter of any one or more of Examples 15-20 optionally include wherein causing performance of the instructions comprises one or more of illuminating a light physically attached to the second wireless device, displaying the instructions on an electronic display, or outputting an audio signal to a speaker.

In Example 22, the subject matter of any one or more of Examples 15-21 optionally include wherein determining the second orientation comprises: estimating locations of each of a plurality of transmit elements of the second wireless device; identifying a respective layout of the second plurality of transmit elements; rotating and/or shifting the layout within a three-dimensional space; and identifying a best fit between the estimated locations and the rotated and/or shifted layout, wherein the second orientation is based on the best fit.

In Example 23, the subject matter of any one or more of Examples 15-22 optionally include wherein the generating of the instructions comprises one or more of: generating a first instruction to reduce or eliminate the orientation difference with respect to a first three-dimensional axis; generating a second instruction to reduce or eliminate a second difference between the first orientation and the second orientation with respect to a second three-dimensional axis; or generating a third instruction to reduce or eliminate a third difference between the first orientation and the second orientation with respect to a third three-dimensional axis.

In Example 24, the subject matter of any one or more of Examples 15-23 optionally include the operations further comprising: determining a difference between the first position and the second position; and shifting the second location estimate based on the determined difference, wherein the determining of the third location estimate is based on the shifted second location estimate.

In Example 25, the subject matter of any one or more of Examples 15-24 optionally include the operations further comprising obtaining a plurality of probabilities that the third device is located within each of a corresponding plurality of regions, wherein the first location estimate of the third device is based on the plurality of probabilities.

In Example 26, the subject matter of Example 25 optionally includes the operations further comprising weighting each of the plurality of regions based on the region's respective probability, wherein the first location estimate is based on the weightings.

In Example 27, the subject matter of any one or more of Examples 15-26 optionally include the operations further comprising receiving input, via a user interface, indicating a change in alignment of the second wireless device and determining an updated orientation of the second wireless device in response to the input.

In Example 28, the subject matter of any one or more of Examples 15-27 optionally include the operations further comprising determining a difference between the first orientation and the second orientation, determining the instructions based on the difference and commanding an electric motor configured to change an orientation of the second wireless device to perform the instructions.

Example 29 is a non-transitory computer readable storage medium comprising instructions that when executed configure hardware processing circuitry to perform operations to align orientations of two wireless devices, the operations comprising: determining a first orientation and first position of a first wireless device; determining a second orientation and a second position of a second wireless device based on a first signal exchanged between the first and second wireless devices; generating instructions to reduce or eliminate a difference between the first orientation and the second orientation; causing performance of the instructions; in response to the causing, determining an updated orientation of the second wireless device based on a second signal exchanged between the first and second wireless devices; obtaining a first location estimate of a third wireless device, the first location estimate determined by the first wireless device at the first orientation; obtaining a second location estimate of the third wireless device, the second location estimate determined by the second wireless device at the updated orientation; and generating a third location estimate of the third wireless device based on the first location estimate and the second location estimate.

In Example 30, the subject matter of Example 29 optionally includes wherein the determining of the second orientation of the second wireless device comprises determining phase differences of the signal when received at a plurality of receive element pairs of the first wireless device, the signal transmitted from a plurality of transmit elements of the second wireless device, and determining the second orientation of the second wireless device based on the phase differences.

In Example 31, the subject matter of Example 30 optionally includes the operations further comprising iteratively performing, until a difference between the first orientation and the second orientation meets a criterion: exchanging a signal between the first wireless device and the second wireless device, determining phase differences between signals received at the plurality of receiving elements, determining an updated second orientation based on the determined phase differences, determining an updated difference between the first orientation and the updated second orientation; generating updated instructions to reduce or eliminate the updated difference, and causing performance of the updated instructions.

In Example 32, the subject matter of Example 31 optionally includes wherein the criterion is met when at least one of a difference between the first orientation and the second orientation with respect to a first axis of a three dimensional space is below a first threshold, a second difference between the first orientation and the second orientation with respect to a second axis of the three dimensional space is below a second predefined threshold, or a third difference between the first orientation and the second orientation with respect to a third axis of the three dimensional space is below a third predefined threshold.

In Example 33, the subject matter of any one or more of Examples 30-32 optionally include the operations further comprising receiving the signal at the plurality of receive elements, and comparing a phase of the signal when received at each receive element with respect to a reference phase of the signal when received at a reference receive element, wherein the determining of the phase differences is based on the comparing.

In Example 34, the subject matter of any one or more of Examples 30-33 optionally include wherein determining the first orientation of the first wireless device comprises initializing the first orientation to a predefined orientation with respect to at least one dimension of a three-dimensional space.

In Example 35, the subject matter of any one or more of Examples 30-34 optionally include wherein causing performance of the instructions comprises one or more of illuminating a light physically attached to the second wireless device, displaying the instructions on an electronic display, or outputting an audio signal to a speaker.

In Example 36, the subject matter of any one or more of Examples 30-35 optionally include wherein determining the second orientation comprises: estimating locations of each of a plurality of transmit elements of the second wireless device; identifying a respective layout of the second plurality of transmit elements; rotating and/or shifting the layout within a three-dimensional space; and identifying a best fit between the estimated locations and the rotated and/or shifted layout, wherein the second orientation is based on the best fit.

In Example 37, the subject matter of any one or more of Examples 30-36 optionally include wherein the generating of the instructions comprises one or more of: generating a first instruction to reduce or eliminate the orientation difference with respect to a first three-dimensional axis; generating a second instruction to reduce or eliminate a second difference between the first orientation and the second orientation with respect to a second three-dimensional axis; or generating a third instruction to reduce or eliminate a third difference between the first orientation and the second orientation with respect to a third three-dimensional axis.

In Example 38, the subject matter of any one or more of Examples 30-37 optionally include the operations further comprising: determining a difference between the first position and the second position; and shifting the second location estimate based on the determined difference, wherein the determining of the third location estimate is based on the shifted second location estimate.

In Example 39, the subject matter of any one or more of Examples 30-38 optionally include the operations further comprising obtaining a plurality of probabilities that the third device is located within each of a corresponding plurality of regions, wherein the first location estimate of the third device is based on the plurality of probabilities.

In Example 40, the subject matter of Example 39 optionally includes weighting each of the plurality of regions based on the region's respective probability, wherein the first location estimate is based on the weightings.

In Example 41, the subject matter of any one or more of Examples 30-40 optionally include receiving input, via a user interface, indicating a change in alignment of the second wireless device and determining an updated orientation of the second wireless device in response to the input.

In Example 42, the subject matter of any one or more of Examples 30-41 optionally include determining a difference between the first orientation and the second orientation, determining the instructions based on the difference and commanding an electric motor configured to change an orientation of the second wireless device to perform the instructions.

What is claimed is:

1. A method comprising:
    determining phase differences of signals exchanged between a first wireless device and a second wireless device;
    determining a second orientation of the second wireless device relative to a first orientation of the first wireless device based on the phase differences; and
    generating one or more instructions to adjust the second orientation of the second wireless device based on the phase differences.

2. The method of claim 1, wherein the first wireless device and the second wireless device are access points.

3. The method of claim 1, wherein generating one or more instructions to adjust the second orientation of the second wireless device further comprises automatically instructing the second wireless device to control one or more motors to adjust the orientation of the second wireless device about one or more of an X, Y, or Z axis.

4. The method of claim 1, wherein generating one or more instructions to adjust the second orientation of the second wireless device further comprises generating, for display on one or more of a computing device or a mobile device, one or more instructions to manually adjust the orientation of the second wireless device about one or more of an X, Y, or Z axis.

5. The method of claim 1, wherein generating one or more instructions to adjust the second orientation of the second wireless device further comprises providing audible guidance using one or more of a computing device or a mobile device.

6. The method of claim 1, wherein generating one or more instructions to adjust the second orientation of the second wireless device further comprises controlling one or more light emitting elements mounted on the second wireless device to indicate an amount of rotation in a specific direction to be applied to the second wireless device.

7. The method of claim 1, wherein generating one or more instructions to adjust the second orientation of the second wireless device further comprises controlling one or more light emitting elements mounted on the second wireless device to indicate that at least one corner of the second wireless device should be adjusted in a specific direction.

8. The method of claim 1, further comprising updating the second orientation of the second wireless device based on phase differences of signals exchanged between the first wireless device and the second wireless device after adjustment of the orientation of the second wireless device.

9. The method of claim 1, wherein determining the orientation of the second wireless device further comprises:
    comparing the determined phase differences with expected phase differences of the signals exchanged between the first wireless device and the second wireless device;
    determining a position of a plurality of transmit elements of the second wireless device based on the comparing; and
    determining the orientation of the second wireless device based on the determined position of the plurality of transmit elements of the second wireless device and layout information defining relative positions of the plurality of transmit elements of the second wireless device.

10. The method of claim 1, wherein determining phase differences of signals exchanged between the first wireless device and the second wireless device further comprises determining phase differences of signals transmitted from at least one transmit element of the second wireless device and received by at least one pair of receive elements of the first wireless device.

11. A system comprising:
    a memory; and
    processing circuitry coupled to the memory and configured to:
    determine phase differences of signals exchanged between a first wireless device and a second wireless device;
    determine a second orientation of the second wireless device relative to a first orientation of the first wireless device based on the phase differences; and generate one or more instructions to adjust the second orientation of the second wireless device based on the phase differences.

12. The system of claim 11, wherein the first wireless device and the second wireless device are access points.

13. The system of claim 11, wherein to generate one or more instructions to adjust the second orientation of the second wireless device the processing circuitry is further configured to automatically instruct the second wireless device to control one or more motors to adjust the orientation of the second wireless device about one or more of an X, Y, or Z axis.

14. The system of claim 11, wherein to generate one or more instructions to adjust the second orientation of the second wireless device the processing circuitry is further configured to generate, for display on a computing device, one or more instructions to manually adjust the orientation of the second wireless device about one or more of an X, Y, or Z axis.

15. The system of claim 11, wherein to generate one or more instructions to adjust the second orientation of the second wireless device the processing circuitry is further configured to provide audible guidance using a mobile device.

16. The system of claim 11, wherein to generate one or more instructions to adjust the second orientation of the second wireless device the processing circuitry is further configured to control one or more light emitting elements mounted on the second wireless device to indicate an amount of rotation in a specific direction to be applied to the second wireless device.

17. The system of claim 11, wherein to generate one or more instructions to adjust the second orientation of the second wireless device the processing circuitry is further configured to control one or more light emitting elements mounted on the second wireless device to indicate that at least one corner of the second wireless device should be adjusted in a specific direction.

18. The system of claim 11, wherein to determine the orientation of the second wireless device the processing circuitry is further configured to:
compare the determined phase differences with expected phase differences of the signals exchanged between the first wireless device and the second wireless device;
determine a position of a plurality of transmit elements of the second wireless device based on the comparing; and
determine the orientation of the second wireless device based on the determined position of the plurality of transmit elements of the second wireless device and layout information defining relative positions of the plurality of transmit elements of the second wireless device.

19. The system of claim 11, wherein to determine phase differences of signals exchanged between the first wireless device and the second wireless device the processing circuitry is further configured to determine phase differences of signals transmitted from at least one transmit element of the second wireless device and received by at least one pair of receive elements of the first wireless device.

20. A non-transitory computer-readable storage medium comprising instructions that when executed by one or more processors configure the one or more processors to:
determine phase differences of signals exchanged between a first wireless device and a second wireless device;
determine a second orientation of the second wireless device relative to a first orientation of the first wireless device based on the phase differences; and
generate one or more instructions to adjust the second orientation of the second wireless device based on the phase differences.

* * * * *